United States Patent
Watkins et al.

(10) Patent No.: US 12,497,454 B2
(45) Date of Patent: *Dec. 16, 2025

(54) ANTI-ROR1 ANTIBODIES AND COMPOSITIONS

(71) Applicant: VelosBio Inc., San Diego, CA (US)

(72) Inventors: Jeffry D. Watkins, San Diego, CA (US); Thanh-Trang Vo, San Diego, CA (US); J. Monty Watkins, La Jolla, CA (US)

(73) Assignee: VELOSBIO INC., San Diego, CA (US)

( * ) Notice: Subject to any disclaimer, the term of this patent is extended or adjusted under 35 U.S.C. 154(b) by 735 days.

This patent is subject to a terminal disclaimer.

(21) Appl. No.: 17/795,949

(22) PCT Filed: Feb. 5, 2021

(86) PCT No.: PCT/US2021/016965
§ 371 (c)(1),
(2) Date: Jul. 28, 2022

(87) PCT Pub. No.: WO2021/159029
PCT Pub. Date: Aug. 12, 2021

(65) Prior Publication Data
US 2023/0021388 A1    Jan. 26, 2023

Related U.S. Application Data

(60) Provisional application No. 62/971,688, filed on Feb. 7, 2020.

(51) Int. Cl.
| | | |
|---|---|---|
| *A61P 35/00* | (2006.01) | |
| *A61K 47/68* | (2017.01) | |
| *C07K 16/28* | (2006.01) | |
| *C12N 15/64* | (2006.01) | |
| *A61K 39/395* | (2006.01) | |
| *C12N 15/85* | (2006.01) | |

(52) U.S. Cl.
CPC ...... *C07K 16/2803* (2013.01); *A61K 47/6879* (2017.08); *A61P 35/00* (2018.01); *C12N 15/64* (2013.01); *A61K 39/39558* (2013.01); *C07K 2317/31* (2013.01); *C07K 2317/33* (2013.01); *C07K 2317/35* (2013.01); *C07K 2317/55* (2013.01); *C07K 2317/565* (2013.01); *C07K 2317/569* (2013.01); *C07K 2317/92* (2013.01); *C07K 2317/94* (2013.01); *C12N 2015/8518* (2013.01)

(58) Field of Classification Search
None
See application file for complete search history.

(56) References Cited

U.S. PATENT DOCUMENTS

| | | | |
|---|---|---|---|
| 2008/0171014 A1* | 7/2008 | Wu | A61P 9/04 |
| | | | 435/254.11 |
| 2017/0233472 A1 | 8/2017 | Barat et al. | |
| 2018/0369406 A1 | 12/2018 | Lannutti et al. | |

FOREIGN PATENT DOCUMENTS

| | | |
|---|---|---|
| WO | 2000009560 A2 | 2/2000 |
| WO | 2014031174 A1 | 2/2014 |
| WO | 2016055592 A1 | 4/2016 |
| WO | 2017127499 A1 | 7/2017 |
| WO | 2017127664 A1 | 7/2017 |
| WO | 2018140831 A2 | 8/2018 |
| WO | 2018237335 A1 | 12/2018 |
| WO | 2019084060 A1 | 5/2019 |
| WO | 2020237173 A1 | 11/2020 |

OTHER PUBLICATIONS

Karvonen et al. (Biochemical Society Transactions (2017) 45 457-464). (Year: 2017).*
Borcherding et al. (Protein Cell 2014, 5(7):496-502). (Year: 2014).*
Dave et al. (Pediatric Hematology and Oncology, 2019, vol. 36, No. 6, 352-364). (Year: 2019).*
Wallstable et al. (JCI Insight. 2019;4(18):e126345). (Year: 2019).*
Brinkmann, Ulrich et al., The making of bispecific antibodies, mAbs, 2017, 182-212, 9.
Choi, Michael Y. et al., Phase I Trial: Cirmtuzumab Inhibits ROR1 Signaling and Stemness Signatures in Patients with Chronic Lymphocytic Leukemia, Cell Stem Cell, 2018, 951-959, 22.
Daneshmanesh, Amir Hossein et al., Orphan receptor tyrosine kinases ROR1 and ROR2 in hematological malignancies, Leukemia & Lymphoma, 2013, 843-850, 54(4).
Dave, Hema et al., Restricted Cell Surface Expression of Receptor Tyrosine Kinase ROR1 in Pediatric B-Lineage Acute Lymphoblastic Leukemia Suggests Targetability with Therapeutic Monoclonal Antibodies, PLoS One, 2012, 1-12, 7(12): e52655.
Gohil, Satyen Harish et al., An ROR1 bi-specific T-cell engager provides effective targeting and cytotoxicity against a range of solid tumors, Oncolmmunology, 2017, e1326437 (pp. 1-11), 6:7.
Holliger et al., Diabodies, Proc. Natl. Acad. Sci. USA, 1993, No. 14, pp. 6444-6448, 90.
Huang, Renhua et al., Improvements to the Kunkel mutagenesis protocol for constructing primary and secondary phage-display libraries, Methods, 2012, 10-17, 58(1).
Jarasch, Alexander et al., Developability Assessment During the Selection of Novel Therapeutic Antibodies, Journal of Pharmaceutical Sciences, 2015, 1885-1898, 104.

(Continued)

*Primary Examiner* — Zachary S Skelding
(74) *Attorney, Agent, or Firm* — Tamaria Dewdney; Andrew W. Custer

(57) ABSTRACT

This invention relates to anti-ROR1 antibodies and methods of using them in treating diseases and conditions related to ROR1 activity, e.g., cancer.

20 Claims, 14 Drawing Sheets

Specification includes a Sequence Listing.

(56) References Cited

OTHER PUBLICATIONS

Qi, Junpeng et al., Potent and selective antitumor activity of a T cell—engaging bispecific antibody targeting a membrane-proximal epitope of ROR1, Proceedings of the National Academy of Sciences, 2018, E5467-E5476, 115 (24).

Raybould, Matthew I.J. et al., Five computational developability guidelines for therapeutic antibody profiling, Proceedings of the National Academy of Sciences, 2019, 4025-4030, 116(10).

Tunnacliffe, Alan et al., The majority of human CD3 epitopes are conferred by the epsilon chain, International Immunology, 1989, 546-550, 1(5).

Zhang, Suping et al., The onco-embryonic antigen ROR1 is expressed by a variety of human cancer, The American Journal of Pathology, 2018, 1903-1910, 181(6).

Hlavacek, William S. et al., Steric Effects on Multivalent Ligand-Receptor Binding: Exclusion of Ligand Sites by Bound Cell Surface Receptors, Biophysical Journal, 76, 3031-3043, 1999.

Pluckthun, Andreas et al., New protein engineering approaches to multivalent and bispecific antibody fragments, Immunotechnology, 3, 83-105, 1997.

Roit, A et al., Immunology, Mir, Translation from English, pp. 9, 110, 2000.

Tobi, Dror et al., Structural changes involved in protein binding correlate with intrinsic motions of proteins in the unbound state, PNAS, 102(52), 18908-18913, 2005.

Translation of Roit A, et al., Immunology, translation from English, Mir, 2000, pp. 9, 110, 5 pages.

\* cited by examiner

A
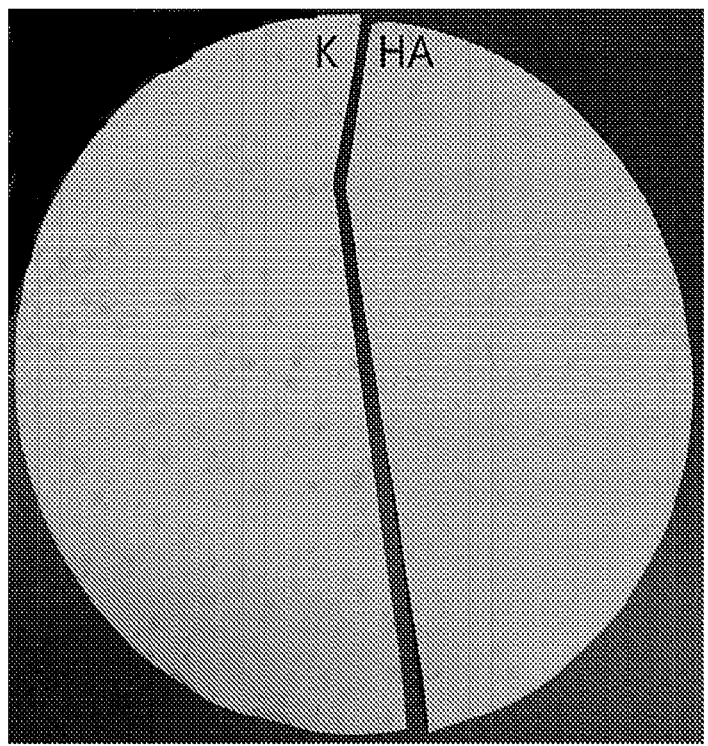
B
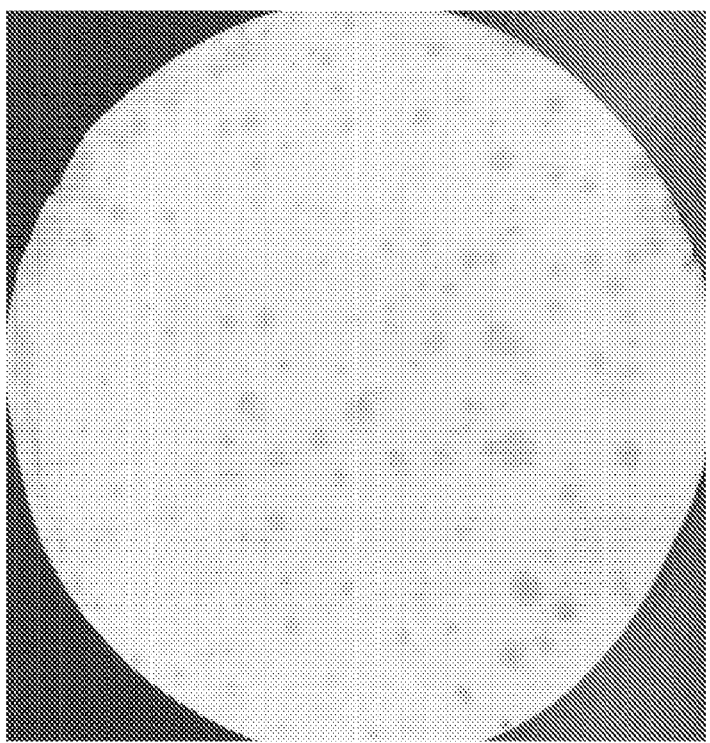
FIG. 1

| CDR | WT AA | Residue | Ala | Arg | Asn | Asp | Cys | Gln | Glu | Gly | His | Ile |
|---|---|---|---|---|---|---|---|---|---|---|---|---|
| HCDR1 | Gly | 27 | 3.21% | 5.71% | 14.64% | 19.64% | 5.54% | 2.68% | 5.71% | 0.00% | 5.71% | 1.43% |
| HCDR1 | Tyr | 29 | 2.07% | 3.53% | 8.30% | 11.83% | 7.26% | 7.68% | 7.68% | 2.90% | 3.73% | 4.77% |
| HCDR1 | Ala | 30 | 0.00% | 3.87% | 9.16% | 12.42% | 2.44% | 5.70% | 10.18% | 6.72% | 4.48% | 4.89% |
| HCDR1 | Phe | 31 | 4.11% | 5.28% | 14.87% | 11.74% | 3.72% | 2.74% | 4.50% | 7.63% | 7.63% | 3.13% |
| HCDR1 | Thr | 32 | 5.76% | 2.62% | 12.04% | 8.38% | 0.92% | 5.89% | 7.98% | 5.10% | 4.97% | 3.80% |
| HCDR1 | Ala | 33 | 0.00% | 3.90% | 6.93% | 11.69% | 5.41% | 3.90% | 7.14% | 7.79% | 3.46% | 4.76% |
| HCDR1 | Tyr | 39 | 5.15% | 6.47% | 6.62% | 6.03% | 3.24% | 6.91% | 9.85% | 6.18% | 4.85% | 4.71% |
| HCDR1 | Asn | 40 | 6.85% | 4.32% | 0.00% | 8.93% | 4.76% | 6.55% | 6.70% | 8.48% | 0.89% | 4.61% |
| HCDR1 | Ile | 41 | 1.60% | 3.91% | 13.14% | 9.06% | 4.26% | 4.62% | 6.57% | 7.64% | 6.93% | 0.00% |
| HCDR1 | His | 42 | 8.91% | 8.00% | 0.00% | 0.00% | 0.00% | 12.18% | 13.27% | 0.00% | 0.00% | 0.00% |
| HCDR2 | Ser | 57 | 4.60% | 5.11% | 6.81% | 8.01% | 3.58% | 2.73% | 8.01% | 7.50% | 3.58% | 6.30% |
| HCDR2 | Phe | 58 | 3.72% | 2.97% | 4.34% | 9.29% | 3.97% | 4.71% | 7.19% | 5.82% | 5.33% | 5.08% |
| HCDR2 | Asp | 59 | 3.87% | 3.78% | 7.03% | 0.00% | 6.13% | 3.24% | 5.23% | 8.56% | 4.32% | 5.86% |
| HCDR2 | Pro | 60 | 7.01% | 3.01% | 4.34% | 4.51% | 4.51% | 5.84% | 5.51% | 4.34% | 3.34% | 7.51% |
| HCDR2 | Tyr | 61 | 4.00% | 6.06% | 6.06% | 5.13% | 6.98% | 7.49% | 4.31% | 4.00% | 3.70% | 6.88% |
| HCDR2 | Asp | 65 | 5.31% | 3.84% | 7.78% | 0.00% | 4.13% | 5.61% | 5.81% | 6.99% | 4.04% | 5.12% |
| HCDR2 | Gly | 66 | 2.92% | 7.78% | 7.29% | 8.91% | 4.38% | 7.46% | 6.97% | 0.00% | 5.35% | 3.89% |
| HCDR2 | Gly | 67 | 4.40% | 5.28% | 8.06% | 8.21% | 4.84% | 7.92% | 7.92% | 0.00% | 5.87% | 5.57% |
| HCDR2 | Ser | 68 | 5.50% | 3.42% | 5.50% | 6.98% | 1.93% | 5.50% | 5.35% | 6.84% | 5.79% | 7.28% |
| HCDR2 | Ser | 69 | 5.19% | 4.82% | 4.17% | 6.21% | 3.34% | 5.00% | 6.12% | 5.93% | 3.06% | 6.77% |
| HCDR2 | Tyr | 70 | 4.61% | 3.36% | 3.86% | 5.11% | 2.62% | 3.24% | 4.98% | 5.35% | 3.86% | 17.06% |
| HCDR2 | Asn | 71 | 5.79% | 3.64% | 0.00% | 6.28% | 5.29% | 4.63% | 9.26% | 6.78% | 2.81% | 6.45% |
| HCDR2 | Gln | 72 | 5.33% | 2.36% | 4.59% | 6.33% | 4.34% | 0.00% | 7.07% | 9.06% | 3.35% | 5.58% |
| HCDR2 | Lys | 73 | 5.60% | 4.96% | 5.36% | 7.69% | 6.16% | 3.84% | 7.29% | 6.33% | 4.32% | 5.52% |
| HCDR2 | Phe | 74 | 3.10% | 5.22% | 4.73% | 7.83% | 5.55% | 5.87% | 5.87% | 5.87% | 4.73% | 4.40% |
| HCDR2 | Lys | 75 | 7.91% | 3.91% | 3.91% | 4.89% | 5.33% | 3.47% | 5.51% | 5.96% | 3.29% | 4.80% |
| HCDR2 | Asp | 76 | 6.00% | 5.03% | 5.91% | 0.00% | 2.65% | 6.70% | 7.50% | 7.41% | 5.29% | 5.29% |

FIG. 3

| CDR | WT AA | Residue | % Variant Amino Acid ||||||||||||
|---|---|---|---|---|---|---|---|---|---|---|---|---|---|---|
| | | | Leu | Lys | Met | Phe | Pro | Ser | Thr | Trp | Tyr | Val | Ter |
| HCDR1 | Gly | 27 | 2.50% | 3.75% | 2.68% | 1.96% | 5.54% | 11.07% | 2.68% | 2.50% | 1.96% | 1.07% | 0.00% |
| | Tyr | 29 | 1.45% | 8.51% | 4.36% | 2.49% | 3.53% | 4.98% | 6.85% | 5.19% | 0.00% | 2.90% | 0.00% |
| | Ala | 30 | 4.28% | 6.11% | 3.67% | 2.04% | 5.09% | 6.11% | 2.85% | 3.87% | 1.02% | 5.09% | 0.00% |
| | Phe | 31 | 3.91% | 4.11% | 4.11% | 0.00% | 3.52% | 6.85% | 2.35% | 3.33% | 3.33% | 3.13% | 0.00% |
| | Thr | 32 | 2.09% | 10.99% | 4.84% | 1.31% | 7.59% | 7.72% | 0.00% | 4.32% | 1.05% | 2.62% | 0.00% |
| | Ala | 33 | 1.73% | 6.06% | 6.28% | 1.95% | 4.76% | 4.76% | 7.79% | 5.19% | 1.52% | 4.98% | 0.00% |
| | Tyr | 39 | 2.65% | 6.32% | 3.38% | 2.79% | 4.41% | 6.47% | 5.29% | 5.15% | 0.00% | 3.24% | 0.29% |
| | Asn | 40 | 2.38% | 9.67% | 5.21% | 2.38% | 6.85% | 7.89% | 4.46% | 2.53% | 3.27% | 3.27% | 0.00% |
| | Ile | 41 | 1.60% | 8.17% | 3.02% | 4.44% | 3.55% | 5.86% | 6.75% | 4.97% | 2.31% | 1.60% | 0.00% |
| | His | 42 | 0.91% | 17.09% | 11.45% | 0.00% | 9.64% | 0.00% | 9.64% | 4.91% | 0.00% | 3.82% | 0.18% |
| | Ser | 57 | 1.02% | 7.50% | 3.41% | 6.64% | 2.04% | 0.00% | 5.11% | 8.18% | 6.30% | 3.58% | 0.00% |
| | Phe | 58 | 2.60% | 5.95% | 4.09% | 0.00% | 3.22% | 5.70% | 5.08% | 7.93% | 7.93% | 5.08% | 0.00% |
| | Asp | 59 | 3.06% | 6.40% | 5.14% | 5.32% | 2.16% | 8.11% | 6.04% | 5.14% | 5.77% | 4.77% | 0.09% |
| | Pro | 60 | 5.34% | 4.67% | 6.51% | 4.67% | 0.00% | 3.84% | 8.35% | 3.51% | 4.17% | 9.02% | 0.00% |
| | Tyr | 61 | 3.59% | 6.88% | 2.67% | 4.31% | 4.62% | 7.49% | 6.37% | 5.34% | 0.00% | 4.00% | 0.10% |
| | Asp | 65 | 3.05% | 4.92% | 3.64% | 4.63% | 6.00% | 8.96% | 8.56% | 3.84% | 5.22% | 2.46% | 0.10% |
| | Gly | 66 | 2.59% | 7.62% | 3.57% | 3.08% | 3.73% | 5.51% | 4.54% | 2.76% | 7.29% | 4.38% | 0.00% |
| | Gly | 67 | 2.05% | 8.80% | 3.37% | 2.49% | 1.47% | 8.65% | 5.43% | 3.52% | 2.64% | 3.52% | 0.00% |
| HCDR2 | Ser | 68 | 4.16% | 5.65% | 4.16% | 5.05% | 2.23% | 0.00% | 5.05% | 6.24% | 4.75% | 8.32% | 0.30% |
| | Ser | 69 | 3.06% | 6.12% | 7.78% | 4.73% | 1.85% | 0.00% | 4.91% | 9.55% | 5.38% | 5.84% | 0.19% |
| | Tyr | 70 | 3.99% | 5.48% | 5.85% | 7.35% | 1.74% | 4.11% | 3.99% | 4.11% | 0.00% | 9.34% | 0.00% |
| | Asn | 71 | 4.63% | 7.27% | 5.62% | 4.30% | 2.31% | 7.60% | 5.45% | 4.30% | 3.64% | 3.97% | 0.00% |
| | Gln | 72 | 3.47% | 4.34% | 6.82% | 3.60% | 6.70% | 7.07% | 5.21% | 3.47% | 4.59% | 6.45% | 0.25% |
| | Lys | 73 | 5.52% | 0.00% | 4.72% | 3.12% | 2.24% | 7.21% | 4.72% | 3.68% | 4.56% | 7.13% | 0.00% |
| | Phe | 74 | 3.43% | 5.87% | 4.89% | 0.00% | 3.59% | 4.89% | 2.94% | 6.36% | 7.67% | 7.18% | 0.00% |
| | Lys | 75 | 5.60% | 0.00% | 7.47% | 3.91% | 4.44% | 6.13% | 7.82% | 5.78% | 3.20% | 6.67% | 0.00% |
| | Asp | 76 | 2.03% | 3.79% | 3.70% | 5.56% | 5.47% | 7.23% | 7.67% | 3.88% | 3.70% | 5.11% | 0.09% |

FIG.3 (cont.)

A
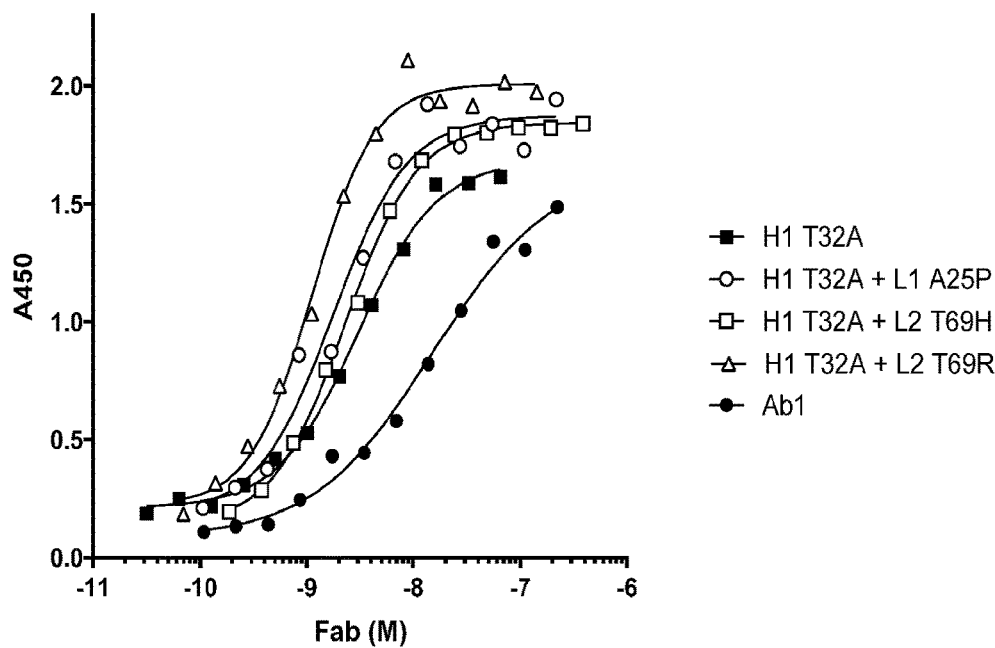
B
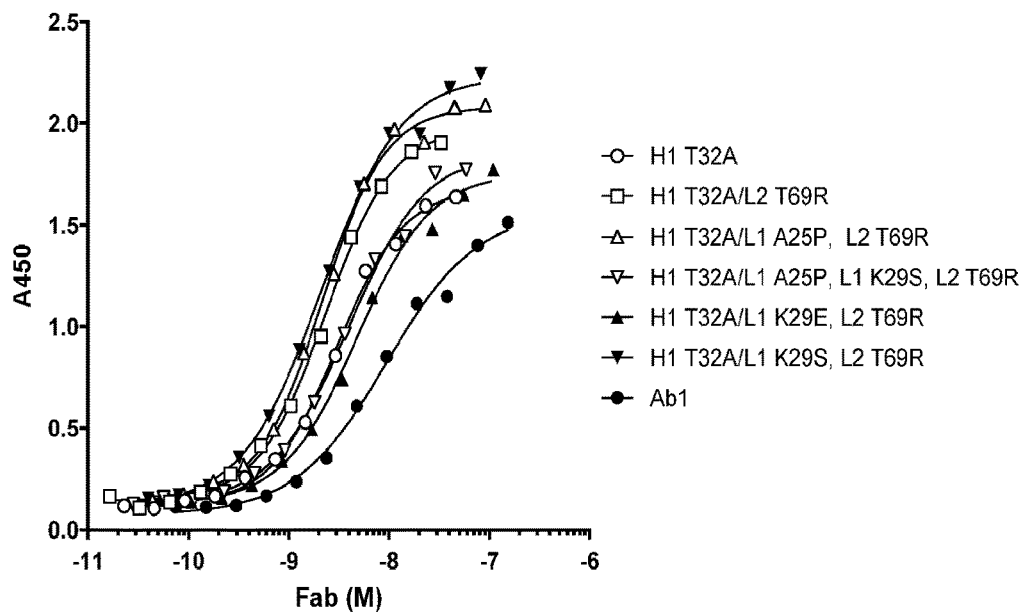
FIG. 9

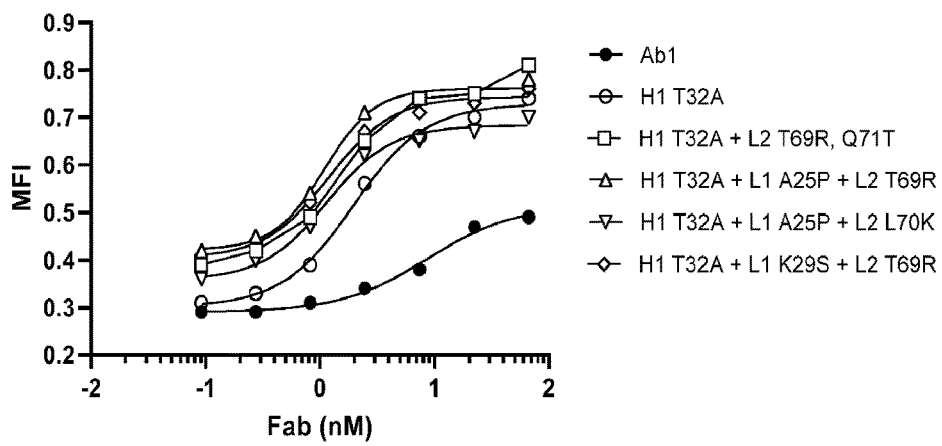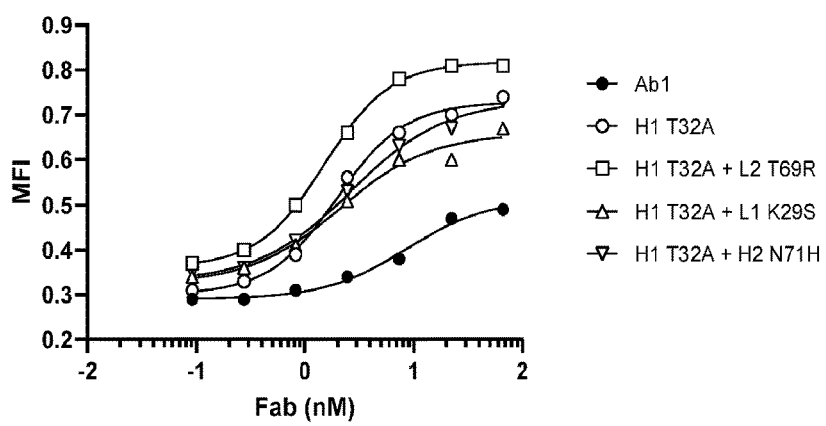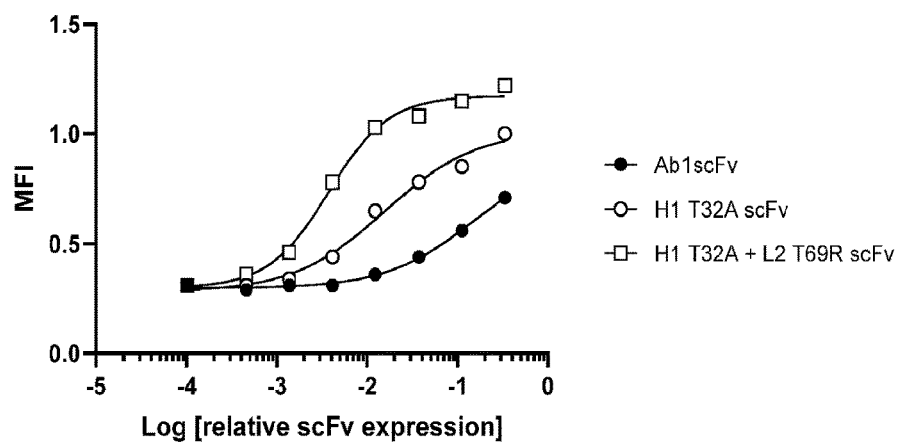
FIG. 12

ANTI-ROR1 ANTIBODIES AND COMPOSITIONS

CROSS-REFERENCE TO RELATED APPLICATIONS

This application is a U.S. National Phase application under 35 U.S.C. § 371 of PCT Application No. PCT/US2021/016965 filed Feb. 5, 2021, which claims priority from U.S. Provisional Patent Application 62/971,688, filed Feb. 7, 2020, the disclosures of which are incorporated by reference herein in their entireties.

SEQUENCE LISTING

The instant application contains a Sequence Listing that has been submitted electronically in ASCII format and is hereby incorporated by reference in its entirety. The electronic copy of the Sequence Listing, created on Jan. 26, 2021, is named 024651_WO005_SL.txt and is 73,129 bytes in size.

BACKGROUND OF THE INVENTION

Receptor tyrosine kinases (RTK) are key regulators of cellular processes such as differentiation, proliferation, survival and migration and have a role in the development and progression of cancer. Deregulation of RTKs has been linked to the initiation and progression of cancers (Du and Lovely, *Molecular Cancer* (2018) 17:58).

Receptor tyrosine kinase-like orphan receptor 1 (ROR1) is a cell surface protein that mediates signals from its ligand, the secreted glycoprotein Wnt5a. Consistent with its role in influencing the fate of stem cells during embryogenesis, ROR1 expression is observed on invasive malignancies that revert to an embryonic transcriptional program, but is not observed on normal adult tissues, offering a favorable selectivity profile as a therapeutic target. ROR1 is commonly expressed on the malignant cells of patients with acute lymphoblastic leukemia (ALL), acute myeloid leukemia (AML), chronic lymphoblastic leukemia (CLL), mantle cell lymphoma (MCL), follicular lymphoma (FL), marginal zone lymphoma (MZL), diffuse large B-cell lymphoma (DLBCL), and Richter's transformation or Richter's syndrome (RS). ROR1 is also present on the cell surfaces of multiple solid tumors, where it appears to be a marker of cancer stem cells. Because it is not expressed to appreciable levels in healthy adult tissues, but displays high levels of expression in multiple hematological and solid tumors, ROR1 is an attractive target for tumor-specific therapy.

ROR1 presents multiple therapeutic modality possibilities, including antibody monotherapy, antibody-drug conjugates, radioconjugates, bispecific antibodies, and other multivalent biologics. Cirmtuzumab, a humanized antibody directed against ROR1, is undergoing clinical trials. A cirmtuzumab-MMAE antibody-drug conjugate is also in clinical trials.

In view of the critical role of ROR1 in cancer progression, there is a need for new and improved immune therapies that target ROR1 for treating cancer.

SUMMARY OF THE INVENTION

The present disclosure is directed to novel recombinant antibodies targeting ROR1 (e.g., human ROR1), as well as pharmaceutical compositions comprising one or more of these antibodies, and use of the antibodies and pharmaceutical compositions for treatment of cancer. Compared to currently available treatments for such cancers, including antibody treatments, it is contemplated that the antibodies of the present disclosure may provide a superior clinical response either alone or in combination with another cancer therapeutic.

In some embodiments, the present disclosure provides an anti-ROR1 antibody or an antigen-binding portion thereof, wherein the antibody comprises:
a) a heavy chain variable domain (VH) that comprises the amino acid sequence of SEQ ID NO: 4 with at least one mutation in heavy chain (H)-CDR1, H-CDR2, or both; and a light chain variable domain (VL) that comprises the amino acid sequence of SEQ ID NO: 2;
b) a VH that comprises the amino acid sequence of SEQ ID NO: 4; and a VL that comprises the amino acid sequence of SEQ ID NO: 2 with at least one mutation in light chain (L)-CDR1, L-CDR2, or both; or
c) a VH that comprises the amino acid sequence of SEQ ID NO: 4 with at least one mutation in heavy chain (H)-CDR1, H-CDR2, or both; and a VL that comprises the amino acid sequence of SEQ ID NO: 2 with at least one mutation in light chain (L)-CDR1, L-CDR2, or both;
wherein the antibody or antigen-binding portion binds to the same epitope of human ROR1 as, and has a greater binding affinity for human ROR1 than, an antibody comprising a VH that comprises the amino acid sequence of SEQ ID NO: 4 and a VL that comprises the amino acid sequence of SEQ ID NO: 2. In some embodiments, the VH may further comprise a mutation at residue 110 (e.g., W110F, W110H, W110M, or W110Y), which may increase target binding, increase antibody stability, reduce aggregation, or any combination thereof. Unless otherwise indicated, the antibody amino acid residue numbering herein is in accordance with the AHo numbering system.

In some embodiments, the present disclosure provides an anti-ROR1 antibody or an antigen-binding portion thereof, wherein said antibody comprises:
a) a heavy chain variable domain (VH) comprising the amino acid sequence of SEQ ID NO: 4 with a mutation selected from the group consisting of T32A, T32E, S69V, S69E, and N71H, or any combination thereof; and a light chain variable domain (VL) comprising the amino acid sequence of SEQ ID NO: 2;
b) a VH comprising the amino acid sequence of SEQ ID NO: 4; and a VL comprising the amino acid sequence of SEQ ID NO: 2 with a mutation selected from the group consisting of A25P, K29E, K29S, T69H, T69R, L70K, and Q71T, or any combination thereof; or
c) a VH comprising the amino acid sequence of SEQ ID NO: 4 with a mutation selected from the group consisting of T32A, T32E, S69V, S69E, and N71H, or any combination thereof; and a VL comprising the amino acid sequence of SEQ ID NO: 2 with a mutation selected from the group consisting of A25P, K29E, K29S, T69H, T69R, L70K, and Q71T, or any combination thereof;
wherein the antibody or antigen-binding portion binds to the same epitope of human ROR1 as, and has a greater binding affinity for human ROR1 than, an antibody comprising a VH that comprises the amino acid sequence of SEQ ID NO: 4 and a VL that comprises the amino acid sequence of SEQ ID NO: 2.

In certain embodiments, the anti-ROR1 antibody or antigen-binding portion comprises:
a) a VH comprising the amino acid sequence of SEQ ID NO: 4 with i) one or more mutations selected from the group consisting of T32E, S69V or S69E (notated as "S69V/E"; similar notations are used throughout), and N71H, or
ii) the mutation T32A and one or both mutations selected from the group consisting of S69V/E and N71H, and
a VL comprising the amino acid sequence of SEQ ID NO: 2;
b) a VH comprising the amino acid sequence of SEQ ID NO: 4 with
i) one or more mutations selected from the group consisting of T32E, S69V/E, and N71H, or
ii) the mutation T32A and one or both mutations selected from the group consisting of S69V/E and N71H, and
a VL comprising the amino acid sequence of SEQ ID NO: 2 with one or more mutations selected from the group consisting of A25P, K29E/S, T69H/R, L70K, and Q71T;
c) a VH comprising the amino acid sequence of SEQ ID NO: 4 comprising the mutation T32A and
a VL comprising the amino acid sequence of SEQ ID NO: 2 with
i) one or more mutations selected from the group consisting of A25P, K29E/S, T69H, L70K, and Q71T, or
ii) the mutation T69R and one or more mutations selected from the group consisting of A25P, K29E/S, L70K, and Q71T; or
d) a VH comprising the amino acid sequence of SEQ ID NO: 4 and
a VL comprising the amino acid sequence of SEQ ID NO: 2 with one or more mutations selected from the group consisting of A25P, K29E/S, T69H/R, L70K, and Q71T.

In certain embodiments, the anti-ROR1 antibody or antigen-binding portion comprises:
a) a VH comprising the amino acid sequence of SEQ ID NO: 4 with the mutation T32A, and a VL comprising the amino acid sequence of SEQ ID NO: 2 with the mutation A25P;
b) a VH comprising the amino acid sequence of SEQ ID NO: 4 with the mutation T32A, and a VL comprising the amino acid sequence of SEQ ID NO: 2 with the mutation T69H;
c) a VH comprising the amino acid sequence of SEQ ID NO: 4 with the mutation T32A, and a VL comprising the amino acid sequence of SEQ ID NO: 2 with the mutations A25P and T69R;
d) a VH comprising the amino acid sequence of SEQ ID NO: 4 with the mutation T32A, and a VL comprising the amino acid sequence of SEQ ID NO: 2 with the mutations K29S and T69R;
e) a VH comprising the amino acid sequence of SEQ ID NO: 4 with the mutation T32A, and a VL comprising the amino acid sequence of SEQ ID NO: 2 with the mutations T69R and Q71T; or
f) a VH comprising the amino acid sequence of SEQ ID NO: 4 with the mutation T32A, and a VL comprising the amino acid sequence of SEQ ID NO: 2 with the mutations A25P and L70K.

In some embodiments, the present disclosure provides an anti-ROR1 antibody or an antigen-binding portion thereof, comprising heavy chain (H)-CDR1-3 and light chain (L)-CDR1-3 comprising the amino acid sequences of:
a) SEQ ID NOs: 31, 42, 89, 101, 114, and 123, respectively;
b) SEQ ID NOs: 13, 73, 89, 101, 114, and 123, respectively;
c) SEQ ID NOs: 13, 75, 89, 101, 114, and 123, respectively;
d) SEQ ID NOs: 13, 80, 89, 101, 114, and 123, respectively;
e) SEQ ID NOs: 13, 42, 89, 102, 114, and 123, respectively;
f) SEQ ID NOs: 13, 42, 89, 103, 114, and 123, respectively;
g) SEQ ID NOs: 13, 42, 89, 104, 114, and 123, respectively;
h) SEQ ID NOs: 13, 42, 89, 101, 117, and 123, respectively;
i) SEQ ID NOs: 13, 42, 89, 101, 118, and 123, respectively;
j) SEQ ID NOs: 13, 42, 89, 101, 120, and 123, respectively;
k) SEQ ID NOs: 29, 42, 89, 102, 114, and 123, respectively;
l) SEQ ID NOs: 29, 42, 89, 101, 117, and 123, respectively;
m) SEQ ID NOs: 29, 42, 89, 102, 118, and 123, respectively;
n) SEQ ID NOs: 29, 42, 89, 103, 118, and 123, respectively;
o) SEQ ID NOs: 29, 42, 89, 101, 147, and 123, respectively; or
p) SEQ ID NOs: 29, 42, 89, 102, 120, and 123, respectively.

In some embodiments, an anti-ROR1 antibody or antigen-binding portion described herein may have heavy chain framework regions (FRs) 1-4 and light chain FR1-4 that comprise the amino acid sequences of SEQ ID NOs: 172-179, respectively.

In some embodiments, an anti-ROR1 antibody or antigen-binding portion described herein may be an IgG. In certain embodiments, the antibody or antigen-binding portion may comprise a human IgG1 constant region.

In some embodiments, an anti-ROR1 antibody or antigen-binding portion described herein may be a single chain variable fragment (scFv).

In some embodiments, an anti-ROR1 antibody or antigen-binding portion described herein may:
a) bind to ROR1-transfected MEC cells with greater affinity than an antibody with a VH comprising the amino acid sequence of SEQ ID NO: 4 and a VL comprising the amino acid sequence of SEQ ID NO: 2, as assessed by flow cytometry;
b) bind to JeKo-1 cells with greater affinity than an antibody with a VH comprising the amino acid sequence of SEQ ID NO: 4 and a VL comprising the amino acid sequence of SEQ ID NO: 2, as assessed by flow cytometry; or
c) both a) and b).

The present disclosure also provides a pharmaceutical composition comprising an anti-ROR1 antibody or antigen-binding portion described herein and a pharmaceutically acceptable excipient. In some embodiments, the pharmaceutical composition further comprises an additional therapeutic agent such as a Bruton's tyrosine kinase (BTK) inhibitor, a B-cell lymphoma 2 (Bcl-2) inhibitor, a mammalian target of rapamycin (mTOR) inhibitor, and/or a phosphoinositide 3-kinase (PI3K) inhibitor. For example, the additional therapeutic agent may be ibrutinib, acalabrutinib, venetoclax, everolimus, sapanisertib, and/or idelalisib.

The present disclosure also provides an isolated nucleic acid molecule comprising a nucleotide sequence that encodes the heavy chain or an antigen-binding portion thereof, or a nucleotide sequence that encodes the light chain or an antigen-binding portion thereof, or both, of an anti-ROR1 antibody or antigen-binding portion described herein. Additionally, the present disclosure provides a vector comprising such an isolated nucleic acid molecule and further comprising an expression control sequence.

The present disclosure also provides a host cell comprising a nucleotide sequence that encodes the heavy chain or an antigen-binding portion thereof, and a nucleotide sequence that encodes the light chain or an antigen-binding portion thereof, of an anti-ROR1 antibody or antigen-binding portion described herein. Further, the present disclosure provides a method for producing the anti-ROR1 antibody or portion comprising providing such a host cell, culturing said host cell under conditions suitable for expression of the antibody or portion, and isolating the resulting antibody or portion.

The present disclosure also provides a bispecific binding molecule comprising the antigen-binding portion (e.g., the six CDRs, or the heavy and light chain variable domains) of an anti-ROR1 antibody described herein.

The present disclosure also provides an immunoconjugate comprising an anti-ROR1 antibody or antigen-binding portion described herein conjugated to a cytotoxic agent. In certain embodiments, the antibody comprises a heavy chain variable domain (VH) amino acid sequence of SEQ ID NO: 5 and a light chain variable domain (VL) amino acid sequence of SEQ ID NO: 2. In certain embodiments, the antibody comprises a heavy chain variable domain (VH) amino acid sequence of SEQ ID NO: 5 and a light chain variable domain (VL) amino acid sequence of SEQ ID NO: 6.

The present disclosure also provides a method for treating cancer in a patient, comprising administering to said patient a therapeutically effective amount of an anti-ROR1 antibody or antigen-binding portion described herein, a pharmaceutical composition described herein, a bispecific binding molecule described herein, or an immunoconjugate described herein. It is understood that the antibody or antigen-binding portion, pharmaceutical composition, bispecific binding molecule, or immunoconjugate may be used for the manufacture of a medicament for treating cancer in a patient or may be for use in treating cancer in a patient. In some embodiments, the cancer is a ROR1-positive cancer. In some embodiments, the cancer is a leukemia, a lymphoma, or a solid tumor. In certain embodiments, the cancer is non-Hodgkin lymphoma (e.g., diffuse large B-cell lymphoma (DLBCL), follicular lymphoma (FL), mantle cell lymphoma (MCL), marginal zone lymphoma (MZL), Burkitt's lymphoma, T cell non-Hodgkin lymphoma, or Waldenström macroglobulinemia), a non-Hodgkin lymphoma that has undergone Richter's transformation, acute myeloid leukemia (AML), acute lymphoblastic leukemia (ALL), chronic lymphocytic leukemia (CLL), small lymphocytic leukemia (SLL), breast cancer, non-small cell lung cancer, ovarian cancer, or sarcoma. The patient may also be treated with an additional therapeutic agent, such as a Bruton's tyrosine kinase (BTK) inhibitor, a B-cell lymphoma 2 (Bcl-2) inhibitor, a mammalian target of rapamycin (mTOR) inhibitor, and/or a phosphoinositide 3-kinase (PI3K) inhibitor. In certain embodiments, the additional therapeutic agent is ibrutinib, acalabrutinib, venetoclax, everolimus, sapanisertib, or idelalisib.

The present disclosure also provides a kit comprising an anti-ROR1 antibody or antigen-binding portion described herein, a pharmaceutical composition described herein, a bispecific binding molecule described herein, or an immunoconjugate described herein.

The present disclosure also provides an article of manufacture comprising an anti-ROR1 antibody or antigen-binding portion described herein, a pharmaceutical composition described herein, a bispecific binding molecule described herein, or an immunoconjugate described herein, wherein said article of manufacture is suitable for treating cancer in a patient.

BRIEF DESCRIPTION OF THE DRAWINGS

FIG. 1 is a pair of photographs of filter lift assays. Panel A (top) shows bacterial expression of both the heavy chain (right, "HA") and light chain (left, "K") of the Ab1 Fab. Panel B (bottom) depicts the binding of immobilized Ab1 Fab to biotinylated human ROR1 extracellular domain (huROR1-ECD).

FIG. 3 is a representative table showing amino acid representation at each position for H-CDR1 and H-CDR2 of Ab1 after site saturation mutagenesis.

FIG. 9 is a pair of graphs showing the binding of soluble Fab to huROR1-ECD as characterized by ELISA. Panel A (top) shows the binding of Ab1 Fab and variants with H-CDR1 amino acid substitution T32A in combination with L-CDR1 amino acid substitution A25P, L-CDR2 amino acid substitution T69H, or L-CDR2 amino acid substitution T69R. Panel B (bottom) shows the binding of Ab1 Fab and variants with H-CDR1 amino acid substitution T32A in combination with L-CDR2 amino acid substitution T69R, L-CDR1 amino acid substitution A25P and L-CDR2 amino acid substitution T69R, L-CDR1 amino acid substitutions A25P and K29S and L-CDR2 amino acid substitution T69R, L-CDR1 amino acid substitution K29E and L-CDR2 amino acid substitution T69R, or L-CDR1 amino acid substitution K29S and L2 amino acid substitution T69R.

FIG. 12 is a set of graphs showing binding to ROR1-transfected JeKo-1 cells of Ab1 Fab and variants (Panels A and B) and Ab1 scFv and variants (Panel C), as quantitated using flow cytometry.

DETAILED DESCRIPTION OF THE INVENTION

Figure 2:
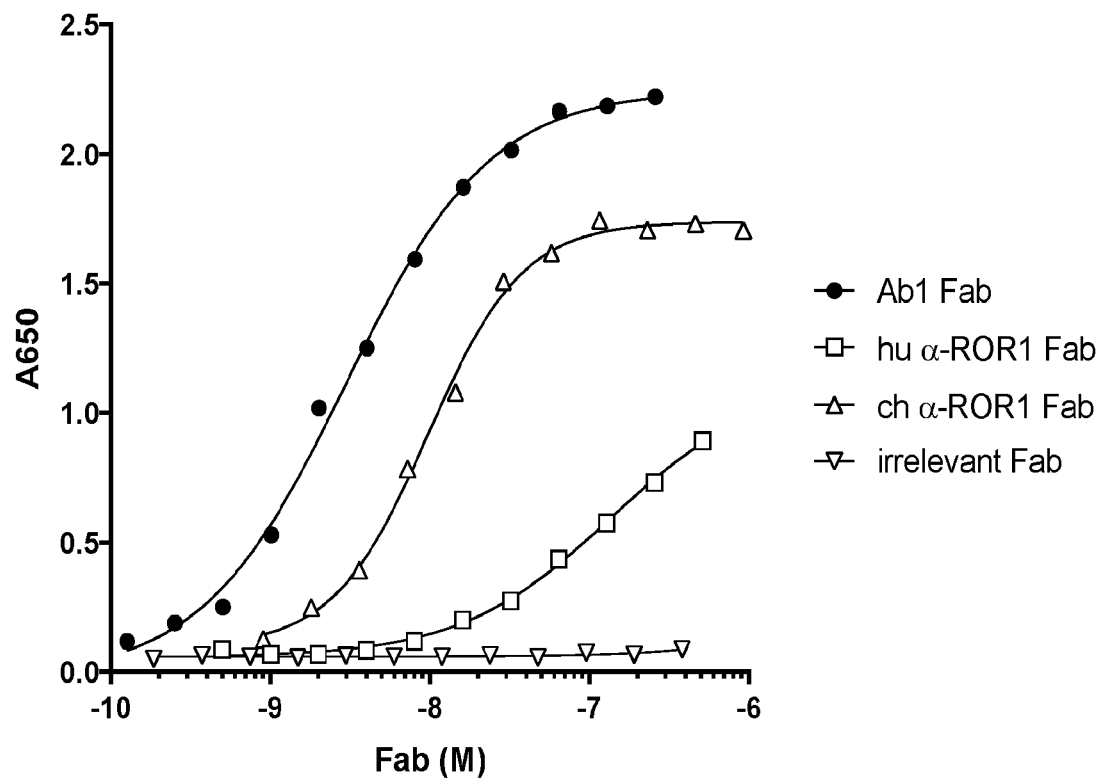
FIG. 2 is a graph showing the binding of immobilized huROR1-ECD by the Ab1 Fab and by control chimeric and humanized anti-ROR1 Fabs ("ch α-ROR1 Fab" and "hu α-ROR1 Fab," respectively) and a negative control Fab ("irrelevant Fab").

The present disclosure provides new anti-human ROR1 antibodies that can be used to suppress ROR1 activity in a patient, such as a cancer patient. Unless otherwise stated, as used herein, "ROR1" refers to human ROR1. A human ROR1 polypeptide sequence is available under UniProt Accession No. Q01973-1 (SEQ ID NO: 181).

The term "antibody" (Ab) or "immunoglobulin" (Ig), as used herein, refers to a tetramer comprising two heavy (H) chains (about 50-70 kDa) and two light (L) chains (about 25 kDa) interconnected by disulfide bonds. Each heavy chain is comprised of a heavy chain variable domain (VH) and a heavy chain constant region (CH). Each light chain is composed of a light chain variable domain (VL) and a light chain constant region (CL). The VH and VL domains can be subdivided further into regions of hypervariability, termed "complementarity determining regions" (CDRs), interspersed with regions that are more conserved, termed "framework regions" (FRs). Each VH and VL is composed of three CDRs (H-CDR herein designates a CDR from the heavy chain; and L-CDR herein designates a CDR from the light chain) and four FRs, arranged from amino-terminus to carboxyl-terminus in the following order: FR1, CDR1, FR2, CDR2, FR3, CDR3, FR4.

The assignment of amino acid numbers, and of FR and CDR regions, in the heavy or light chain may be in accordance with IMGT® definitions (EU numbering; Lefranc et al., *Dev Comp Immunol.* (2003) 27(1):55-77) or the definitions of Kabat, *Sequences of Proteins of Immunological Interest* (National Institutes of Health, Bethesda, Md. (1987 and 1991); Chothia & Lesk, *J. Mol. Biol.* (1987) 196:901-17; Chothia et al., Nature (1989) 342:878-83; MacCallum et al., *J. Mol. Biol.* (1996) 262:732-45; or Honegger and Plückthun, *J. Mol. Biol.* (2001) 309(3):657-70 ("AHo" numbering).

In some aspects, the anti-ROR1 antibody of the present disclosure is a monoclonal antibody. In some aspects, the anti-ROR1 antibody is a humanized antibody.

In some aspects, the anti-ROR1 antibody of the present disclosure is a recombinant antibody. The term "recombinant antibody" refers to an antibody that is expressed from a cell or cell line comprising the nucleotide sequence(s) that encode the antibody, wherein said nucleotide sequence(s) are not naturally associated with the cell.

In some aspects, the anti-ROR1 antibody of the present disclosure is an isolated antibody. The term "isolated protein", "isolated polypeptide" or "isolated antibody" refers to a protein, polypeptide or antibody that by virtue of its origin or source of derivation (1) is not associated with naturally associated components that accompany it in its native state, (2) is free of other proteins from the same species, (3) is expressed by a cell from a different species, and/or (4) does not occur in nature. Thus, a polypeptide that is chemically synthesized or synthesized in a cellular system different from the cell from which it naturally originates will be "isolated" from its naturally associated components. A protein may also be rendered substantially free of naturally associated components by isolation, using protein purification techniques well known in the art.

The term "affinity" refers to a measure of the attraction between an antigen and an antibody or an antigen-binding fragment thereof, or a related molecule such as a bispecific binding molecule. The intrinsic attractiveness of the antibody for the antigen is typically expressed as the binding affinity equilibrium constant ($K_D$) of a particular antibody-antigen interaction. An antibody is said to specifically bind to an antigen when the $K_D$ is ≤1 mM, preferably ≤100 nM. A $K_D$ binding affinity constant can be measured, e.g., by surface plasmon resonance (BIAcore™) or Bio-Layer Interferometry, for example using the IBIS MX96 SPR system from IBIS Technologies or the Octet™ system from ForteBio.

The term "epitope" as used herein refers to a portion (determinant) of an antigen that specifically binds to an antibody or a related molecule such as a bispecific binding molecule. Epitopic determinants generally consist of chemically active surface groupings of molecules such as amino acids or carbohydrate or sugar side chains and generally have specific three-dimensional structural characteristics, as well as specific charge characteristics. An epitope may be "linear" or "conformational." In a linear epitope, all of the points of interaction between a protein (e.g., an antigen) and an interacting molecule (such as an antibody) occur linearly along the primary amino acid sequence of the protein. In a conformational epitope, the points of interaction occur across amino acid residues on the protein that are separated from one another in the primary amino acid sequence. Once a desired epitope on an antigen is determined, it is possible to generate antibodies to that epitope using techniques well known in the art. For example, an antibody to a linear epitope may be generated, e.g., by immunizing an animal with a peptide having the amino acid residues of the linear epitope. An antibody to a conformational epitope may be generated, e.g., by immunizing an animal with a mini-domain containing the relevant amino acid residues of the conformational epitope. An antibody to a particular epitope can also be generated, e.g., by immunizing an animal with the target molecule of interest (e.g., ROR1) or a relevant portion thereof, then screening for binding to the epitope.

One can determine whether an antibody binds to the same epitope of ROR1 as or competes for binding with an antibody described herein by using methods known in the art, including, without limitation, competition assays, epitope binning, and alanine scanning. In some aspects, one allows an antibody described herein to bind to ROR1 under saturating conditions, and then measures the ability of the test antibody to bind to said antigen. If the test antibody is able to bind to said antigen at the same time as the reference antibody, then the test antibody binds to a different epitope than the reference antibody. However, if the test antibody is not able to bind to the antigen at the same time, then the test antibody binds to the same epitope, an overlapping epitope, or an epitope that is in close proximity to the epitope bound by the antibody described herein. This experiment can be performed using, e.g., ELISA, RIA, BIACORE™, SPR, Bio-Layer Interferometry or flow cytometry. To test whether an antibody described herein cross-competes with another antibody for binding to ROR1, one may use the competition method described above in two directions, i.e., determining if the known antibody blocks the test antibody and vice versa. Such cross-competition experiments may be performed, e.g., using an IBIS MX96 SPR instrument or the Octet™ system.

The term "antigen-binding portion" or "antigen-binding fragment" of an antibody, as used herein, refers to one or more portions or fragments of an antibody that retain the ability to specifically bind to an antigen (e.g., human ROR1, or a portion thereof). It has been shown that certain fragments of a full-length antibody can perform the antigen-binding function of the antibody. Examples of binding fragments encompassed within the term "antigen-binding portion" include (i) a Fab fragment: a monovalent fragment consisting of the VL, VH, CL and CH1 domains; (ii) a F(ab')2 fragment: a bivalent fragment comprising two Fab fragments linked by a disulfide bridge at the hinge region; (iii) an Fd fragment consisting of the VH and CH1 domains; (iv) a Fv fragment consisting of the VL and VH domains of a single arm of an antibody, (v) a dAb fragment, which consists of a VH domain; and (vi) an isolated complementarity determining region (CDR) capable of specifically binding to an antigen. Furthermore, although the two domains of the Fv fragment, VL and VH, are encoded by separate genes, they can be joined, using recombinant methods, by a synthetic linker that enables them to be made as a single protein chain in which the VL and VH domains pair to form monovalent molecules known as single chain variable fragments (scFvs). Also within the present disclosure are antigen-binding molecules comprising a VH and/or a VL. In the case of a VH, the molecule may also comprise one or more of a CH1, hinge, CH2, or CH3 region. Such single chain antibodies are also intended to be encompassed within the term "antigen-binding portion" of an antibody. Other forms of single chain antibodies, such as diabodies, are also encompassed. Diabodies are bivalent, bispecific antibodies in which VH and VL domains are expressed on a single polypeptide chain, but using a linker that is too short to allow for pairing between the two domains on the same chain, thereby forcing the domains to pair with complementary domains of another chain and creating two antigen-binding sites.

In certain aspects, an antigen-binding portion of the present disclosure is a single-chain antibody fragment comprising a variable heavy chain region and/or a variable light chain region, such as an scFv. To create an scFv, VH- and VL-encoding DNA fragments are operatively linked to another fragment encoding a flexible linker, such that the VH and VL sequences can be expressed as a contiguous single-chain protein, with the VL and VH domains joined by the flexible linker. In certain aspects, the flexible linker may have the amino acid sequence (Gly$_4$Ser)$_3$ (SEQ ID NO: 180).

Unless otherwise indicated, all antibody amino acid residue numbers referred to in this disclosure are those under the AHo numbering scheme.

Anti-ROR1 Antibodies

The present disclosure is based on the discovery that certain variant antibodies of a parent humanized anti-ROR1 antibody ("Ab1") have superior binding affinity for human ROR1 as compared to the parent antibody, which comprises the amino acid sequences shown below (CDRs underlined in the VH and VL sequences):

```
Ab1 VH
                                              (SEQ ID NO: 4)
QVQLQESGPG LVKPSQTLSL TCTVSGYAFT AYNIHWVRQA

PGQGLEWMGS FDPYDGGSSY NQKFKDRLTI SKDTSKNQVV

LTMTNMDPVD TATYYCARGW YYFDYWGHGT LVTVSS

Ab1 VL
                                              (SEQ ID NO: 2)
DIVMTQTPLS LPVTPGEPAS ISCRASKSIS KYLAWYQQKP

GQAPRLLIYS GSTLQSGIPP RFSGSGYGTD FTLTINNIES

EDAAYYFCQQ HDESPYTFGE GTKVEIK
```

| Description | Sequence | SEQ ID NO |
|---|---|---|
| H-CDR1 | GYAFTAYNIH | SEQ ID NO: 13 |
| H-CDR2 | SFDPYDGGSSYNQKFKD | SEQ ID NO: 42 |
| H-CDR3 | ARGWYYFDY | SEQ ID NO: 89 |
| L-CDR1 | RASKSISKYLA | SEQ ID NO: 101 |

-continued

| Description | Sequence | SEQ ID NO |
|---|---|---|
| L-CDR2 | SGSTLQS | SEQ ID NO: 114 |
| L-CDR3 | QQHDESPYT | SEQ ID NO: 123 |
| H-FR1 | QVQLQESGPGLVKPSQTLSL TCTVS | SEQ ID NO: 172 |
| H-FR2 | WVRQAPGQGLEWMG | SEQ ID NO: 173 |
| H-FR3 | RLTISKDTSKNQVVLTMTNM DPVDTATYYC | SEQ ID NO: 174 |
| H-FR4 | WGHGTLVTVSS | SEQ ID NO: 175 |
| L-FR1 | DIVMTQTPLSLPVTPGEPAS ISC | SEQ ID NO: 176 |
| L-FR2 | WYQQKPGQAPRLLIY | SEQ ID NO: 177 |
| L-FR3 | GIPPRFSGSGYGTDFTLTIN NIESEDAAYYFC | SEQ ID NO: 178 |
| L-FR4 | FGEGTKVEIK | SEQ ID NO: 179 |

Certain therapeutic modalities may benefit from using smaller, monovalent versions of Ab1 rather than the intact IgG1 antibody. Such smaller versions may include, e.g., Fab constructs and even smaller scFv binding formats. However, a limitation of such monovalent formats is that the higher binding achieved through the bivalent interaction of IgG with cell surface ROR1 (avidity) is lost. One approach to addressing the loss of binding avidity is to engineer a higher affinity version of Ab1. Additionally, it is possible that enhanced tumor targeting and cytotoxicity could be achieved with higher affinity IgG variants of Ab1. Accordingly, the present disclosure provides novel antibodies directed against ROR1, and antigen-binding portions thereof, that are higher affinity variants of Ab1.

In some aspects, the anti-ROR1 antibody or antigen-binding portion has VH and VL amino acid sequences that comprise, in total, at least one, two, three, four, five, six, seven, or eight amino acid substitutions from the VH and VL amino acid sequences of Ab1. In certain aspects, the VH and VL amino acid sequences comprise, in total, one amino acid substitution from the VH and VL amino acid sequences of Ab1. In certain aspects, the VH and VL amino acid sequences comprise, in total, two amino acid substitutions from the VH and VL amino acid sequences of Ab1.

In some aspects, the amino acid substitution(s) are not in H-CDR3 or L-CDR3. In some aspects, the amino acid substitution(s) are in H-CDR1, H-CDR2, L-CDR1, and/or L-CDR2, or any combination thereof (e.g., H-CDR1 alone, or H-CDR1 and L-CDR2). The CDRs may be delineated by the Kabat, Chothia, IMGT, contact, or AHo method, or any combination thereof. In certain aspects, the heavy chain CDRs are delineated by a combination of Kabat and IMGT definitions. In certain aspects, the light chain CDRs are delineated by the Kabat definition.

In some aspects, the amino acid substitution(s) are in:
H-CDR1, at residue 27, 29, 30, 31, 32, 33, 39, 40, 41, and/or 42;
H-CDR2, at residue 57, 58, 59, 60, 65, 66, 67, 68, 69, 70, 71, 72, 73, 75, and/or 76;
H-CDR3, at residue 107, 108, 110, 111, 136, and/or 138;
L-CDR1, at residue 25, 29, 30, 31, 32, and/or 41;
L-CDR2, at residue 68, 69, 70, and/or 71;

L-CDR3, at residue 107, 108, 109, 110, 111, 135, 137, and/or 138; or any combination of the above;

wherein the residues are numbered according to the AHo system.

In some aspects, the amino acid substitution(s) are in:

H-CDR1, at residue 32;

H-CDR2, at residue 69 and/or residue 71;

L-CDR1, at residue 25 and/or 29;

L-CDR2, at residue 69 and/or 70; or any combination of the above;

wherein the residues are numbered according to the AHo system.

In some aspects, the anti-ROR1 antibody or antigen-binding portion of the present disclosure comprises the CDR amino acid sequences, the heavy and light variable domain amino acid sequences, or the heavy and light chain amino acid sequences of Ab1 with any combination of the mutations described in Tables 1-7 of the Examples.

In some aspects, the anti-ROR1 antibody or antigen-binding portion of the present disclosure comprises:

a VH comprising the amino acid sequence of SEQ ID NO: 4 with a mutation selected from G27D, G27N, G27R, G27T, Y29G, Y29K, Y29S, A30I, A30P, A30R, A30T, F31I, F31L, F31V, F31W, T32A, T32D, T32E, A33M, A33S, Y39F, Y39W, N40K, N40P, N40R, I41L, I41V, H42Q, S57A, S57K, S57R, S57T, F58I, F58P, F58V, D59S, P60G, P60T, D65E, D65N, D65T, G66D, G66E, G66H, G66N, G67H, G67K, G67M, G67P, G67Q, G67R, G67S, G67Y, S68A, S68E, S68I, S68Q, S68T, S69E, S69K, S69V, Y70I, Y70V, N71A, N71G, N71H, N71S, Q72N, Q72P, K73C, K73S, K75A, K75G, D76V, A107T, A107V, R108G, W110C, W110F, Y111A, Y111L, F136L, Y138Q, Y138T, and Y138V, or any combination thereof; and a VL comprising the amino acid sequence of SEQ ID NO: 2;

a VH comprising the amino acid sequence of SEQ ID NO: 4; and a VL comprising the amino acid sequence of SEQ ID NO: 2 with a mutation selected from A25P, K29E, K29S, S30A, S30F, S30H, S30P, I31V, S32A, S32I, L41M, L41V, S68G, S68R, T69H, T69R, L70H, L70K, Q71T, Q71V, Q107S, Q108A, Q108L, Q108R, H109N, H109Q, D110H, D110N, E111I, E111L, S135G, S135H, S135P, S135V, Y137T, Y137V, T138F, and T138S, or any combination thereof; or a VH comprising the amino acid sequence of SEQ ID NO: 4 with a mutation selected from G27D, G27N, G27R, G27T, Y29G, Y29K, Y29S, A30I, A30P, A30R, A30T, F31I, F31L, F31V, F31W, T32A, T32D, T32E, A33M, A33S, Y39F, Y39W, N40K, N40P, N40R, I41L, I41V, H42Q, S57A, S57K, S57R, S57T, F58I, F58P, F58V, D59S, P60G, P60T, D65E, D65N, D65T, G66D, G66E, G66H, G66N, G67H, G67K, G67M, G67P, G67Q, G67R, G67S, G67Y, S68A, S68E, S68I, S68Q, S68T, S69E, S69K, S69V, Y70I, Y70V, N71A, N71G, N71H, N71S, Q72N, Q72P, K73C, K73S, K75A, K75G, D76V, A107T, A107V, R108G, W110C, W110F, Y111A, Y111L, F136L, Y138Q, Y138T, and Y138V, or any combination thereof; and a VL comprising the amino acid sequence of SEQ ID NO: 2 with a mutation selected from A25P, K29E, K29S, S30A, S30F, S30H, S30P, I31V, S32A, S32I, L41M, L41V, S68G, S68R, T69H, T69R, L70H, L70K, Q71T, Q71V, Q107S, Q108A, Q108L, Q108R, H109N, H109Q, D110H, D110N, E111I, E111L, S135G, S135H, S135P, S135V, Y137T, Y137V, T138F, and T138S, or any combination thereof.

For example, in some aspects, the anti-ROR1 antibody or antigen-binding portion of the present disclosure comprises:

a VH comprising the amino acid sequence of SEQ ID NO: 4 with a mutation selected from T32A/E, F58I/V, G66E, G67P/Q, S69E/VV, N71A/H, and Q72P, or any combination thereof; and a VL comprising the amino acid sequence of SEQ ID NO: 2;

a VH comprising the amino acid sequence of SEQ ID NO: 4; and a VL comprising the amino acid sequence of SEQ ID NO: 2 with a mutation selected from A25P, K29E/S, T69H/R, L70H/K, and Q71T, or any combination thereof; or a VH comprising the amino acid sequence of SEQ ID NO: 4 with a mutation selected from T32A/E, F58I/V, G66E, G67P/Q, S69E/V, N71A/H, and Q72P, or any combination thereof; and a VL comprising the amino acid sequence of SEQ ID NO: 2 with a mutation selected from A25P, K29E/S, T69H/R, L70H/K, and Q71T, or any combination thereof.

In some aspects, the anti-ROR1 antibody or antigen-binding portion of the present disclosure comprises:

a VH comprising the amino acid sequence of SEQ ID NO: 4 with a mutation selected from T32A/E, S69V/E, and N71H, or any combination thereof; and a VL comprising the amino acid sequence of SEQ ID NO: 2;

a VH comprising the amino acid sequence of SEQ ID NO: 4; and a VL comprising the amino acid sequence of SEQ ID NO: 2 with a mutation selected from A25P, K29E/S, T69H/R, L70K, and Q71T, or any combination thereof; or a VH comprising the amino acid sequence of SEQ ID NO: 4 with a mutation selected from T32A/E, S69V/E, and N71H, or any combination thereof; and a VL comprising the amino acid sequence of SEQ ID NO: 2 with a mutation selected from A25P, K29E/S, T69H/R, L70K, and Q71T, or any combination thereof.

In some aspects, the anti-ROR1 antibody or antigen-binding portion of the present disclosure comprises a VL comprising the amino acid sequence of SEQ ID NO: 2, and a VH comprising the amino acid sequence of SEQ ID NO: 4 with a mutation selected from:

a) T32A or T32E;

b) F58I or F58V;

c) G66E;

d) G67P or G67Q;

e) S69V or S69E;

f) N71A or N71H;

g) Q72P; or h) any combination of a)-g).

For example, the VH may comprise the amino acid sequence of SEQ ID NO: 4 with i) one or more mutations selected from T32E, S69V/E, and N71H, or ii) the mutation T32A and one or both mutations selected from S69V/E, and N71H (i.e., S69V; S69E; N71H; S69V and N71H; or S69E and N71H).

In some aspects, the anti-ROR1 antibody or antigen-binding portion of the present disclosure comprises a VH comprising the amino acid sequence of SEQ ID NO: 4, and a VL comprising the amino acid sequence of SEQ ID NO: 2 with a mutation selected from:

a) A25P;

b) K29E or K29S;

c) T69H or T69R;

d) L70H or L70K;

e) Q71T; or f) any combination of a)-e).

In some aspects, the anti-ROR1 antibody or antigen-binding portion of the present disclosure comprises:
a) a VH comprising the amino acid sequence of SEQ ID NO: 4 with a mutation selected from:
  i) T32A or T32E;
  ii) F58I or F58V;
  iii) G66E;
  iv) G67P or G67Q;
  v) S69V or S69E;
  vi) N71A or N71H;
  vii) Q72P; or
  viii) any combination of i)-vii); and
b) a VL comprising the amino acid sequence of SEQ ID NO: 2 with a mutation selected from:
  i) A25P;
  ii) K29E or K29S;
  iii) T69H or T69R;
  iv) L70H or L70K;
  v) Q71T; or
  vi) any combination of i)-v).

For example, the VH may comprise the amino acid sequence of SEQ ID NO: 4 with
i) one or more mutations selected from T32E, S69V/E, and N71H, or
ii) the mutation T32A and one or both mutations selected from S69V/E and N71H, and the VL may comprise the amino acid sequence of SEQ ID NO: 2 with one or more mutations selected from A25P, K29E/S, T69H/R, L70K, and Q71T.

As another example, the VH may comprise the amino acid sequence of SEQ ID NO: 4 comprising the mutation T32A and the VL may comprise the amino acid sequence of SEQ ID NO: 2 with
i) one or more mutations selected from A25P, K29E/S, T69H, L70K, and Q71T, or
ii) the mutation T69R and one or more mutations selected from A25P, K29E/S, L70K, and Q71T.

In some aspects, the anti-ROR1 antibody or antigen-binding portion of the present disclosure comprises:
a) a VH comprising the amino acid sequence of SEQ ID NO: 4 with the mutation T32A, and a VL comprising the amino acid sequence of SEQ ID NO: 2;
b) a VH comprising the amino acid sequence of SEQ ID NO: 4 with the mutation T32E, and a VL comprising the amino acid sequence of SEQ ID NO: 2;
c) a VH comprising the amino acid sequence of SEQ ID NO: 4 with the mutation F58I, and a VL comprising the amino acid sequence of SEQ ID NO: 2;
d) a VH comprising the amino acid sequence of SEQ ID NO: 4 with the mutation F58V, and a VL comprising the amino acid sequence of SEQ ID NO: 2;
e) a VH comprising the amino acid sequence of SEQ ID NO: 4 with the mutation G66E, and a VL comprising the amino acid sequence of SEQ ID NO: 2;
f) a VH comprising the amino acid sequence of SEQ ID NO: 4 with the mutation G67P, and a VL comprising the amino acid sequence of SEQ ID NO: 2;
g) a VH comprising the amino acid sequence of SEQ ID NO: 4 with the mutation G67Q, and a VL comprising the amino acid sequence of SEQ ID NO: 2;
h) a VH comprising the amino acid sequence of SEQ ID NO: 4 with the mutation S69E, and a VL comprising the amino acid sequence of SEQ ID NO: 2;
i) a VH comprising the amino acid sequence of SEQ ID NO: 4 with the mutation S69V, and a VL comprising the amino acid sequence of SEQ ID NO: 2;
j) a VH comprising the amino acid sequence of SEQ ID NO: 4 with the mutation N71A, and a VL comprising the amino acid sequence of SEQ ID NO: 2;
k) a VH comprising the amino acid sequence of SEQ ID NO: 4 with the mutation N71H, and a VL comprising the amino acid sequence of SEQ ID NO: 2;
l) a VH comprising the amino acid sequence of SEQ ID NO: 4 with the mutation Q72P, and a VL comprising the amino acid sequence of SEQ ID NO: 2;
m) a VH comprising the amino acid sequence of SEQ ID NO: 4 with the mutation Q72P, and a VL comprising the amino acid sequence of SEQ ID NO: 2;
n) a VH comprising the amino acid sequence of SEQ ID NO: 4 with the mutations T32A and F58V, and a VL comprising the amino acid sequence of SEQ ID NO: 2;
o) a VH comprising the amino acid sequence of SEQ ID NO: 4 with the mutations T32A, F58I, G66E, and N71H, and a VL comprising the amino acid sequence of SEQ ID NO: 2;
p) a VH comprising the amino acid sequence of SEQ ID NO: 4 with the mutations T32A, G66E, S69V, and N71H, and a VL comprising the amino acid sequence of SEQ ID NO: 2;
q) a VH comprising the amino acid sequence of SEQ ID NO: 4, and a VL comprising the amino acid sequence of SEQ ID NO: 2 with the mutation A25P;
r) a VH comprising the amino acid sequence of SEQ ID NO: 4, and a VL comprising the amino acid sequence of SEQ ID NO: 2 with the mutation K29E;
s) a VH comprising the amino acid sequence of SEQ ID NO: 4, and a VL comprising the amino acid sequence of SEQ ID NO: 2 with the mutation K29S;
t) a VH comprising the amino acid sequence of SEQ ID NO: 4, and a VL comprising the amino acid sequence of SEQ ID NO: 2 with the mutation T69H;
u) a VH comprising the amino acid sequence of SEQ ID NO: 4, and a VL comprising the amino acid sequence of SEQ ID NO: 2 with the mutation T69R;
v) a VH comprising the amino acid sequence of SEQ ID NO: 4, and a VL comprising the amino acid sequence of SEQ ID NO: 2 with the mutation L70H;
w) a VH comprising the amino acid sequence of SEQ ID NO: 4, and a VL comprising the amino acid sequence of SEQ ID NO: 2 with the mutation L70K;
x) a VH comprising the amino acid sequence of SEQ ID NO: 4, and a VL comprising the amino acid sequence of SEQ ID NO: 2 with the mutation Q71T;
y) a VH comprising the amino acid sequence of SEQ ID NO: 4 with the mutation T32A, and a VL comprising the amino acid sequence of SEQ ID NO: 2 with the mutation A25P;
z) a VH comprising the amino acid sequence of SEQ ID NO: 4 with the mutation T32A, and a VL comprising the amino acid sequence of SEQ ID NO: 2 with the mutation T69H;
aa) a VH comprising the amino acid sequence of SEQ ID NO: 4 with the mutation T32A, and a VL comprising the amino acid sequence of SEQ ID NO: 2 with the mutation T69R;
bb) a VH comprising the amino acid sequence of SEQ ID NO: 4 with the mutation T32A, and a VL comprising the amino acid sequence of SEQ ID NO: 2 with the mutations A25P and T69R;
cc) a VH comprising the amino acid sequence of SEQ ID NO: 4 with the mutation T32A, and a VL comprising the amino acid sequence of SEQ ID NO: 2 with the mutations K29S and T69R;

dd) a VH comprising the amino acid sequence of SEQ ID NO: 4 with the mutation T32A, and a VL comprising the amino acid sequence of SEQ ID NO: 2 with the mutations T69R and Q71T; or ee) a VH comprising the amino acid sequence of SEQ ID NO: 4 with the mutation T32A, and a VL comprising the amino acid sequence of SEQ ID NO: 2 with the mutations A25P and L70K.

In any of the above aspects, the VH may further comprise mutation W110F, W110H, W110M, or W110Y. In certain aspects, said mutation may increase target binding, increase antibody stability, reduce aggregation, or any combination thereof.

In some aspects, the anti-ROR1 antibody or antigen-binding portion of the present disclosure comprises an H-CDR3 amino acid sequence of SEQ ID NO: 89 and an L-CDR3 amino acid sequence of SEQ ID NO: 123, and further comprises:
- an H-CDR1 amino acid sequence of SEQ ID NO: 13, 29, 31, 35, or 40;
- an H-CDR2 amino acid sequence of SEQ ID NO: 42, 47, 49, 57, 58, 63, 64, 65, 68, 73, 75, 76, 77, 78, 79, 80, 81, 82, 83, or 88;
- an L-CDR1 amino acid sequence of SEQ ID NO: 101, 102, 103, 104, 105, 107, 110, 112, or 113;
- an L-CDR2 amino acid sequence of SEQ ID NO: 114, 117, 118, 119, 120, 121, or 122; or
- any combination of the above H-CDR1, H-CDR2, L-CDR1, and L-CDR2 amino acid sequences, wherein the antibody does not comprise heavy chain (H)-CDR1-3 amino acid sequences of SEQ ID NOs: 13, 42, and 89, respectively, and light chain (L)-CDR1-3 amino acid sequences of SEQ ID NOs: 101, 114, and 123, respectively. In certain aspects, the VH of the anti-ROR1 antibody or antigen-binding portion further comprises the FR1, FR2, FR3, and FR4 amino acid sequences of SEQ ID NOs: 172-175, respectively, and the VL further comprises the FR1, FR2, FR3, and FR4 amino acid sequences of SEQ ID NOs: 176-179, respectively.

In some aspects, the anti-ROR1 antibody or antigen-binding portion of the present disclosure comprises an H-CDR3 amino acid sequence of SEQ ID NO: 89 and an L-CDR3 amino acid sequence of SEQ ID NO: 123, and further comprises:
- an H-CDR1 amino acid sequence of SEQ ID NO: 13, 29 or 31;
- an H-CDR2 amino acid sequence of SEQ ID NO: 42, 47, 49, 57, 63, 64, 73, 75, 78, 80, or 83;
- an L-CDR1 amino acid sequence of SEQ ID NO: 101, 102, 103, or 104;
- an L-CDR2 amino acid sequence of SEQ ID NO: 114, 117, 118, 119, 120, or 121; or
- any combination of the above H-CDR1, H-CDR2, L-CDR1, and L-CDR2 amino acid sequences, wherein the antibody does not comprise heavy chain (H)-CDR1-3 amino acid sequences of SEQ ID NOs: 13, 42, and 89, respectively, and light chain (L)-CDR1-3 amino acid sequences of SEQ ID NOs: 101, 114, and 123, respectively. In certain aspects, the VH of the anti-ROR1 antibody or antigen-binding portion further comprises the amino acid sequences of SEQ ID NOs: 172-175 and the VL further comprises the amino acid sequences of SEQ ID NOs: 176-179.

In some aspects, the anti-ROR1 antibody or antigen-binding portion of the present disclosure comprises heavy chain (H)-CDR1-3 and light chain (L)-CDR1-3 comprising the amino acid sequences of:

SEQ ID NOs: 29, 42, 89, 101, 114, and 123, respectively;
SEQ ID NOs: 31, 42, 89, 101, 114, and 123, respectively;
SEQ ID NOs: 31, 47, 89, 101, 114, and 123, respectively;
SEQ ID NOs: 31, 49, 89, 101, 114, and 123, respectively;
SEQ ID NOs: 31, 57, 89, 101, 114, and 123, respectively;
SEQ ID NOs: 31, 63, 89, 101, 114, and 123, respectively;
SEQ ID NOs: 31, 64, 89, 101, 114, and 123, respectively;
SEQ ID NOs: 13, 73, 89, 101, 114, and 123, respectively;
SEQ ID NOs: 13, 75, 89, 101, 114, and 123, respectively;
SEQ ID NOs: 13, 78, 89, 101, 114, and 123, respectively;
SEQ ID NOs: 13, 80, 89, 101, 114, and 123, respectively;
SEQ ID NOs: 13, 83, 89, 101, 114, and 123, respectively;
SEQ ID NOs: 13, 42, 89, 102, 114, and 123, respectively;
SEQ ID NOs: 13, 42, 89, 103, 114, and 123, respectively;
SEQ ID NOs: 13, 42, 89, 104, 114, and 123, respectively;
SEQ ID NOs: 13, 42, 89, 101, 117, and 123, respectively;
SEQ ID NOs: 13, 42, 89, 101, 118, and 123, respectively;
SEQ ID NOs: 13, 42, 89, 101, 119, and 123, respectively;
SEQ ID NOs: 13, 42, 89, 101, 120, and 123, respectively;
SEQ ID NOs: 13, 42, 89, 101, 121, and 123, respectively;
SEQ ID NOs: 29, 49, 89, 101, 114, and 123, respectively;
SEQ ID NOs: 29, 161, 89, 101, 114, and 123, respectively;
SEQ ID NOs: 29, 166, 89, 101, 114, and 123, respectively;
SEQ ID NOs: 29, 42, 89, 102, 114, and 123, respectively;
SEQ ID NOs: 29, 42, 89, 101, 117, and 123, respectively;
SEQ ID NOs: 29, 42, 89, 101, 118, and 123, respectively;
SEQ ID NOs: 29, 42, 89, 102, 118, and 123, respectively;
SEQ ID NOs: 29, 42, 89, 103, 118, and 123, respectively;
SEQ ID NOs: 29, 42, 89, 101, 147, and 123, respectively; or
SEQ ID NOs: 29, 42, 89, 102, 120, and 123, respectively.

In certain aspects, the VH of the anti-ROR1 antibody or antigen-binding portion further comprises the amino acid sequences of SEQ ID NOs: 172-175 and the VL further comprises the amino acid sequences of SEQ ID NOs: 176-179.

In any of the above aspects, the H-CDR3 amino acid sequence of SEQ ID NO: 89 may be replaced by the amino acid sequence of SEQ ID NO: 94, 169, 170, or 171. In certain aspects, said replacement may increase target binding, increase antibody stability, reduce aggregation, or any combination thereof.

In some aspects, the anti-ROR1 antibody or antigen-binding portion of the present disclosure comprises a heavy chain variable domain (VH) amino acid sequence of SEQ ID NO: 5 and a light chain variable domain (VL) amino acid sequence of SEQ ID NO: 2.

In some aspects, the anti-ROR1 antibody or antigen-binding portion of the present disclosure comprises a heavy chain variable domain (VH) amino acid sequence of SEQ ID NO: 5 and a light chain variable domain (VL) amino acid sequence of SEQ ID NO: 6.

The class of an anti-ROR1 antibody obtained by the methods described herein may be changed or switched with another class or subclass. In some aspects of the present disclosure, a nucleic acid molecule encoding VL or VH is isolated using methods well known in the art such that it does not include nucleic acid sequences encoding CL or CH, respectively. The nucleic acid molecules encoding VL or VH then are operatively linked to a nucleic acid sequence encoding a CL or CH, respectively, from a different class of immunoglobulin molecule. This may be achieved using a vector or nucleic acid molecule that comprises a CL or CH chain, as described above. For example, an anti-ROR1 antibody that was originally IgM may be class switched to IgG. Further, the class switching may be used to convert one IgG subclass to another, e.g., from $IgG_1$ to $IgG_2$. A κ light chain constant region can be changed, e.g., to a λ light chain constant region, or vice-versa. An exemplary method for producing an antibody of the present disclosure with a desired Ig isotype comprises the steps of isolating a nucleic acid molecule encoding the heavy chain of an anti-ROR1 antibody and a nucleic acid molecule encoding the light chain of an anti-ROR1 antibody, obtaining the variable domain of the heavy chain, ligating a coding sequence for the variable domain of the heavy chain with a coding sequence for the constant region of a heavy chain of the desired isotype, expressing the light chain and the heavy chain encoded by the ligated sequence in a cell, and collecting the anti-ROR1 antibody with the desired isotype.

The anti-ROR1 antibody of the present disclosure can be an IgG, an IgM, an IgE, an IgA, or an IgD molecule, but is typically of the IgG isotype, e.g., of IgG subclass $IgG_1$, $IgG_2a$ or $IgG_2b$, $IgG_3$ or $IgG_4$. In some aspects, the antibody is of the isotype subclass $IgG_1$.

In some aspects, the anti-ROR1 antibody may comprise at least one mutation in the Fc region. A number of different Fc mutations are known, where these mutations alter the antibody's effector function. For example, in many cases it will be desirable to reduce or eliminate effector function, e.g., where ligand/receptor interactions are undesired or in the case of antibody-drug conjugates. In particular aspects, the antibody may comprise an IgG constant region that includes mutations that reduce or eliminate effector function (see, e.g., Wang et al., *Protein Cell* (2018) 9(1):63-73). For example, an anti-ROR1 antibody of the present disclosure may comprise a human IgG1 constant region with the mutation L235E, "LALA" mutations (L234A/L235A), or "LALAGA" mutations (L234A/L235A/G237A), all numbered according to the EU numbering scheme.

In some cases, it will be desirable to increase effector function, including antibody-dependent cell-mediated cytotoxicity (ADCC), antibody-dependent cell-mediated phagocytosis (ADCP), and complement-dependent cytotoxicity (CDC) (see, e.g., Wang et al., *Protein Cell* (2018) 9(1):63-73). For example, an anti-ROR1 antibody of the present disclosure may comprise a human IgG1 constant region with any one of the following sets of mutations to enhance ADCC: F234L/R292P/Y300L/V305I/P396L, S293D/I332E, S239D/I332E/A330L, S298A/E333A/K334A, or L234Y/L235Q/G236W/S239M/H268D/D270E/S298A in one heavy chain and D270E/K326D/A330M/K334E in the other heavy chain, all numbered according to the EU numbering scheme. In some cases, an anti-ROR1 antibody of the present disclosure may comprise a human IgG1 constant region with the following mutations to enhance ADCP: G236A/S239D/I332E or any one set of the following mutations to enhance CDC: K326W/E333S, S267E/H268F/S324T, IgG1/IgG3 cross subclass (Natsume et al., *Cancer Res.* (2008) 68:3863-3872), or E345R/E430G/S440Y, all numbered according to the EU numbering scheme.

In some cases, it may also be beneficial to incorporate Fc mutations that increase the serum half-life of the antibody. For example, in some cases, an anti-ROR1 antibody of the present disclosure may comprise a human IgG1 constant region with either of the following sets of mutations to enhance FcRn binding at pH 6.0 and increase the antibody half-life: M252Y/S254T/T256E or M428L/N434S, all numbered according to the EU numbering scheme.

In some aspects, the anti-ROR1 antigen-binding portion of the present disclosure may be, e.g., an scFv, a Fab fragment; a F(ab')2 fragment; an Fd fragment; an Fv fragment; a dAb fragment; a diabody, or an isolated CDR capable of specifically binding to human ROR1. In certain aspects, modified antibodies may be prepared using anti-ROR1 antibody-encoding nucleic acid molecules. For instance, "kappa bodies" (Ill et al., *Protein Eng.* (1997) 10:949-57), "minibodies" (Martin et al., *EMBO J.* (1994) 13:5303-9), "diabodies" (Holliger et al., *Proc. Natl. Acad. Sci. USA* (1993) 90:6444-8), or "Janusins" (Traunecker et al., *EMBO J.* (1991) 10:3655-3659 and Traunecker et al., *Int. J. Cancer* (Suppl.) (1992) 7:51-2) may be prepared using standard molecular biological techniques following the teachings of the specification.

In certain aspects, the anti-ROR1 antigen-binding portion is an scFv. The scFv may comprise, e.g., the six CDRs, or the VH and VL, of an anti-ROR1 antibody described herein. The VH and VL of the scFv may be joined by a flexible linker, e.g., comprising the amino acid sequence of SEQ ID NO: 180. In particular aspects, the scFv comprises the amino acid sequence of SEQ ID NO: 10 or 12.

In some aspects, the anti-ROR1 antibody or antigen-binding portion of the present disclosure has one, two, three, four, or five properties selected from:
  competes for binding with, or binds to the same epitope of human ROR1 as, Ab1;
  binds to human ROR1 with greater affinity than Ab1 (e.g., with a $K_D$ that is less than 10%, 20%, 30%, 40%, 50%, 60%, 70%, 80%, 90% or 95% of the $K_D$ of Ab1 as determined by ELISA);
  binds to human ROR1 with a $K_D$ of 5.0, 4.5, 4.0, 3.5, 3.0, 2.5, 2.0, 1.5, or 1.0 nM or less as determined by ELISA;
  binds to ROR1-transfected MEC cells with greater affinity than an antibody with a VH comprising the amino acid sequence of SEQ ID NO: 4 and a VL comprising the amino acid sequence of SEQ ID NO: 2 (e.g., Ab1) as assessed by flow cytometry; and
  binds to ROR1-transfected JeKo-1 cells with greater affinity than an antibody with a VH comprising the amino acid sequence of SEQ ID NO: 4 and a VL comprising the amino acid sequence of SEQ ID NO: 2 (e.g., Ab1) as assessed by flow cytometry.
In certain aspects, the anti-ROR1 antibody or antigen-binding portion has all of said properties.

An anti-ROR1 antibody or antigen-binding portion of the present disclosure can be derivatized or linked to another molecule (e.g., another peptide or protein). In general, the antibodies or portions thereof are derivatized such that ROR1 binding is not affected adversely by the derivatization or labeling. Accordingly, the antibodies and antibody portions of the present disclosure are intended to include both intact and modified forms of the anti-ROR1 antibodies and portions described herein. For example, an antibody or antibody portion of the present disclosure can be functionally linked (by chemical coupling, genetic fusion, noncovalent association or otherwise) to one or more other molecular entities, such as another antibody (e.g., to form a bispecific antibody or a diabody), a detection agent, a pharmaceutical agent, and/or a protein or peptide that can mediate association of the antibody or antibody portion with another molecule (such as a streptavidin core region or a polyhistidine tag).

One type of derivatized antibody is produced by cross-linking two or more antibodies (of the same type or of different types, e.g., to create bispecific antibodies). Suitable crosslinkers include those that are heterobifunctional, having two distinctly reactive groups separated by an appropriate spacer (e.g., m-maleimidobenzoyl-N-hydroxysuccinimide ester) or homobifunctional (e.g., disuccinimidyl suberate). Such linkers are available, e.g., from Pierce Chemical Company, Rockford, IL.

An anti-ROR1 antibody or antigen-binding portion thereof can also be derivatized with a chemical group such as polyethylene glycol (PEG), a methyl or ethyl group, or a carbohydrate group. These groups may be useful to improve the biological characteristics of the antibody, e.g., to increase serum half-life.

An antibody or antigen-binding portion according to the present disclosure may also be labeled. As used herein, the terms "label" or "labeled" refer to incorporation of another molecule in the antibody. In some aspects, the label is a detectable marker, e.g., incorporation of a radiolabeled amino acid or attachment to a polypeptide of biotinyl moieties that can be detected by marked avidin (e.g., streptavidin containing a fluorescent marker or enzymatic activity that can be detected by optical or colorimetric methods). In some aspects, the label or marker can be therapeutic, e.g., a drug conjugate or toxin. Various methods of labeling polypeptides and glycoproteins are known in the art and may be used. Examples of labels for polypeptides include, but are not limited to, the following: radioisotopes or radionuclides (e.g., 3H, 14C, 15N, 35S, 90Y, 99Tc, 111In, 125I, 131I), fluorescent labels (e.g., FITC, rhodamine, lanthanide phosphors), enzymatic labels (e.g., horseradish peroxidase, β-galactosidase, luciferase, alkaline phosphatase), chemiluminescent markers, biotinyl groups, predetermined polypeptide epitopes recognized by a secondary reporter (e.g., leucine zipper pair sequences, binding sites for secondary antibodies, metal binding domains, epitope tags), magnetic agents, such as gadolinium chelates, toxins such as pertussis toxin, taxol, cytochalasin B, gramicidin D, ethidium bromide, emetine, mitomycin, etoposide, tenoposide, vincristine, vinblastine, colchicine, doxorubicin, daunorubicin, dihydroxy anthracin dione, mitoxantrone, mithramycin, actinomycin D, 1-dehydrotestosterone, glucocorticoids, procaine, tetracaine, lidocaine, propranolol, and puromycin and analogs or homologs thereof. In some aspects, labels are attached by spacer arms of various lengths to reduce potential steric hindrance.

In certain aspects, the antibodies of the present disclosure may be present in a neutral form (including zwitter ionic forms) or as a positively or negatively-charged species. In some aspects, the antibodies may be complexed with a counterion to form a pharmaceutically acceptable salt.

Bispecific Binding Molecules

In a further aspect, the present disclosure provides a bispecific binding molecule having the binding specificity (e.g., comprising the antigen-binding portion, such as the six CDRs or the VH and VL) of an anti-ROR1 antibody described herein and the binding specificity of a second antibody. The second antibody may be, e.g., another anti-ROR1 antibody described herein, or an antibody that targets a different protein, such as a cancer antigen or another cell surface molecule whose activity mediates a disease condition such as cancer. Such bispecific binding molecules are known in the art.

In some aspects, the bispecific binding molecule comprises heavy chain (H)-CDR1-3 and light chain (L)-CDR1-3 comprising the amino acid sequences of:
  SEQ ID NOs: 29, 42, 89, 101, 114, and 123, respectively;
  SEQ ID NOs: 31, 42, 89, 101, 114, and 123, respectively;
  SEQ ID NOs: 31, 47, 89, 101, 114, and 123, respectively;
  SEQ ID NOs: 31, 49, 89, 101, 114, and 123, respectively;
  SEQ ID NOs: 31, 57, 89, 101, 114, and 123, respectively;
  SEQ ID NOs: 31, 63, 89, 101, 114, and 123, respectively;
  SEQ ID NOs: 31, 64, 89, 101, 114, and 123, respectively;
  SEQ ID NOs: 13, 73, 89, 101, 114, and 123, respectively;
  SEQ ID NOs: 13, 75, 89, 101, 114, and 123, respectively;
  SEQ ID NOs: 13, 78, 89, 101, 114, and 123, respectively;
  SEQ ID NOs: 13, 80, 89, 101, 114, and 123, respectively;
  SEQ ID NOs: 13, 83, 89, 101, 114, and 123, respectively;
  SEQ ID NOs: 13, 42, 89, 102, 114, and 123, respectively;
  SEQ ID NOs: 13, 42, 89, 103, 114, and 123, respectively;
  SEQ ID NOs: 13, 42, 89, 104, 114, and 123, respectively;
  SEQ ID NOs: 13, 42, 89, 101, 117, and 123, respectively;
  SEQ ID NOs: 13, 42, 89, 101, 118, and 123, respectively;
  SEQ ID NOs: 13, 42, 89, 101, 119, and 123, respectively;
  SEQ ID NOs: 13, 42, 89, 101, 120, and 123, respectively;
  SEQ ID NOs: 13, 42, 89, 101, 121, and 123, respectively;
  SEQ ID NOs: 29, 49, 89, 101, 114, and 123, respectively;
  SEQ ID NOs: 29, 161, 89, 101, 114, and 123, respectively;
  SEQ ID NOs: 29, 166, 89, 101, 114, and 123, respectively;
  SEQ ID NOs: 29, 42, 89, 102, 114, and 123, respectively;
  SEQ ID NOs: 29, 42, 89, 101, 117, and 123, respectively;
  SEQ ID NOs: 29, 42, 89, 101, 118, and 123, respectively;
  SEQ ID NOs: 29, 42, 89, 102, 118, and 123, respectively;
  SEQ ID NOs: 29, 42, 89, 103, 118, and 123, respectively;
  SEQ ID NOs: 29, 42, 89, 101, 147, and 123, respectively; or
  SEQ ID NOs: 29, 42, 89, 102, 120, and 123, respectively.

In certain aspects, the bispecific binding molecule further comprises the amino acid sequences of SEQ ID NOs: 172-179.

In some aspects, the bispecific binding molecule comprises the six CDR amino acid sequences, or the heavy and light chain variable domain amino acid sequences, of Ab1 with any one or combination of the mutations found in Tables 1-7 of the Examples.

In some aspects, the bispecific binding molecule comprises VH and VL amino acid sequences of SEQ ID NO: 5 and SEQ ID NO: 2, respectively, or SEQ ID NO: 5 and SEQ ID NO: 6, respectively.

Immunoconjugates

In a further aspect, the present disclosure provides an immunoconjugate comprising an anti-ROR1 antibody or antigen-binding portion described herein conjugated to a cytotoxic agent.

Chimeric Antigen Receptor-T Cells or -NK Cells

The present disclosure also contemplates the use of sequences (e.g., the six CDR or VH and VL sequences) of an anti-ROR1 antibody or antigen-binding portion described herein in the preparation of a chimeric antigen receptor (CAR). The CAR may further comprise, e.g., sequences encoding either a T-cell activating function (CAR-T) or an NK-cell activating function (CAR-NK).

Nucleic Acid Molecules and Vectors

The present disclosure also provides nucleic acid molecules and sequences encoding anti-ROR1 antibodies or antigen-binding portions described herein. In some aspects, different nucleic acid molecules encode the heavy chain and light chain amino acid sequences of the anti-ROR1 antibody or antigen-binding portion. In other aspects, the same nucleic acid molecule encodes the heavy chain and light chain amino acid sequences of the anti-ROR1 antibody or antigen-binding portion. The present disclosure thus provides an isolated nucleic acid molecule comprising a nucleotide sequence that encodes the heavy chain or an antigen-binding portion thereof, or a nucleotide sequence that encodes the light chain or an antigen-binding portion thereof, or both, of an anti-ROR1 antibody or antigen-binding portion described herein.

A reference to a nucleotide sequence encompasses its complement unless otherwise specified. Thus, a reference to a nucleic acid having a particular sequence should be understood to encompass its complementary strand, with its complementary sequence. The term "polynucleotide" as referred to herein means a polymeric form of nucleotides of at least 10 bases in length, either ribonucleotides or deoxynucleotides or a modified form of either type of nucleotide. The term includes single- and double-stranded forms.

In some aspects, the present disclosure provides a nucleic acid molecule comprising the nucleotide sequence of SEQ ID NO: 9 or 11.

In any of the above aspects, the nucleic acid molecules may be isolated. Nucleic acid molecules referred to herein as "isolated" or "purified" are nucleic acids which (1) have been separated away from the nucleic acids of the genomic DNA or cellular RNA of their source of origin; and/or (2) do not occur in nature.

The present disclosure further provides a vector comprising nucleic acid molecules that encode the heavy chain, the light chain, or both the heavy and light chains of an anti-ROR1 antibody as described herein or an antigen-binding portion thereof. In certain aspects, a vector of the present disclosure comprises a nucleic acid molecule as described herein. The vector may further comprise an expression control sequence.

The term "expression control sequence" as used herein means polynucleotide sequences that are necessary to effect the expression and processing of coding sequences to which they are ligated. Expression control sequences include appropriate transcription initiation, termination, promoter and enhancer sequences; efficient RNA processing signals such as splicing and polyadenylation signals; sequences that stabilize cytoplasmic mRNA; sequences that enhance translation efficiency (i.e., Kozak consensus sequence); sequences that enhance protein stability; and when desired, sequences that enhance protein secretion. The nature of such control sequences differs depending upon the host organism; in prokaryotes, such control sequences generally include promoter, ribosomal binding site, and transcription termination sequence; in eukaryotes, generally, such control sequences include promoters and transcription termination sequence. The term "control sequences" is intended to include, at a minimum, all components whose presence is essential for expression and processing, and can also include additional components whose presence is advantageous, for example, leader sequences and fusion partner sequences.

In further aspects of the present disclosure, nucleic acid molecules encoding the VH and/or VL of an anti-ROR1 antibody or antigen-binding portion described herein may be "converted" to full-length antibody genes. In some aspects, nucleic acid molecules encoding the VH or VL domains are converted to full-length antibody genes by insertion into an expression vector already encoding heavy chain constant (CH) or light chain constant (CL) regions, respectively, such that the VH segment is operatively linked to the CH segment(s) within the vector, and/or the VL segment is operatively linked to the CL segment within the vector. In some aspects, nucleic acid molecules encoding the VH and/or VL domains are converted into full-length antibody genes by linking, e.g., ligating, a nucleic acid molecule encoding a VH and/or VL domain to a nucleic acid molecule encoding a CH and/or CL region using standard molecular biological techniques. Nucleic acid molecules encoding the full-length heavy and/or light chains may then be expressed from a cell into which they have been introduced and the anti-ROR1 antibody or antigen-binding portion isolated.

In some aspects, the framework region(s) are mutated so that the resulting framework region(s) have the amino acid sequence of the corresponding germline gene. A mutation may be made in a framework region or constant region, e.g., to increase the half-life of the anti-ROR1 antibody. See, e.g., PCT Publication WO 00/09560. A mutation in a framework region or constant region also can be made to alter the immunogenicity of the antibody, and/or to provide a site for covalent or non-covalent binding to another molecule. According to the present disclosure, an antibody may have mutations in any one or more of the CDRs or framework regions of the variable domain or in the constant region.

Host Cells and Methods of Antibody Production

The present disclosure also provides methods for producing the antibodies and antigen-binding portions thereof described herein. In some aspects, the present disclosure provides a host cell comprising a nucleotide sequence that encodes the heavy chain or an antigen-binding portion thereof, and a nucleotide sequence that encodes the light chain or an antigen-binding portion thereof, of an anti-ROR1 antibody or antigen-binding portion described herein. In some aspects, the present disclosure relates to a method for producing an anti-ROR1 antibody or antigen-binding portion as described herein, comprising providing said host cell; culturing said host cell under conditions suitable for expression of the antibody or antigen-binding portion; and isolating the resulting antibody or antigen-binding portion. Antibodies or antigen-binding portions produced by such expression in such recombinant host cells are referred to herein as "recombinant" antibodies or antigen-binding portions. The present disclosure also provides progeny cells of such host cells, and antibodies or antigen-binding portions produced by same.

The term "recombinant host cell" (or simply "host cell"), as used herein, means a cell into which a recombinant expression vector has been introduced. By definition, a recombinant host cell does not occur in nature. The present disclosure provides host cells that may comprise, e.g., a vector as described herein. The present disclosure also provides host cells that comprise, e.g., a nucleotide sequence encoding the heavy chain or an antigen-binding portion thereof, a nucleotide sequence encoding the light chain or an antigen-binding portion thereof, or both, of an anti-ROR1 antibody or antigen-binding portion thereof described herein. It should be understood that "recombinant host cell" and "host cell" mean not only the particular subject cell but also the progeny of such a cell. Because certain modifications may occur in succeeding generations due to either mutation or environmental influences, such progeny may not, in fact, be identical to the parent cell, but are still included within the scope of the term "host cell" as used herein.

Nucleic acid molecules encoding anti-ROR1 antibodies and antigen-binding portions thereof and vectors comprising these nucleic acid molecules can be used for transfection of a suitable mammalian, plant, bacterial or yeast host cell. Transformation can be by any known method for introducing polynucleotides into a host cell. Methods for introduction of heterologous polynucleotides into mammalian cells are well known in the art and include dextran-mediated transfection, calcium phosphate precipitation, polybrene-mediated transfection, protoplast fusion, electroporation, encapsulation of the polynucleotide(s) in liposomes, and direct microinjection of the DNA into nuclei. In addition, nucleic acid molecules may be introduced into mammalian cells by viral vectors.

It is likely that antibodies expressed by different cell lines or in transgenic animals will have different glycosylation patterns from each other. However, all antibodies encoded by the nucleic acid molecules provided herein, or comprising the amino acid sequences provided herein are part of the present disclosure, regardless of the glycosylation state of the antibodies, and more generally, regardless of the presence or absence of post-translational modification(s).

Pharmaceutical Compositions

Another aspect of the present disclosure is a pharmaceutical composition comprising as an active ingredient (or as the sole active ingredient) an anti-ROR1 antibody or antigen-binding portion thereof of the present disclosure. The pharmaceutical composition may additionally comprise a pharmaceutically acceptable excipient. In some aspects, the pharmaceutical compositions are intended for amelioration, prevention, and/or treatment of cancer, e.g., a cancer described herein.

In some aspects, the pharmaceutical composition may comprise an anti-ROR1 antibody or antigen-binding portion thereof, and one or more additional antibodies that target one or more relevant cell surface receptors, e.g., one or more cancer-relevant receptors.

Generally, the antibodies, antigen-binding portions, bispecific binding molecules, and immunoconjugates of the present disclosure are suitable to be administered as a formulation in association with one or more pharmaceutically acceptable excipient(s), e.g., as described below.

The term "excipient" is used herein to describe any ingredient other than the compound(s) of the present disclosure. The choice of excipient(s) will to a large extent depend on factors such as the particular mode of administration, the effect of the excipient on solubility and stability, and the nature of the dosage form. As used herein, "pharmaceutically acceptable excipient" includes any and all solvents, dispersion media, coatings, antibacterial and antifungal agents, isotonic and absorption delaying agents, and the like that are physiologically compatible. Some examples of pharmaceutically acceptable excipients are water, saline, phosphate buffered saline, dextrose, glycerol, ethanol and the like, as well as combinations thereof. In many cases, it will be preferable to include isotonic agents, for example, sugars, polyalcohols such as mannitol, sorbitol, or sodium chloride in the composition. Additional examples of pharmaceutically acceptable substances are wetting agents or minor amounts of auxiliary substances such as wetting or emulsifying agents, preservatives or buffers, which enhance the shelf life or effectiveness of the antibody.

Pharmaceutical compositions of the present disclosure and methods for their preparation will be readily apparent to those skilled in the art. Such compositions and methods for their preparation may be found, for example, in *Remington's Pharmaceutical Sciences,* 19th Edition (Mack Publishing Company, 1995). Pharmaceutical compositions are preferably manufactured under GMP (good manufacturing practices) conditions.

A pharmaceutical composition of the present disclosure may be prepared, packaged, or sold in bulk, as a single unit dose, or as a plurality of single unit doses. As used herein, a "unit dose" is a discrete amount of the pharmaceutical composition comprising a predetermined amount of the active ingredient. The amount of the active ingredient is generally equal to the dosage of the active ingredient which would be administered to a subject or a convenient fraction of such a dosage such as, for example, one-half or one-third of such a dosage.

Formulations of a pharmaceutical composition suitable for parenteral administration (e.g., intravenous administration) typically comprise the active ingredient combined with a pharmaceutically acceptable carrier, such as sterile water or sterile isotonic saline. Such formulations may be prepared, packaged, or sold in a form suitable for bolus administration or for continuous administration. Injectable formulations may be prepared, packaged, or sold in unit dosage form, such as in ampoules or in multi-dose containers containing a preservative. Formulations for parenteral administration include, but are not limited to, suspensions, solutions, emulsions in oily or aqueous vehicles, pastes, and the like. Such formulations may further comprise one or more additional ingredients including, but not limited to, suspending, stabilizing, or dispersing agents. In some aspects of a formulation for parenteral administration, the active ingredient is provided in dry (i.e., powder or granular) form for reconstitution with a suitable vehicle (e.g., sterile pyrogen-free water) prior to parenteral administration of the reconstituted composition. Parenteral formulations also include aqueous solutions which may contain excipients such as salts, carbohydrates and buffering agents (preferably to a pH of from 3 to 9), but, for some applications, they may be more suitably formulated as a sterile non-aqueous solution or as a dried form to be used in conjunction with a suitable vehicle such as sterile, pyrogen-free water. Exemplary parenteral administration forms include solutions or suspensions in sterile aqueous solutions, for example, aqueous propylene glycol or dextrose solutions. Such dosage forms can be suitably buffered, if desired. Other parentally-administrable formulations which are useful include those which comprise the active ingredient in microcrystalline form, or in a liposomal preparation.

Therapeutic Uses of Antibodies and Compositions of the Present Disclosure

In some aspects, an anti-ROR1 antibody or antigen-binding portion of the present disclosure is used to treat cancer, such as a ROR1-positive cancer, in a patient. The patient may be a mammal, e.g., a human. ROR1 has been shown to express across many types of tumors, including lymphomas and solid tumors. High proportions of human cancers express ROR1. For example, Zhang et al. showed that 54% of ovarian cancers, 57% of colon cancers, 77% of lung cancers, 90% of lymphomas, 89% of skin cancers, 83% of pancreatic cancers, 73% of testicular cancers, 43% of bladder cancers, 96% of uterus cancers, 90% of prostate cancers, and 83% of adrenal cancers that they examined had moderate-to-strong staining with the anti-ROR1 antibody 4A5 (Zhang et al., *Am J Pathol.* (2012) 181(6):1903-10). Daneshmanesh et al. similarly found near universal expression of ROR1 in chronic lymphocytic leukemia (CLL) and hairy cell leukemia (HCL) and varying degrees of expression in other lymphoid cancers such as mantle cell lymphoma (MCL), diffuse large B-cell lymphoma (DLBCL)/marginal zone lymphoma (MZL), follicular lymphoma (FL), chronic myeloid leukemia (CML), acute myeloid leukemia (AML), and myeloma (Daneshmanesh et al., *Leuk Lymphoma* (2013) 54(4):843-50). Multiple groups have demonstrated expression of ROR1 in a subset of B-cell acute lymphoblastic leukemia (ALL) (see, e.g., Dave et al., *PLoS One* (2012) 7:e52655). ROR1 is also expressed in substantial proportions of cases of hepatocellular cancer (HCC) or non-small cell lung cancer (NSCLC) (U.S. Patent Publication 2018/0369406). Further, it has been shown that ROR1 expression increases in aggressive cancers and correlates with poor prognosis; thus, anti-ROR1 antibodies and antigen-binding portions of the present disclosure may be particularly well suited to treat aggressive or advanced cancers.

Thus, in certain aspects, an anti-ROR1 antibody or antigen-binding portion of the present disclosure, or a related pharmaceutical composition, bispecific antibody, or immunoconjugate, is for use in the treatment of cancer, e.g., cancers that originate in tissues such as the hematopoietic system, ovary, colon, lung, skin, pancreas, testicles, bladder, uterus, prostate, adrenal glands, intestine, brain, kidney, soft tissues, head and neck, liver, bone, bladder, breast, stomach, and cervix.

In some aspects, a cancer treatable by an anti-ROR1 antibody or antigen-binding portion described herein is a ROR1-expressing (i.e., ROR1-positive) cancer. The cancer can be identified as ROR1-expressing by any suitable method of determining gene or protein expression, for example, by histology, flow cytometry, RT-PCR, or RNA-Seq. The cancer cells used for the determination may be obtained through tumor biopsy or through collection of circulating tumor cells. In certain aspects, if an antibody-based assay such as flow cytometry or immunohistochemistry is used, ROR1-expressing cancers are any cancers with cells that show anti-ROR1 antibody reactivity greater than that of an isotype control antibody. In certain aspects, if an RNA-based assay is used, ROR1-expressing cancers are those that show an elevated level of ROR1 RNA compared to a negative control cell or cancer that does not express ROR1.

In certain aspects, anti-ROR1 antibodies and antigen-binding portions of the present disclosure are used to treat hematological malignancies (e.g., leukemias and/or lymphomas). In certain aspects, anti-ROR1 antibodies and antigen-binding portions of the present disclosure are used to treat solid tumors. The cancer to be treated may be selected from, e.g., lymphoma, small lymphocytic lymphoma, marginal zone lymphoma, marginal cell B-cell lymphoma, Burkitt's lymphoma, mantle cell lymphoma, follicular lymphoma, diffuse large B-cell lymphoma, a non-Hodgkin lymphoma that has undergone Richter's transformation, T cell non-Hodgkin lymphoma, lymphoplasmacytoid lymphoma, Waldenström macroglobulinemia, acute lymphoblastic leukemia, acute myeloid leukemia, acute lymphoblastic leukemia, chronic lymphocytic leukemia, T cell leukemia, osteosarcoma, Ewing sarcoma, soft tissue sarcoma, renal cell carcinoma, hepatocellular carcinoma, colon cancer, colorectal cancer, breast cancer (e.g., HER2$^+$ or ER$^+$/PR$^+$/HER2$^-$ breast cancer), epithelial squamous cell cancer, glioblastoma, neuroblastoma, melanoma, myeloma, multiple myeloma, stomach cancer, brain cancer, lung cancer, non-small cell lung cancer, gastroesophageal cancer, pancreatic cancer, cervical cancer, ovarian cancer, liver cancer, bladder cancer, prostate cancer, testicular cancer, endometrial cancer, thyroid cancer, mesothelioma, and head and neck cancer. The cancer may be, e.g., at an early, intermediate, late, or metastatic stage, and/or may be relapsed or refractory to other therapeutics (e.g., triple negative breast cancer).

In some aspects, cancers treated by the anti-ROR1 antibodies and antigen-binding portions of the present disclosure may include, e.g., non-Hodgkin lymphoma (e.g., diffuse large B-cell lymphoma (DLBCL), follicular lymphoma (FL), mantle cell lymphoma (MCL), marginal zone lymphoma (MZL), Burkitt's lymphoma, T cell non-Hodgkin lymphoma, or Waldenström macroglobulinemia), a non-Hodgkin lymphoma that has undergone Richter's transformation, acute myeloid leukemia (AML), acute lymphoblastic leukemia (ALL), chronic lymphocytic leukemia (CLL), small lymphocytic leukemia (SLL), multiple myeloma, breast cancer, non-small cell lung cancer, ovarian cancer, mesothelioma, and sarcoma.

In some aspects, a patient to be treated with an anti-ROR1 antibody or antigen-binding portion of the present disclosure has received prior cancer treatment. In other aspects, the patient has not received prior cancer treatment. In certain aspects, the prior cancer treatment is a chemotherapeutic agent and/or another anti-ROR1 antibody or antigen-binding portion. In certain aspects, the prior cancer treatment comprises, e.g., ibrutinib, rituximab, or rituximab-CHOP.

"Treat", "treating" and "treatment" refer to a method of alleviating or abrogating a biological disorder and/or at least one of its attendant symptoms. As used herein, to "alleviate" a disease, disorder or condition means reducing the severity and/or occurrence frequency of the symptoms of the disease, disorder, or condition. Further, references herein to "treatment" include references to curative, palliative and prophylactic treatment.

An anti-ROR1 antibody or antigen-binding portion of the present disclosure may be administered in a therapeutically effective amount to a patient with a cancer described herein. "Therapeutically effective amount" refers to the amount of the therapeutic agent being administered that will relieve to some extent one or more of the symptoms of the disorder being treated. A therapeutically effective amount of an anti-cancer therapeutic may, for example, result in delayed tumor growth, tumor shrinkage, increased survival, elimination of cancer cells, decreased disease progression, reversal of metastasis, or other clinical endpoints desired by healthcare professionals.

An anti-ROR1 antibody or antigen-binding portion of the present disclosure may be administered without additional therapeutic treatments, i.e., as a stand-alone therapy (monotherapy). Alternatively, treatment with an anti-ROR1 antibody or antigen-binding portion of the present disclosure may include at least one additional therapeutic treatment (combination therapy). In some aspects, an anti-ROR1 antibody or antigen-binding portion may be co-administered or formulated with another medication/drug for the treatment of cancer. The additional treatment may comprise, e.g., a chemotherapeutic, anti-neoplastic, or anti-angiogenic agent, a different anti-cancer antibody, and/or radiation therapy.

In certain aspects, an anti-ROR1 antibody or antigen-binding portion of the present disclosure is used in combination with an additional therapeutic agent or biologically active molecule (e.g., to treat a cancer described herein). Examples of biologically active molecules include, but are not limited to, peptides, proteins, enzymes, small molecule drugs, prodrugs, carbohydrates, imaging agents, lipids, nucleosides, radionuclides, oligonucleotides, toxins, cells, antibiotics, fungicides, anti-viral agents, anti-inflammatory agents, anti-tumor agents, cardiovascular agents, anti-anxiety agents, hormones, growth factors, steroidal agents, microbially derived toxins, and the like. In some aspects, the additional therapeutic agent is a vascular endothelial growth factor (VEGF) inhibitor, a Bruton's tyrosine kinase (BTK) inhibitor, an inhibitor of the mammalian target of rapamycin (mTOR), a phosphoinositide 3-kinase (PI3K) inhibitor, a Janus kinase/signal transducers and activators of transcription (Jak/STAT) signaling inhibitor, a B-cell lymphoma 2 (Bcl-2) inhibitor, a spleen tyrosine kinase (SYK) inhibitor, a microtubule inhibitor, an epithelial growth factor receptor (EGFR) inhibitor, a poly ADP ribose polymerase (PARP) inhibitor, an anaplastic lymphoma kinase (ALK) inhibitor, a DNA-repair inhibitor, a DNA cross-linker, a nucleoside analog, or an immunomodulatory agent. In some aspects, the additional therapeutic agent is an antibody such as rituximab (anti-CD20) or bevacizumab (anti-VEGF); a Bruton's tyrosine kinase inhibitor such as acalabrutinib or ibrutinib; an mTOR inhibitor such as sapanisertib, everolimus or BEZ235; a PI3K inhibitor such as idelalisib or buparlisib; a Jak/STAT signaling inhibitor such as ruxolitinib; a Bcl-2 inhibitor such as ABT-199/venetoclax, Bcl-2i-1, or Bcl-2i-2; a SYK inhibitor such as fostamatinib; a microtubule inhibitor such as paclitaxel or vincristine; an EGFR inhibitor such as erlotinib; a PARP inhibitor such as olaparib; an ALK inhibitor such as crizotinib; a DNA-repair inhibitor such as carboplatin; a DNA cross-linker such as oxaliplatin/cisplatin; a nucleoside analog such as gemcitabine; or an immunomodulatory drug (IMiD) such as lenalidomide or pomalidomide. In certain aspects, the additional therapeutic agent is ibrutinib, acalabrutinib, venetoclax, Bcl-2i-1, Bcl-2i-2, everolimus, sapanisertib, idelalisib, pacritinib, buparlisib, BEZ235, ruxolitinib, fostamatinib, rituximab, lenalidomide, pomalidomide, paclitaxel, vincristine, erlotinib, crizotinib, carboplatin, oxaliplatin/cisplatin, bevacizumab, or gemcitabine.

In certain aspects, the additional therapeutic agent is selected from a Bruton's tyrosine kinase (BTK) inhibitor, a B-cell lymphoma 2 (Bcl-2) inhibitor, a mammalian target of rapamycin (mTOR) inhibitor, and a phosphoinositide 3-kinase (PI3K) inhibitor. In particular aspects, the additional therapeutic agent is selected from ibrutinib, acalabrutinib, venetoclax, everolimus, sapanisertib, and idelalisib.

In certain aspects, an anti-ROR1 antibody or antigen-binding portion is used in combination with an immune checkpoint modulator that enhances the patient's immune system (e.g., to treat a cancer as described herein). For example, the antibody or antigen-binding portion is used with an immune checkpoint inhibitor such as an antibody or antibody derivative, an antisense oligonucleotide, a small interfering RNA, an aptamer, or a peptide, targeting programmed death-ligand 1 (PD-L1, also known as B7-H1, CD274), programmed death 1 (PD-1), CTLA-4, PD-L2 (B7-DC, CD273), LAG3, TIM3, 2B4, A2aR, B7H1, B7H3, B7H4, BTLA, CD2, CD27, CD28, CD30, CD40, CD70, CD80, CD86, CD137, CD160, CD226, CD276, DR3, GALS, GITR, HAVCR2, HVEM, IDO1, IDO2, ICOS (inducible T cell costimulator), KIR, LAIR1, LIGHT, MARCO (macrophage receptor with collagenous structure), PS (phosphatidylserine), OX-40, SLAM, TIGHT, VISTA, VTCN1, or any combination thereof.

The present disclosure also contemplates the use of sequences (e.g., the six CDR or VH and VL sequences) of an anti-ROR1 antibody or antigen-binding portion described herein in the preparation of a chimeric antigen receptor, which may be for use in CAR-T technology.

It is understood that the antibodies and antigen-binding portions thereof of the present disclosure may be used in a method of treatment as described herein, may be for use in a treatment as described herein, and/or may be for use in the manufacture of a medicament for a treatment as described herein. It is also understood that the therapies described herein may be carried out not only using the anti-ROR1 antibodies or antigen-binding portions thereof of the present disclosure, but also using the related pharmaceutical compositions, bispecific antibodies, and immunoconjugates described herein. The present disclosure also provides kits and articles of manufacture comprising the antibodies and antigen-binding portions thereof, pharmaceutical compositions, bispecific antibodies, or immunoconjugates described herein.

Dose and Route of Administration

The antibodies or antigen-binding portions thereof of the present disclosure may be administered in an effective amount for treatment of the condition in question, i.e., at dosages and for periods of time necessary to achieve a desired result. A therapeutically effective amount may vary according to factors such as the particular condition being treated, the age, sex and weight of the patient, and whether the antibodies are being administered as a stand-alone treatment or in combination with one or more additional anti-cancer treatments.

Dosage regimens may be adjusted to provide the optimum desired response. For example, a single bolus may be administered, several divided doses may be administered over time or the dose may be proportionally reduced or increased as indicated by the exigencies of the therapeutic situation. It is especially advantageous to formulate parenteral compositions in dosage unit form for ease of administration and uniformity of dosage. Dosage unit form, as used herein, refers to physically discrete units suited as unitary dosages for the patients/subjects to be treated; each unit containing a predetermined quantity of active compound calculated to produce the desired therapeutic effect in association with the required pharmaceutical carrier. The specification for the dosage unit forms of the present disclosure are generally dictated by and directly dependent on (a) the unique characteristics of the therapeutic agent and the particular therapeutic or prophylactic effect to be achieved, and (b) the limitations inherent in the art of compounding such an active compound for the treatment of sensitivity in individuals.

Thus, the skilled artisan would appreciate, based upon the disclosure provided herein, that the dose and dosing regimen are adjusted in accordance with methods well-known in the therapeutic arts. That is, the maximum tolerable dose can be readily established, and the effective amount providing a detectable therapeutic benefit to a patient may also be determined, as can the temporal requirements for administering each agent to provide a detectable therapeutic benefit to the patient. Accordingly, while certain dose and administration regimens are exemplified herein, these examples in no way limit the dose and administration regimen that may be provided to a patient in practicing the present disclosure.

It is to be noted that dosage values may vary with the type and severity of the condition to be alleviated, and may include single or multiple doses. It is to be further understood that for any particular subject, specific dosage regimens should be adjusted over time according to the individual need and the professional judgment of the person administering or supervising the administration of the compositions, and that dosage ranges set forth herein are exemplary only and are not intended to limit the scope or practice of the embodied composition. Further, the dosage regimen with the compositions of the present disclosure may be based on a variety of factors, including the type of disease, the age, weight, sex, medical condition of the patient, the severity of the condition, the route of administration, and the particular antibody employed. Thus, the dosage regimen can vary widely, but can be determined routinely using standard methods. For example, doses may be adjusted based on pharmacokinetic or pharmacodynamic parameters, which may include clinical effects such as toxic effects and/or laboratory values. Thus, the present disclosure encompasses intra-patient dose-escalation as determined by the skilled artisan. Determining appropriate dosages and regimens are well-known in the relevant art and would be understood to be encompassed by the skilled artisan once provided the teachings disclosed herein.

An effective amount for tumor therapy may be measured by its ability to stabilize disease progression and/or ameliorate symptoms in a patient, and preferably to reverse disease progression, e.g., by reducing tumor size. The ability of an antibody, antigen-binding portion, pharmaceutical composition, bispecific binding molecule, or immunoconjugate of the present disclosure to inhibit cancer may be evaluated by in vitro assays, e.g., as described in the examples, as well as in suitable animal models that are predictive of the efficacy in human tumors. Suitable dosage regimens will be selected in order to provide an optimum therapeutic response in each particular situation, for example, administered as a single bolus or as a continuous infusion, and with possible adjustment of the dosage as indicated by the exigencies of each case.

The antibodies or antigen-binding portions thereof, pharmaceutical compositions, bispecific binding molecules, and immunoconjugates of the present disclosure may be administered by any method for administering peptides, proteins or antibodies accepted in the art, and are typically suitable for parenteral administration. As used herein, "parenteral administration" includes any route of administration characterized by physical breaching of a tissue of a subject and administration through the breach in the tissue, thus generally resulting in the direct administration into the blood stream, into muscle, or into an internal organ. Parenteral administration thus includes, but is not limited to, administration by injection, by application through a surgical incision, by application through a tissue-penetrating non-surgical wound, and the like. In particular, parenteral administration is contemplated to include, but is not limited to, intravenous, subcutaneous, intraperitoneal, intramuscular, intrasternal, intraarterial, intrathecal, intraurethral, intracranial, intratumoral, and intrasynovial injection or infusions. In a particular aspect, the antibodies or antigen-binding portions, pharmaceutical compositions, bispecific binding molecules, and immunoconjugates described herein are administered intravenously.

Diagnostic Uses and Compositions

The antibodies and antigen-binding portions of the present disclosure also are useful in diagnostic processes (e.g., in vitro, ex vivo). For example, the antibodies and antigen-binding portions can be used to detect and/or measure the level of ROR1 in a sample from a patient (e.g., a tissue sample, or a body fluid sample such as an inflammatory exudate, blood, serum, bowel fluid, saliva, or urine). Suitable detection and measurement methods include immunological methods such as flow cytometry, enzyme-linked immunosorbent assays (ELISA), chemiluminescence assays, radioimmunoassays, and immunohistology. The present disclosure further encompasses kits (e.g., diagnostic kits) comprising the antibodies and antigen-binding portions described herein.

Articles of Manufacture and Kits

The present disclosure also provides articles of manufacture, e.g., kits, comprising a one or more containers (e.g., single-use or multi-use containers) containing a pharmaceutical composition of the anti-ROR1 antibody or antigen-binding portion, bispecific antibody, or immunoconjugate of the present disclosure; optionally an additional biologically active molecule (e.g., another therapeutic agent); and instructions for use. The anti-ROR1 antibody or antigen-binding portion, bispecific antibody, or immunoconjugate, and optional additional biologically active molecule, can be packaged separately in suitable packing such as a vial or ampule made from non-reactive glass or plastic. In certain aspects, the vial or ampule holds lyophilized powder comprising the anti-ROR1 antibody or antigen-binding portion/bispecific antibody/immunoconjugate and/or the additional biologically active molecule. In certain aspects, the vial or ampule holds a concentrated stock (e.g., 2×, 5×, 10× or more) of the anti-ROR1 antibody or antigen-binding portion/bispecific antibody/immunoconjugate or biologically active molecule. In certain aspects, the articles of manufacture such as kits include a medical device for administering the anti-ROR1 antibody or antigen-binding portion/bispecific antibody/immunoconjugate and/or the biologically active molecule (e.g., a syringe and a needle); and/or an appropriate diluent (e.g., sterile water and normal saline). The present disclosure also includes methods for manufacturing said articles.

EXEMPLARY EMBODIMENTS

Non-limiting, exemplary embodiments of the present disclosure are described as follows.

1. An anti-ROR1 antibody or an antigen-binding portion thereof, wherein the antibody comprises:
    a) a heavy chain variable domain (VH) that comprises the amino acid sequence of SEQ ID NO: 4 with at least one mutation in heavy chain (H)-CDR1, H-CDR2, or both; and a light chain variable domain (VL) that comprises the amino acid sequence of SEQ ID NO: 2;
    b) a VH that comprises the amino acid sequence of SEQ ID NO: 4; and a VL that comprises the amino acid sequence of SEQ ID NO: 2 with at least one mutation in light chain (L)-CDR1, L-CDR2, or both; or
    c) a VH that comprises the amino acid sequence of SEQ ID NO: 4 with at least one mutation in heavy chain (H)-CDR1, H-CDR2, or both; and a VL that comprises the amino acid sequence of SEQ ID NO: 2 with at least one mutation in light chain (L)-CDR1, L-CDR2, or both;
    wherein the antibody or antigen-binding portion binds to the same epitope of human ROR1 as, and has a greater binding affinity for human ROR1 than, an antibody comprising a VH that comprises the amino acid sequence of SEQ ID NO: 4 and a VL that comprises the amino acid sequence of SEQ ID NO: 2;
    optionally wherein the antibody or antigen-binding portion does not comprise VH and VL amino acid sequences of SEQ ID NOs: 5 and 2, respectively, or SEQ ID NOs: 5 and 6, respectively.

2. The antibody or antigen-binding portion of embodiment 1, wherein said antibody comprises:
    a) a VH comprising the amino acid sequence of SEQ ID NO: 4 with a mutation selected from T32A, T32E, S69V, S69E, and N71H, or any combination thereof; and a VL comprising the amino acid sequence of SEQ ID NO: 2;
    b) a VH comprising the amino acid sequence of SEQ ID NO: 4; and a VL comprising the amino acid sequence of SEQ ID NO: 2 with a mutation selected from A25P, K29E, K29S, T69H, T69R, L70K, and Q71T, or any combination thereof; or
    c) a VH comprising the amino acid sequence of SEQ ID NO: 4 with a mutation selected from T32A, T32E, S69V, S69E, and N71H, or any combination thereof; and a VL comprising the amino acid sequence of SEQ ID NO: 2 with a mutation selected from A25P, K29E, K29S, T69H, T69R, L70K, and Q71T, or any combination thereof;
wherein the residues are numbered according to the AHo system, optionally wherein the antibody or antigen-binding portion does not comprise VH and VL amino acid sequences of SEQ ID NOs: 5 and 2, respectively, or SEQ ID NOs: 5 and 6, respectively.

3. The antibody or antigen-binding portion of embodiment 1, wherein said antibody comprises a VL comprising the amino acid sequence of SEQ ID NO: 2, and a VH comprising the amino acid sequence of SEQ ID NO: 4 with a mutation selected from:
   a) T32A or T32E;
   b) S69V or S69E;
   c) N71H; or
   d) any combination of a)-c);
   wherein the residues are numbered according to the AHo system, optionally wherein the antibody or antigen-binding portion does not comprise VH and VL amino acid sequences of SEQ ID NOs: 5 and 2, respectively.

4. The antibody or antigen-binding portion of embodiment 1, wherein said antibody comprises a VH comprising the amino acid sequence of SEQ ID NO: 4, and a VL comprising the amino acid sequence of SEQ ID NO: 2 with a mutation selected from:
   a) A25P;
   b) K29E or K29S;
   c) T69R or T69H;
   d) L70K;
   e) Q71T; or
   f) any combination of a)-e);
   wherein the residues are numbered according to the AHo system.

5. The antibody or antigen-binding portion of embodiment 1, wherein said antibody comprises:
   a) a VH comprising the amino acid sequence of SEQ ID NO: 4 with a mutation selected from:
      i) T32A or T32E;
      ii) S69V or S69E;
      iii) N71H; or
      iv) any combination of i)-iv); and
   b) a VL comprising the amino acid sequence of SEQ ID NO: 2 with a mutation selected from:
      i) T69R or T69H;
      ii) A25P;
      iii) K29E or K29S;
      iv) L70K;
      v) Q71T; or
      vi) any combination of i)-v);
   wherein the residues are numbered according to the AHo system, optionally wherein the antibody or antigen-binding portion does not comprise VH and VL amino acid sequences of SEQ ID NOs: 5 and 6, respectively.

6. The antibody or antigen-binding portion of embodiment 1, wherein said antibody comprises:
   a) a VH comprising the amino acid sequence of SEQ ID NO: 4 with the mutation T32A, and a VL comprising the amino acid sequence of SEQ ID NO: 2 with the mutation A25P;
   b) a VH comprising the amino acid sequence of SEQ ID NO: 4 with the mutation T32A, and a VL comprising the amino acid sequence of SEQ ID NO: 2 with the mutation T69H;
   c) a VH comprising the amino acid sequence of SEQ ID NO: 4 with the mutation T32A, and a VL comprising the amino acid sequence of SEQ ID NO: 2 with the mutation T69R;
   d) a VH comprising the amino acid sequence of SEQ ID NO: 4 with the mutation T32A, and a VL comprising the amino acid sequence of SEQ ID NO: 2 with the mutations A25P and T69R;
   e) a VH comprising the amino acid sequence of SEQ ID NO: 4 with the mutation T32A, and a VL comprising the amino acid sequence of SEQ ID NO: 2 with the mutations K29S and T69R;
   f) a VH comprising the amino acid sequence of SEQ ID NO: 4 with the mutation T32A, and a VL comprising the amino acid sequence of SEQ ID NO: 2 with the mutations T69R and Q71T; or
   g) a VH comprising the amino acid sequence of SEQ ID NO: 4 with the mutation T32A, and a VL comprising the amino acid sequence of SEQ ID NO: 2 with the mutations A25P and L70K;
   wherein the residues are numbered according to the AHo system.

7. The antibody or antigen-binding portion of embodiment 1, wherein said antibody comprises an H-CDR3 amino acid sequence of SEQ ID NO: 89 and an L-CDR3 amino acid sequence of SEQ ID NO: 123, and wherein said antibody further comprises:
   a) an H-CDR1 amino acid sequence of SEQ ID NO: 29 or 31;
   b) an H-CDR2 amino acid sequence of SEQ ID NO: 73, 75, or 80;
   c) an L-CDR1 amino acid sequence of SEQ ID NO: 102, 103, or 104;
   d) an L-CDR2 amino acid sequence of SEQ ID NO: 117, 118, 120, or 121; or
   e) any combination of the above H-CDR1, H-CDR2, L-CDR1, and L-CDR2 amino acid sequences,
   wherein the antibody does not comprise heavy chain (H)-CDR1-3 amino acid sequences of SEQ ID NOs: 13, 42, and 89, respectively, and light chain (L)-CDR1-3 amino acid sequences of SEQ ID NOs: 101, 114, and 123, respectively;
   optionally wherein the antibody does not comprise H-CDR1-3 amino acid sequences of 29, 42, and 89, respectively, and L-CDR1-3 amino acid sequences of 101, 114, and 123, respectively; or H-CDR1-3 amino acid sequences of 29, 42, and 89, respectively, and L-CDR1-3 amino acid sequences of 101, 118, and 123, respectively.

8. An anti-ROR1 antibody or an antigen-binding portion thereof, comprising heavy chain (H)-CDR1-3 and light chain (L)-CDR1-3 comprising the amino acid sequences of:
   a) SEQ ID NOs: 29, 42, 89, 101, 114, and 123, respectively;
   b) SEQ ID NOs: 31, 42, 89, 101, 114, and 123, respectively;
   c) SEQ ID NOs: 13, 73, 89, 101, 114, and 123, respectively;
   d) SEQ ID NOs: 13, 75, 89, 101, 114, and 123, respectively;
   e) SEQ ID NOs: 13, 80, 89, 101, 114, and 123, respectively;
   f) SEQ ID NOs: 13, 42, 89, 102, 114, and 123, respectively;
   g) SEQ ID NOs: 13, 42, 89, 103, 114, and 123, respectively;

h) SEQ ID NOs: 13, 42, 89, 104, 114, and 123, respectively;
i) SEQ ID NOs: 13, 42, 89, 101, 117, and 123, respectively;
j) SEQ ID NOs: 13, 42, 89, 101, 118, and 123, respectively;
k) SEQ ID NOs: 13, 42, 89, 101, 120, and 123, respectively;
l) SEQ ID NOs: 29, 42, 89, 102, 114, and 123, respectively;
m) SEQ ID NOs: 29, 42, 89, 101, 117, and 123, respectively;
n) SEQ ID NOs: 29, 42, 89, 101, 118, and 123, respectively;
o) SEQ ID NOs: 29, 42, 89, 102, 118, and 123, respectively;
p) SEQ ID NOs: 29, 42, 89, 103, 118, and 123, respectively;
q) SEQ ID NOs: 29, 42, 89, 101, 147, and 123, respectively; or
r) SEQ ID NOs: 29, 42, 89, 102, 120, and 123, respectively.

9. The antibody or antigen-binding portion of embodiment 7 or 8, wherein said antibody or antigen-binding portion further comprises the amino acid sequences of SEQ ID NOs: 172-179.

10. An anti-ROR1 antibody or an antigen-binding portion thereof, wherein said antibody comprises a heavy chain variable domain (VH) amino acid sequence of SEQ ID NO: 5 and a light chain variable domain (VL) amino acid sequence of SEQ ID NO: 2.

11. An anti-ROR1 antibody or an antigen-binding portion thereof, wherein said antibody comprises a heavy chain variable domain (VH) amino acid sequence of SEQ ID NO: 5 and a light chain variable domain (VL) amino acid sequence of SEQ ID NO: 6.

12. The antibody of any one of embodiments 1-11, wherein the antibody is an IgG, optionally comprising a human IgG1 constant region.

13. The antibody or antigen-binding portion of any one of embodiments 1-11, wherein said antibody or portion is a single chain variable fragment (scFv).

14. The antibody or antigen-binding portion of embodiment 13, wherein said scFv comprises the amino acid sequence of SEQ ID NO: 10 or 12.

15. The antibody or antigen-binding portion of any one of embodiments 1-14, wherein said antibody or antigen-binding portion:
a) binds to ROR1-transfected MEC cells with greater affinity than an antibody with a VH comprising the amino acid sequence of SEQ ID NO: 4 and a VL comprising the amino acid sequence of SEQ ID NO: 2, as assessed by flow cytometry;
b) binds to JeKo-1 cells with greater affinity than an antibody with a VH comprising the amino acid sequence of SEQ ID NO: 4 and a VL comprising the amino acid sequence of SEQ ID NO: 2, as assessed by flow cytometry; or
c) both a) and b).

16. A pharmaceutical composition comprising an anti-ROR1 antibody or antigen-binding portion thereof of any one of embodiments 1-15 and a pharmaceutically acceptable excipient.

17. The pharmaceutical composition of embodiment 16, further comprising an additional therapeutic agent selected from the group consisting of a Bruton's tyrosine kinase (BTK) inhibitor, a B-cell lymphoma 2 (Bcl-2) inhibitor, a mammalian target of rapamycin (mTOR) inhibitor, and a phosphoinositide 3-kinase (PI3K) inhibitor, or a combination therapy comprising the pharmaceutical composition of embodiment 16 and the aforementioned selected additional therapeutic agent.

18. The pharmaceutical composition or combination therapy of embodiment 17, wherein the additional therapeutic agent is selected from the group consisting of ibrutinib, acalabrutinib, venetoclax, everolimus, sapanisertib, and idelalisib.

19. An isolated nucleic acid molecule comprising a nucleotide sequence that encodes the heavy chain or an antigen-binding portion thereof, or a nucleotide sequence that encodes the light chain or an antigen-binding portion thereof, or both, of the anti-ROR1 antibody or antigen-binding portion of any one of embodiments 1-15.

20. The isolated nucleic acid molecule of embodiment 19, wherein said nucleic acid molecule comprises the nucleotide sequence of SEQ ID NO: 9 or 11.

21. A vector comprising the isolated nucleic acid molecule of embodiment 19 or 20, wherein said vector further comprises an expression control sequence.

22. A host cell comprising a nucleotide sequence that encodes the heavy chain or an antigen-binding portion thereof, and a nucleotide sequence that encodes the light chain or an antigen-binding portion thereof, of the anti-ROR1 antibody or antigen-binding portion of any one of embodiments 1-15.

23. A method for producing an anti-ROR1 antibody or an antigen-binding portion thereof, comprising providing a host cell according to embodiment 22, culturing said host cell under conditions suitable for expression of the antibody or portion, and isolating the resulting antibody or portion.

24. A bispecific binding molecule comprising the antigen-binding portion of an anti-ROR1 antibody according to any one of embodiments 1-15.

25. An immunoconjugate comprising the anti-ROR1 antibody or antigen-binding portion of any one of embodiments 1-15 conjugated to a cytotoxic agent.

26. A method for treating cancer in a patient, comprising administering to said patient a therapeutically effective amount of the anti-ROR1 antibody or antigen-binding portion of any one of embodiments 1-15, the pharmaceutical composition of any one of embodiments 16-18, the bispecific binding molecule of embodiment 24, or the immunoconjugate of embodiment 25.

27. Use of the anti-ROR1 antibody or antigen-binding portion of any one of embodiments 1-15, the pharmaceutical composition of any one of embodiments 16-18, the bispecific binding molecule of embodiment 24, or the immunoconjugate of embodiment 25 for the manufacture of a medicament for treating cancer in a patient.

28. The anti-ROR1 antibody or antigen-binding portion of any one of embodiments 1-15 for use in treating cancer in a patient.

29. The method, use, or anti-ROR1 antibody or antigen-binding portion for use of any one of embodiments 26-28, wherein the cancer is a ROR1-positive cancer.

30. The method, use, or anti-ROR1 antibody or antigen-binding portion for use of any one of embodiments 26-28, wherein the cancer is a leukemia, a lymphoma, or a solid tumor.

31. The method, use, or anti-ROR1 antibody or antigen-binding portion for use of any one of embodiments 26-28, wherein the cancer is non-Hodgkin lymphoma (e.g., diffuse large B-cell lymphoma (DLBCL), follicular lymphoma (FL), mantle cell lymphoma (MCL), marginal zone lymphoma (MZL), Burkitt's lymphoma, T cell non-Hodgkin lymphoma, or Waldenström macroglobulinemia), a non-Hodgkin lymphoma that has undergone Richter's transformation, acute myeloid leukemia (AML), acute lymphoblastic leukemia (ALL), chronic lymphocytic leukemia (CLL), small lymphocytic leukemia (SLL), breast cancer, non-small cell lung cancer, ovarian cancer, or sarcoma.

32. The method, use, or anti-ROR1 antibody or antigen-binding portion for use of any one of embodiments 26-31, wherein the patient is treated with an additional therapeutic agent.

33. The method, use, or anti-ROR1 antibody or antigen-binding portion for use of embodiment 32, wherein the additional therapeutic agent is selected from the group consisting of a Bruton's tyrosine kinase (BTK) inhibitor, a B-cell lymphoma 2 (Bcl-2) inhibitor, a mammalian target of rapamycin (mTOR) inhibitor, and a phosphoinositide 3-kinase (PI3K) inhibitor.

34. The method, use, or anti-ROR1 antibody or antigen-binding portion for use of embodiment 32, wherein the additional therapeutic agent is selected from the group consisting of ibrutinib, acalabrutinib, venetoclax, everolimus, sapanisertib, and idelalisib.

35. A kit comprising the anti-ROR1 antibody or antigen-binding portion of any one of embodiments 1-15, the pharmaceutical composition of any one of embodiments 16-18, the bispecific binding molecule of embodiment 24, or the immunoconjugate of embodiment 25.

36. An article of manufacture comprising the anti-ROR1 antibody or antigen-binding portion of any one of embodiments 1-15, the pharmaceutical composition of any one of embodiments 16-18, the bispecific binding molecule of embodiment 24, or the immunoconjugate of embodiment 25, wherein said article of manufacture is suitable for treating cancer in a patient.

Unless otherwise defined herein, scientific and technical terms used in connection with the present disclosure shall have the meanings that are commonly understood by those of ordinary skill in the art. Exemplary methods and materials are described below, although methods and materials similar or equivalent to those described herein can also be used in the practice or testing of the present disclosure. In case of conflict, the present specification, including definitions, will control.

Generally, nomenclature used in connection with, and techniques of, cell and tissue culture, molecular biology, immunology, microbiology, genetics, analytical chemistry, synthetic organic chemistry, medicinal and pharmaceutical chemistry, and protein and nucleic acid chemistry and hybridization described herein are those well-known and commonly used in the art. Enzymatic reactions and purification techniques are performed according to manufacturer's specifications, as commonly accomplished in the art or as described herein.

Further, unless otherwise required by context, singular terms shall include pluralities and plural terms shall include the singular. Throughout this specification and aspects, the words "have" and "comprise," or variations such as "has," "having," "comprises," or "comprising," will be understood to imply the inclusion of a stated integer or group of integers but not the exclusion of any other integer or group of integers.

All publications and other references mentioned herein are incorporated by reference in their entirety. Although a number of documents are cited herein, this citation does not constitute an admission that any of these documents forms part of the common general knowledge in the art.

In order that the present disclosure may be better understood, the following examples are set forth. These examples are for purposes of illustration only and are not to be construed as limiting the scope of the present disclosure in any manner.

EXAMPLES

Example 1. Phage Expression of Ab1

In order to enable in vitro affinity maturation of the Ab1 antibody, DNA encoding the heavy and light chain variable regions of Ab1 was cloned into an M13 phage vector to facilitate the expression of soluble Fab in bacteria. Briefly, double-stranded DNA encoding the light chain variable region (SEQ ID NO: 1) and constant region followed by the heavy chain variable region (SEQ ID NO: 3) was synthesized (Integrated DNA Technologies). The DNA was codon-optimized for bacterial expression and was flanked with NcoI and HindIII/ApaI restriction sites as well as additional vector sequence to permit cloning either by restriction digest or by Gibson assembly. Subsequently, the DNA was cloned into an M13 phage expression vector (Huse et al., *J. Immunol.* (1992) 149(12):3914-20) that contained human CH1 domain followed by both histidine- and human influenza hemagglutinin A (HA) peptide tags to facilitate purification of the Fab (his-tag) and detection of the heavy chain (HA-tag).

The M13 phage vector was used to transform *E. coli* and generate phage encoding soluble (not fused to any phage proteins) Ab1 Fab. Subsequently, a filter lift assay was used to demonstrate expression of heavy and light chains. Briefly, dilutions of high titer phage stocks (typically $10^6$-fold) were combined with 0.35 mL of confluent *E. coli* strain XL cells containing 20 μg/mL tetracycline. The mixture was combined with 3.5 mL of 0.7% Bacto agar in Luria broth and was subsequently overlaid on 1.5% Bacto agar in Luria broth. The plate was incubated 6-8 h at 37° C. at which time a nitrocellulose filter (Whatman 82-mm diameter, 0.45 μm pore size, GE Healthcare, cat. #10401116) was placed on top and the plate was incubated at 25° C. for 12-15 h. The filter was removed, rinsed briefly in PBS, and was blocked by incubating in 5% milk in PBS (5% M-P) for 2 h at 25° C. with constant agitation. The filter was split and probed to assess either kappa light chain or heavy chain expression. Each filter was transferred to the appropriate primary detection reagent: goat anti-human kappa, HRP conjugate (Southern Biotech, cat. #2060-05) diluted 1000-fold in 5% M-P for detection of light chain, or rat anti-HA, HRP conjugate (Roche, cat. #12013819001) diluted 1000-fold in 5% M-P for detection of heavy chain. Filters were incubated 2 h at 25° C. with constant agitation and were then washed 5 times, 2 minutes each wash with constant agitation, in PBS containing 0.05% Tween 20 (PBS-T). In order to assess expression, the filters were developed with 1-Step Ultra TMB-Blotting (Thermo Scientific, cat. #37574). Using this assay, bacterial expression of both heavy (FIG. 1, Panel A, right side) and kappa light (FIG. 1, Panel A, left side) chains was demonstrated. These data demonstrate the cloning and bacterial expression of heavy and light chains of Ab1 Fab.

It has been demonstrated previously that Ab1 binds an epitope on the extracellular domain of human ROR1 (see U.S. Pat. No. 9,758,591). Consequently, recombinant human ROR1 protein corresponding to the extracellular domain (ECD) of human ROR1 was used for screening assays. To biotinylate the human ROR1-ECD antigen, 100 μg of the protein was resuspended in water to a final concentration of 400 μg/mL. The protein was then combined with EZ-Link Sulfo-NHS-LC-Biotin (Thermo Scientific cat. #21327) at a 5:1 molar ratio and incubated at 25° C. for 2 h. The reaction was quenched by addition of 31 μL of 0.75 M arginine hydrochloride and biotinylated huROR1 antigen was stored at 4° C. until use.

Next, the filter lift assay was modified slightly to enable sensitive detection of the binding of soluble biotinylated antigen by Fab immobilized on the filter. In order to enhance the assay sensitivity and make the filter lift assay staining intensity more reflect Fab affinity (as opposed to expression levels), a previously described capture filter lift assay was used (Watkins, *Methods in Molecular Biology* (2001) 178: 187-193). A nitrocellulose filter (Whatman 82 mm diameter, 0.45 mm pore size, GE Healthcare, Prod. #10401116) was floated on top of 10 mL of 10 μg/mL goat anti-human kappa (Southern Biotech Prod. #2060-01) for 2 h at 25° C. The filter was submersed briefly before removing and transferred to 10 mL of 5% M-P for 2 h at 25° C. The filter was removed from 5% M-P, rinsed briefly one time with PBS, and was air-dried. Subsequently, the filter was applied to the agar plates as described above. For detection of antigen binding, the filter was rinsed briefly in PBS, and transferred to biotinylated huROR1-ECD (ACROBiosystems, cat. #RO1-H522y) in 5% M-P.

Filters were incubated with 2.3 nM biotinylated ROR1 diluted in 5% M-P for 2 h at 25° C. with constant agitation, and washed 5 times, 2 minutes each wash, with constant agitation in PBS-T. Alternatively, filters were washed more rapidly using a squirt bottle and sintered glass funnel for vacuum filtration. The filters were transferred to 10 mL of High Sensitivity Neutravidin, HRP conjugate (Thermo Scientific, cat. #31030) diluted 5000-fold in 1% BSA in PBS and incubated for 1 h at 25° C. The filters were then washed 5 times in PBS-T and were developed with 1-Step Ultra TMB-Blotting. The binding of immobilized Ab1 Fab to biotinylated huROR1-ECD was demonstrated using this assay (FIG. 1, Panel B). These data demonstrate that the bacterially-expressed Fab is functional and that the modified filter lift assay can detect binding to huROR1 at low nanomolar concentrations.

Example 2. Expression and Quantitation of Ab1 Fab in the Periplasmic Space of *E. coli*

The Ab1 Fab was further characterized by expressing and quantitating Fab in the periplasmic space of *E. coli*. Briefly, XL bacteria were grown in 2×YT medium at 37° C. until the culture reached a density of 0.9-1.1 at OD600. Isopropyl β-D-thiogalactoside was then added to the cells to a final concentration of 1 mM and 3.0 mL of culture was transferred to a 14 mL snap-top tube. Each tube was transfected with 25 μL of high titer phage stock and the cultures were placed in a shaker (225 rpm) at 37° C. One hour later, the temperature was shifted to 25° C. and the cultures were grown for an additional 14-16 h. The cells were collected by centrifugation at 3900 rpm for 30 min in an Eppendorf 5810R centrifuge (~3,200×g), the supernatant was decanted and the cells were resuspended in 0.3 mL of lysis buffer (30 mM Tris, pH 8.0, 2 mM EDTA, 20% sucrose, 2 mg/mL lysozyme, 5 U/mL DNase I) and placed on ice for 15 min. The cell suspension was transferred to a 1.5 mL tube and cell debris was pelleted by centrifugation at 15,000 rpm for 15 minutes in an Eppendorf 5424 microfuge (~21,000×g). The supernatant was removed carefully without disturbing the pellet and was stored at 4° C. until use.

In order to quantitate Fab expression, a 96-well Costar-3366 plate was coated with 50 μl/well of 2 μg/mL sheep anti-human Fd (Southern Biotech, cat. #2046-01) in PBS overnight at 4° C. The plate was washed three times with PBS containing 0.05% Tween 20 (PBS-T) and 50 μl/well of sample dilutions was added. Sample dilutions were performed with PBS-T. A standard curve was generated using human Fab (Rockland, cat. #009-01015) diluted serially 2-fold, beginning at 500 ng/mL. The plates were incubated 1 h at 25° C., washed three times with PBS-T, and incubated with 50 μl/well of anti-kappa HRP conjugate (Southern Biotech, cat. #2060-05), diluted 10,000-fold in PBS-T for 1 h at 25° C. The plate was washed three times with PBS-T, and developed with 50 μl/well 1-Step Ultra TMB-ELISA (Thermo Scientific, cat. #34028). The reaction was terminated by the addition of 2 N H2SO4 and the A450 was quantitated using a Spectramax plate reader.

Ab1 Fab expressed well in bacteria. Fab isolated from the periplasmic fraction of 3 mL cultures of *E. coli* ranged from 18 μg/mL to 188 μg/mL (average=84+/−67 μg/mL, n=10). For comparison, two unrelated Fab clones that also bind the extra-cellular domain of huROR1, one humanized and one chimeric, expressed 9.26+/−2.16 μg/mL and 5.13+/−0.39 μg/mL, respectively.

The previously described filter lift assay provides a visual, qualitative assessment of antigen binding (Example 1). In order to assess the ROR1 binding activity of Ab1 Fab in a more quantitative fashion, an ELISA assay was developed. A 96-well Costar-3366 plate was coated with 50 μL/well of 1 μg/mL human ROR1-ECD (ACROBiosystems, cat. #RO1-H522y) in PBS overnight at 4° C. The plate was rinsed once with PBS-T and blocked with 100 μL/well of 5% M-P for 1 h at 25° C. Fab samples were serially diluted 3-fold using 5% M-P and 50 μL/well was incubated for 1 h at 25° C. The plate was washed three times with PBS-T and 50 μL/well anti-human kappa, and HRP conjugate (Southern Biotech, cat. #2060-05) diluted 10,000-fold in 5% M-P was added for 1 h at 25° C. In certain assays (extended wash format), the plate was placed in large volumes (up to 1 L) of PBS-T and incubated, with mixing, for 2-5 h prior to the addition of anti-human kappa, HRP conjugate. The plate was washed three times with PBS-T, and developed with 50 μL/well 1-Step Ultra TMB-ELISA (Thermo Scientific, cat. #34028). The reaction was terminated by the addition of 2 N H2SO4 and the A450 was determined using a Spectramax plate reader.

The Ab1 Fab bound immobilized huROR1-ECD in a concentration-dependent manner (FIG. 2). The $K_D$ in this assay format was 3.0 nM, while the $K_D$ of the chimeric and humanized control ROR1 Fabs were 9.7 nM and >125 nM, respectively. No binding of irrelevant Fab was detected in this assay. The $K_D$ of Ab1 Fab in this assay was consistent with the modified filter lift assay, in which binding was detected with low nanomolar biotinylated huROR1-ECD. Collectively, these data demonstrate the expression of functional Ab1 Fab in bacteria and support the use of the phage expression system for affinity maturation of the antibody.

Example 3. In Vitro Affinity Maturation of Ab1

In the absence of structural information regarding the interaction of Ab1 with huROR1, a comprehensive mutagenesis strategy was employed for affinity maturation. Specifically, site saturation mutagenesis was performed at every position of every CDR and the variants were screened for binding to soluble ROR1-ECD. For these studies, the AHo numbering scheme was used and the heavy chain CDRs were delineated by the combination of Kabat and IMGT definitions while the light chain CDRs were delineated by the Kabat definition. For simplicity, CDR libraries are named according to the chain (H, heavy chain or L, light chain) and the CDR number (1, 2, or 3). The libraries of heavy chain CDR3 (H3) and light chain CDR3 (L3) were created by Kunkel mutagenesis using degenerate NNK oligonucleotides at each scan position. To minimize the frequency of WT clones (non-mutated template) in the library, the target CDR was deleted from the Ab1 template prior to mutagenesis. The libraries of heavy chain CDR1 (H1), CDR2 (H2), light chain CDR1 (L1) and CDR2 (L2) were also built on deletion templates but were synthesized differently. Instead of using NNK degenerate oligonucleotides, nineteen non-wild-type codons were introduced at each position. Sequencing of the libraries demonstrated relatively equivalent representation of amino acids at each position and exclusion of wild type and termination codons. An example of the representation at each position of H1 and H2 is shown in FIG. 3. Following synthesis of the site saturation libraries, two different screening strategies were employed. In some cases, each CDR position was screened as a single library, while in other cases the positional site saturation libraries within a CDR were pooled and the entire CDR library was screened.

Figure 4:
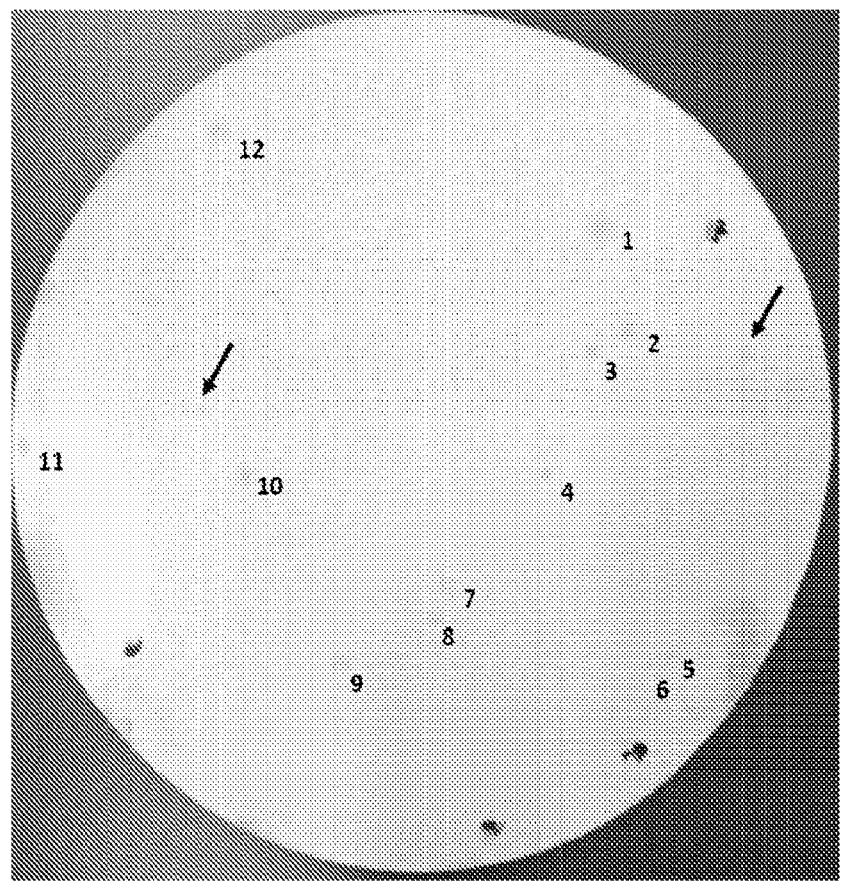
FIG. 4 is a photograph showing a capture lift assay indicating the binding of Ab1 variants to human ROR1. The binding variants are numbered, while less intense staining variants are indicated with arrows.

All libraries were initially screened by capture lift to identify variants with improved binding. The capture lift assay, described in Example 1, enables the filter lift assay to discern variants that bind antigen more strongly based on the staining intensity. In order to determine the optimal concentration of antigen to use for screening, biotinylated huROR1-ECD was titrated on a capture lift of Ab1 Fab. Binding to Ab1 was clearly visible at antigen concentrations ≥23 nM and the signal was diminished at lower huROR1 concentrations. Based on these results, library screening was performed at 2.3 nM as this concentration stained with a lower intensity, providing an opportunity to identify higher affinity, more intensely staining variants in the first round of screening. In addition, for more stringent screening, filters were probed with lower concentrations of antigen and/or development of the filter was terminated earlier, before the Ab1 staining was visible. Ab1 variants displayed a range of binding strengths, as demonstrated by the varying intensity of plaques on the lift. For example, a representative L3 library lift is shown in FIG. 4. In this example, approximately 250 library variants were plated. Twelve variants clearly bound huROR1 (FIG. 4, numbered). Less intense staining variants are indicated with arrows and other variants did not stain at all under these conditions. Exemplary clones identified on the capture lifts (those displaying the most intense signals) were picked, grown in culture and the DNA was sequenced. Using this approach, mutations that demonstrated huROR1 binding were identified in every CDR. Ab1 variants that bound huROR1-ECD under these conditions are summarized in Tables 1-7 (heavy chain CDR1, CDR2a, CDR2b, CDR3 and light chain CDR1, CDR2, and CDR3, respectively). The H2 CDR is 17 amino acids in length and the data from screening this library is split into two tables, Table 2 and Table 3.

TABLE 1

H-CDR1 (H1)

| Residue Number & Amino Acid | | | | | | | | | ELISA $K_D$ (nM) | | | SEQ ID |
|---|---|---|---|---|---|---|---|---|---|---|---|---|
| 27 | 29 | 30 | 31 | 32 | 33 | 39 | 40 | 41 | 42 | WT | Variant | CDR SEQ | NO: |
| G | Y | A | F | T | A | Y | N | I | H | | | GYAFTAYNIH | 13 |
| D | | | | | | | | | | | | DYAFTAYNIH | 14 |
| N | | | | | | | | | | 3.2 | 8.4 | NYAFTAYNIH | 15 |
| R | | | | | | | | | | | | RYAFTAYNIH | 16 |
| T | | | | | | | | | | | | TYAFTAYNIH | 17 |
| | G | | | | | | | | | 3.2 | 7.1 | GGAFTAYNIH | 18 |
| | K | | | | | | | | | | | GKAFTAYNIH | 19 |
| | S | | | | | | | | | | | GSAFTAYNIH | 20 |
| | | I | | | | | | | | | | GYIFTAYNIH | 21 |
| | | P | | | | | | | | 3.2 | 12 | GYPFTAYNIH | 22 |
| | | R | | | | | | | | | | GYRFTAYNIH | 23 |
| | | T | | | | | | | | 3.2 | 16 | GYTFTAYNIH | 24 |
| | | | I | | | | | | | 3.2 | 5.8 | GYAITAYNIH | 25 |
| | | | L | | | | | | | | | GYALTAYNIH | 26 |
| | | | V | | | | | | | 3.2 | 8.3 | GYAVTAYNIH | 27 |
| | | | W | | | | | | | | | GYAWTAYNIH | 28 |
| | | | | | A | | | | | 6.0 | 1.5 | GYAFAAYNIH | 29 |

TABLE 1-continued

H-CDR1 (H1)

| \multicolumn{10}{c|}{Residue Number & Amino Acid} | \multicolumn{2}{c|}{ELISA $K_D$ (nM)} | | |
|---|---|---|---|---|---|---|---|---|---|---|---|---|---|
| 27 | 29 | 30 | 31 | 32 | 33 | 39 | 40 | 41 | 42 | WT | Variant | CDR SEQ | SEQ ID NO: |
|  |  |  | D |  |  |  |  |  |  |  |  | GYAFDAYNIH | 30 |
|  |  |  | E |  |  |  |  |  |  | 6.0 | 3.3 | GYAFEAYNIH | 31 |
|  |  |  |  |  | M |  |  |  |  | 3.2 | 15 | GYAFTMYNIH | 32 |
|  |  |  |  |  | S |  |  |  |  | 3.2 | 11 | GYAFTSYNIH | 33 |
|  |  |  |  |  |  | F |  |  |  | 3.2 | 5.7 | GYAFTAFNIH | 34 |
|  |  |  |  |  |  | W |  |  |  | 3.2 | 3.3 | GYAFTAWNIH | 35 |
|  |  |  |  |  |  |  | K |  |  |  |  | GYAFTAYKIH | 36 |
|  |  |  |  |  |  |  | P |  |  | 3.2 | 40 | GYAFTAYPIH | 37 |
|  |  |  |  |  |  |  | R |  |  | 3.2 | 43 | GYAFTAYRIH | 38 |
|  |  |  |  |  |  |  |  | L |  |  |  | GYAFTAYNLH | 39 |
|  |  |  |  |  |  |  |  | V |  | 3.2 | 3.5 | GYAFTAYNVH | 40 |
|  |  |  |  |  |  |  |  |  | Q |  |  | GYAFTAYNIQ | 41 |

TABLE 2

H-CDR2a (residues 57 - 67) (H2)

| \multicolumn{8}{c|}{Residue Number & Amino Acid} | \multicolumn{2}{c|}{ELISA $K_D$ nM)} | | |
|---|---|---|---|---|---|---|---|---|---|---|---|
| 57 | 58 | 59 | 60 | 61 | 65 | 66 | 67 | WT | Variant | CDR SEQ | SEQ ID NO: |
| S | F | D | P | Y | D | G | G |  |  | SFDPYDGGSSYNQKFKD | 42 |
| A |  |  |  |  |  |  |  | 1.4 | 3.6 | AFDPYDGGSSYNQKFKD | 43 |
| K |  |  |  |  |  |  |  |  |  | KFDPYDGGSSYNQKFKD | 44 |
| R |  |  |  |  |  |  |  |  |  | RFDPYDGGSSYNQKFKD | 45 |
| T |  |  |  |  |  |  |  |  |  | TFDPYDGGSSYNQKFKD | 46 |
|  | I |  |  |  |  |  |  | 1.6 | 1.8 | SIDPYDGGSSYNQKFKD | 47 |
|  | P |  |  |  |  |  |  |  |  | SPDPYDGGSSYNQKFKD | 48 |
|  | V |  |  |  |  |  |  | 1.6 | 0.9 | SVDPYDGGSSYNQKFKD | 49 |
|  |  | S |  |  |  |  |  |  |  | SFSPYDGGSSYNQKFKD | 50 |
|  |  |  | G |  |  |  |  |  |  | SFDGYDGGSSYNQKFKD | 51 |
|  |  |  | T |  |  |  |  |  |  | SFDTYDGGSSYNQKFKD | 52 |
|  |  |  |  | E |  |  |  | 1.2 | 4.9 | SFDPYEGGSSYNQKFKD | 53 |
|  |  |  |  | N |  |  |  |  |  | SFDPYNGGSSYNQKFKD | 54 |
|  |  |  |  | T |  |  |  |  |  | SFDPYTGGSSYNQKFKD | 55 |
|  |  |  |  |  | D |  |  | 1.6 | 2.2 | SFDPYDDGSSYNQKFKD | 56 |
|  |  |  |  |  | E |  |  | 1.3 | 0.9 | SFDPYDEGSSYNQKFKD | 57 |
|  |  |  |  |  | H |  |  | 1.3 | 1.4 | SFDPYDHGSSYNQKFKD | 58 |
|  |  |  |  |  | N |  |  | 1.3 | 2.2 | SFDPYDNGSSYNQKFKD | 59 |
|  |  |  |  |  |  | H |  |  |  | SFDPYDGHSSYNQKFKD | 60 |

TABLE 2-continued

H-CDR2a (residues 57 - 67) (H2)

| Residue Number & Amino Acid | | | | | | | | ELISA $K_D$ (nM) | | | SEQ ID |
|---|---|---|---|---|---|---|---|---|---|---|---|
| 57 | 58 | 59 | 60 | 61 | 65 | 66 | 67 | WT | Variant | CDR SEQ | NO: |
| | | | | | | | K | 1.3 | 2.3 | SFDPYDGKSSYNQKFKD | 61 |
| | | | | | | | M | | | SFDPYDGMSSYNQKFKD | 62 |
| | | | | | | | P | 1.2 | 0.6 | SFDPYDGPSSYNQKFKD | 63 |
| | | | | | | | Q | 1.2 | <1.0 | SFDPYDGQSSYNQKFKD | 64 |
| | | | | | | | R | 1.3 | 1.7 | SFDPYDGRSSYNQKFKD | 65 |
| | | | | | | | S | | | SFDPYDGSSSYNQKFKD | 66 |
| | | | | | | | Y | 5.7 | 6.3 | SFDPYDGYSSYNQKFKD | 67 |

TABLE 3

H-CDR2b (residues 68 - 76)(H2)

| Residue Number & Amino Acid | | | | | | | | | ELISA $K_D$ (nM) | | | SEQ ID |
|---|---|---|---|---|---|---|---|---|---|---|---|---|
| 68 | 69 | 70 | 71 | 72 | 73 | 74 | 75 | 76 | WT | Variant | CDR SEQ | NO: |
| S | S | Y | N | Q | K | F | K | D | | | SFDPYDGGSSYNQKFKD | 42 |
| A | | | | | | | | | 1.3 | 1.2 | SFDPYDGGASYNQKFKD | 68 |
| E | | | | | | | | | | | SFDPYDGGESYNQKFKD | 69 |
| I | | | | | | | | | | | SFDPYDGGISYNQKFKD | 70 |
| Q | | | | | | | | | | | SFDPYDGGQSYNQKFKD | 71 |
| T | | | | | | | | | 5.7 | 6.4 | SFDPYDGGTSYNQKFKD | 72 |
| | E | | | | | | | | 1.3 | 1.2 | SFDPYDGGSEYNQKFKD | 73 |
| | K | | | | | | | | 5.7 | 46 | SFDPYDGGSKYNQKFKD | 74 |
| | V | | | | | | | | 1.3 | 1.0 | SFDPYDGGSVYNQKFKD | 75 |
| | | I | | | | | | | 1.4 | 1.7 | SFDPYDGGSSINQKFKD | 76 |
| | | V | | | | | | | 1.6 | 1.5 | SFDPYDGGSSVNQKFKD | 77 |
| | | | A | | | | | | 1.6 | 1.3 | SFDPYDGGSSYAQKFKD | 78 |
| | | | G | | | | | | 1.2 | 1.5 | SFDPYDGGSSYGQKFKD | 79 |
| | | | H | | | | | | 1.6 | 1.1 | SFDPYDGGSSYHQKFKD | 80 |
| | | | S | | | | | | 1.2 | 1.2 | SFDPYDGGSSYSQKFKD | 81 |
| | | | | N | | | | | 1.2 | 1.3 | SFDPYDGGSSYSNKFKD | 82 |
| | | | | P | | | | | 1.2 | 1.0 | SFDPYDGGSSYSPKFKD | 83 |
| | | | | | C | | | | | | SFDPYDGGSSYNQCFKD | 84 |
| | | | | | S | | | | | | SFDPYDGGSSYNQSFKD | 85 |
| | | | | | | A | | | | | SFDPYDGGSSYNQKFAD | 86 |
| | | | | | | G | | | | | SFDPYDGGSSYNQKFGD | 87 |
| | | | | | | | V | | 1.3 | 1.8 | SFDPYDGGSSYNQKFKV | 88 |

TABLE 4

H-CDR3 (H3)

| 107 | 108 | 109 | 110 | 111 | 135 | 136 | 137 | 138 | CDR SEQ | SEQ ID NO: |
|---|---|---|---|---|---|---|---|---|---|---|
| A | R | G | W | Y | Y | F | D | Y | ARGWYYFDY | 89 |
| T | | | | | | | | | TRGWYYFDY | 90 |
| V | | | | | | | | | VRGWYYFDY | 91 |
| | | G | | | | | | | AGGWYYFDY | 92 |
| | | | C | | | | | | ARGCYYFDY | 93 |
| | | | F | | | | | | ARGFYYFDY | 94 |
| | | | | A | | | | | ARGWAYFDY | 95 |
| | | | | L | | | | | ARGWLYFDY | 96 |
| | | | | | | L | | | ARGWYYLDY | 97 |
| | | | | | | | | Q | ARGWYYFDQ | 98 |
| | | | | | | | | T | ARGWYYFDT | 99 |
| | | | | | | | | V | ARGWYYFDV | 100 |

TABLE 5

L-CDR1 (L1)

| 24 | 25 | 26 | 29 | 30 | 31 | 32 | 39 | 40 | 41 | 42 | WT ELISA $K_D$ (nM) | Variant ELISA $K_D$ (nM) | CDR SEQ | SEQ ID NO: |
|---|---|---|---|---|---|---|---|---|---|---|---|---|---|---|
| R | A | S | K | S | I | S | K | Y | L | A | | | RASKSISKYLA | 101 |
| | P | | | | | | | | | | 1.5 | 0.7 | RPSKSISKYLA | 102 |
| | | E | | | | | | | | | 1.5 | 1.2 | RASESISKYLA | 103 |
| | | S | | | | | | | | | 1.5 | 0.9 | RASSSISKYLA | 104 |
| | | | A | | | | | | | | 1.5 | 1.5 | RASKAISKYLA | 105 |
| | | | F | | | | | | | | 8.1 | 18 | RASKFISKYLA | 106 |
| | | | H | | | | | | | | 1.5 | 1.4 | RASKHISKYLA | 107 |
| | | | P | | | | | | | | 8.1 | 16 | RASKPISKYLA | 108 |
| | | | | V | | | | | | | 1.5 | 2.8 | RASKSVSKYLA | 109 |
| | | | | | A | | | | | | 1.0 | 1.1 | RASKSIAKYLA | 110 |
| | | | | | I | | | | | | 1.0 | 1.9 | RASKSIIKYLA | 111 |
| | | | | | | | | | M | | 1.0 | 1.3 | RASKSISKYMA | 112 |
| | | | | | | | | | V | | 1.0 | 1.1 | RASKSISKYVA | 113 |

TABLE 6

L-CDR2 (L2)

| 58 | 67 | 68 | 69 | 70 | 71 | 72 | WT ELISA $K_D$ (nM) | Variant ELISA $K_D$ (nM) | CDR SEQ | SEQ ID NO: |
|---|---|---|---|---|---|---|---|---|---|---|
| S | G | S | T | L | Q | S | | | SGSTLQS | 114 |
| | | G | | | | | 1.0 | 1.6 | SGGTLQS | 115 |
| | | R | | | | | 8.1 | 11 | SGRTLQS | 116 |
| | | | H | | | | 2.9 | 1.5 | SGSHLQS | 117 |
| | | | R | | | | 2.9 | 2.1 | SGSRLQS | 118 |
| | | | | H | | | 2.9 | 2.3 | SGSTHQS | 119 |
| | | | | K | | | 2.9 | 1.5 | SGSTKQS | 120 |
| | | | | | T | | 1.5 | 1.1 | SGSTLTS | 121 |
| | | | | | V | | 1.0 | 1.3 | SGSTLVS | 122 |

TABLE 7

L-CDR3 (L3)

| Residue Number & Amino Acid | | | | | | | | | | SEQ ID NO: |
|---|---|---|---|---|---|---|---|---|---|---|
| 107 | 108 | 109 | 110 | 111 | 135 | 136 | 137 | 138 | CDR SEQ | |
| Q | Q | H | D | E | S | P | Y | T | QQHDESPYT | 123 |
| S | | | | | | | | | SQHDESPYT | 124 |
| | A | | | | | | | | QAHDESPYT | 125 |
| | L | | | | | | | | QLHDESPYT | 126 |
| | R | | | | | | | | QRHDESPYT | 127 |
| | | N | | | | | | | QQNDESPYT | 128 |
| | | Q | | | | | | | QQQDESPYT | 129 |
| | | | H | | | | | | QQHHESPYT | 130 |
| | | | N | | | | | | QQHNESPYT | 131 |
| | | | | I | | | | | QQHDISPYT | 132 |
| | | | | L | | | | | QQHDLSPYT | 133 |
| | | | | | G | | | | QQHDEGPYT | 134 |
| | | | | | H | | | | QQHDEHPYT | 135 |
| | | | | | P | | | | QQHDEPPYT | 136 |
| | | | | | V | | | | QQHDEVPYT | 137 |
| | | | | | | | T | | QQHDESPTT | 138 |
| | | | | | | | V | | QQHDESPVT | 139 |
| | | | | | | | | F | QQHDESPYF | 140 |
| | | | | | | | | S | QQHDESPYS | 141 |

Figure 5:
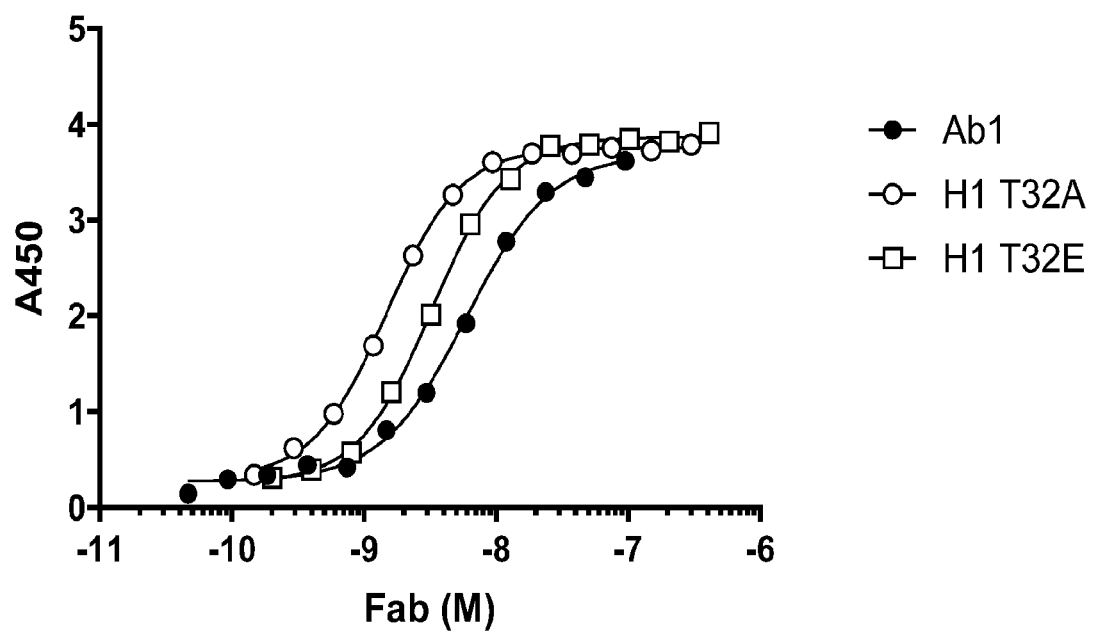
FIG. 5 is a graph showing the binding of soluble Fab (Ab1, or variants with H-CDR1 amino acid substitution T32A or T32E) to huROR1-ECD as characterized by ELISA.
Figure 6:
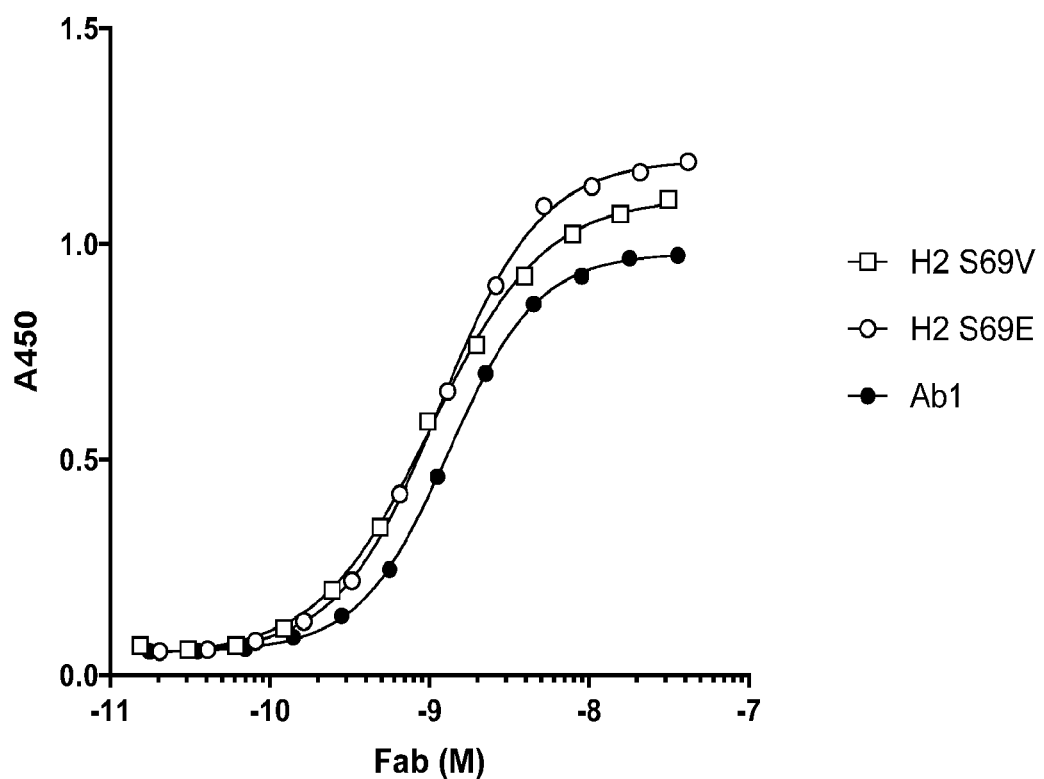
FIG. 6 is a graph showing the binding of soluble Fab (Ab1, or variants with H-CDR2 amino acid substitution S69V or S69E) to huROR1-ECD as characterized by ELISA.
Figure 7:
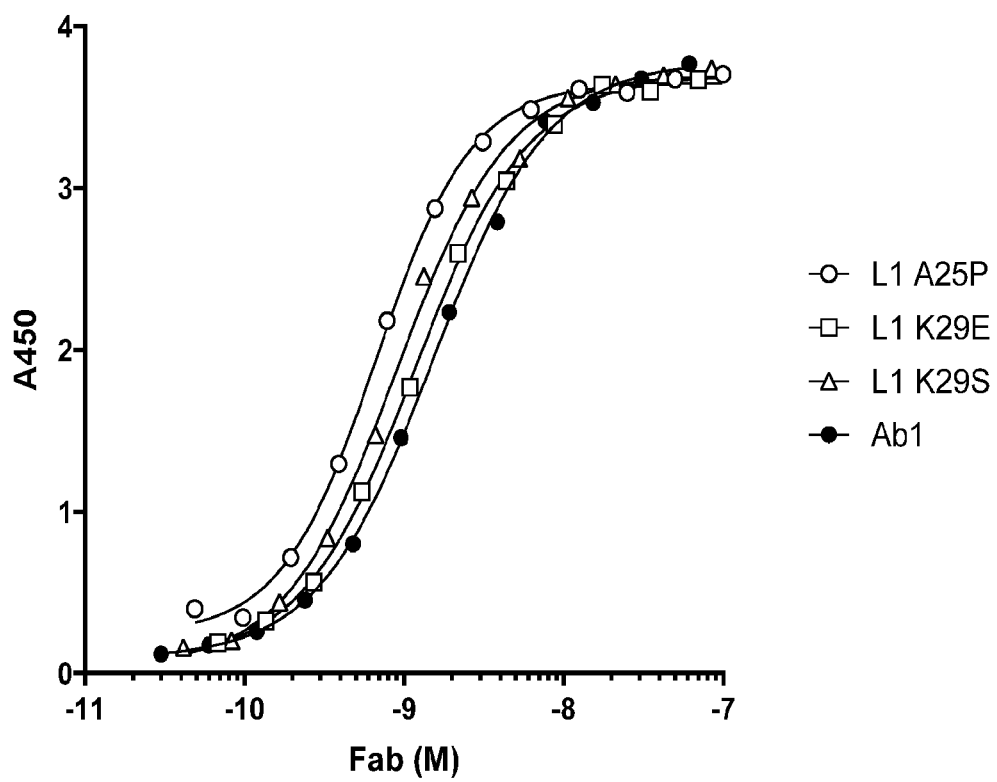
FIG. 7 is a graph showing the binding of soluble Fab (Ab1, or variants with L-CDR1 amino acid substitution A25P, K29E, or K29S) to huROR1-ECD as characterized by ELISA.
Figure 8:
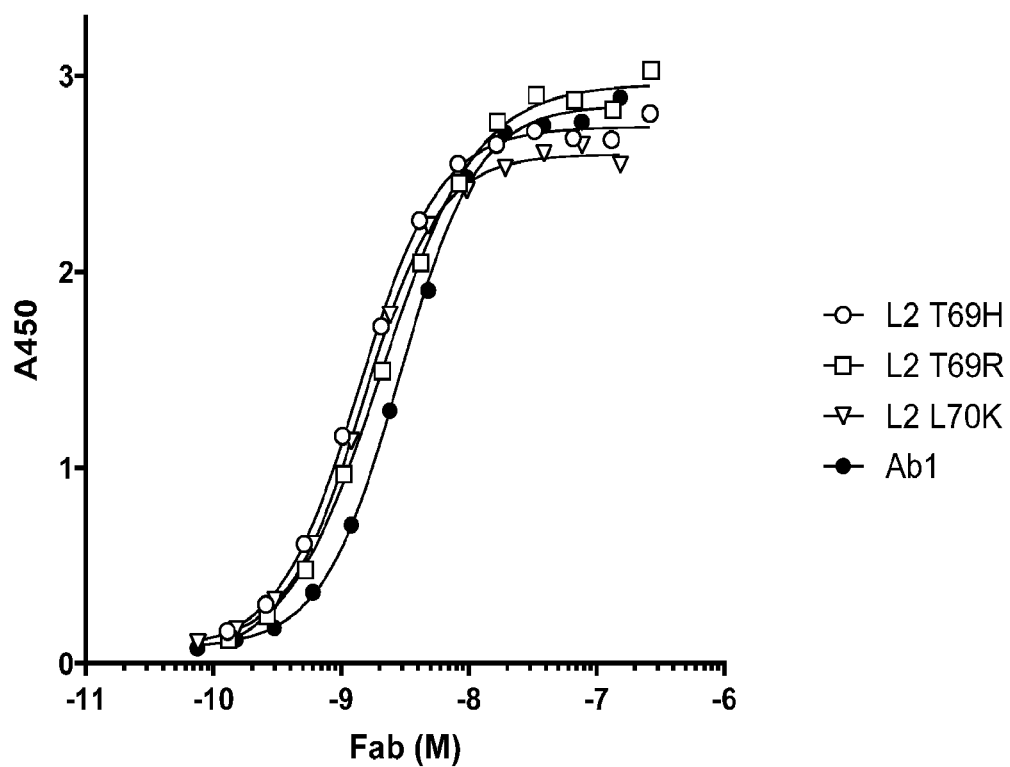
FIG. 8 is a graph showing the binding of soluble Fab (Ab1, or variants with L-CDR2 amino acid substitution T69H, T69R, or L70K) to huROR1-ECD as characterized by ELISA.

Certain variants that displayed higher intensity staining on the capture lifts were further characterized by ELISA, using soluble Fab obtained from periplasmic preps, as described in Example 2. Titration of soluble Fab against huROR1-ECD enabled a more precise comparison of the relative affinities of variants. In addition, Ab1 was included on every ELISA plate to control for assay variability. Certain mutations that increased the binding of Ab1 to huROR1-ECD in this assay format were identified. For example, mutation of heavy chain CDR1 residue T32 to either alanine (H1 T32A) or glutamic acid (H1 T32E) increased the binding of Ab1 by approximately 4-fold or 2-fold, respectively (FIG. 5). Similarly, affinity-enhancing mutations were identified in heavy chain CDR2 (FIG. 6), light chain CDR1 (FIG. 7) and light chain CDR2 (FIG. 8). The relative affinities measured in this way are summarized in Tables 1-7. These experiments identified multiple mutations from different CDRs of both heavy and light chains that maintain or improve the affinity of Ab1.

Example 4. Synthesis, Expression and Screening of Combinatorial Libraries

In order to further optimize the affinity of Ab1, the beneficial mutations identified from screening the CDR site saturation libraries were tested in various combinations with the H1 T32A mutation. In the first step, beneficial mutations from L1 or L2 or H2 were combined with the H1 T32A to create three libraries (Table 8, Library 1, 2 and 3, respectively). The unique combinations of mutations present in each library are summarized in Table 9 (H1 T32A×L1 mutations), Table 10 (H1 T32A×L2 mutations) and Table 11 (H1 T32A×H2 mutations).

In a parallel approach, a template comprising the best heavy chain variant, T32A, and the light chain variant L1 A25P, was used to evaluate combinations with beneficial mutations from L2 (Table 8, Library 4). The unique combinations of mutations present in this library are summarized in Table 12 (H1 T32A+L1 A25P×L2 mutations).

Additionally, a template comprising the best heavy chain variant, T32A, and the light chain variant L2 T69R, was used to evaluate combinations with beneficial mutations from L1 (Table 8, Library 5). The unique combinations of mutations present in this library are summarized in Table 13 (H1 T32A+L2 T69R×L1 mutations).

Subsequently, the libraries were screened by capture lift to identify the strongest binding variants. The identity of the variants was determined by DNA sequencing and the relative affinities were characterized using an ELISA (described in Example 2) modified to enable further discrimination between the highest affinity variants. Specifically, following the initial incubation with soluble Fab, the plates were washed for a prolonged time (>1 h) in large volumes of PBS-T. The plates were then developed as described in Example 2.

Alteration of the assay conditions enables the binding of high affinity variants to be distinguished from one another, but precludes the direct comparison of EC50 values to screening data obtained under different assay parameters (Example 3). For each library, the binding of the variants was compared to the appropriate clone, corresponding to the template the library was built upon. For example, variants from libraries built upon H1 T32A were compared to clone H1 T32A in order to identify further improvements in binding affinity.

Screening of the first three libraries, all built upon the H1 T32A template, identified multiple combinations that further increased binding affinity over variant H1 T32A (summarized in Table 9, Table 10, and Table 11). For example, screening of Library 1 identified the combination of L1 A25P with H1 T32A (FIG. 9, Panel A, compare open circles with closed squares), while screening of library 2 identified the combinations of L2 T69H or L2 T69R with H1 T32A (FIG. 9, Panel A, compare open squares or open triangles, respectively, with closed squares).

In addition to the simple combinations of two mutations described above, variants containing >2 mutations were also identified. For example, combining light chain mutations L1 A25P and L2 T69R with H1 T32A led to a substantial improvement in binding (FIG. 9, Panel B, compare open triangles with open circles). Likewise, the combination of L1 K29S and L2 T69R with H1 T32A also improved binding relative to H1 T32A alone (FIG. 9, Panel B, compare inverted closed triangles with open circles).

Collectively, these data demonstrate that individual mutations identified through screening of site saturation CDR libraries can be combined to further improve affinity. Additionally, multiple variants with distinct sequences and higher affinity than Ab1 or H1 T32A were identified by this approach.

TABLE 8

Combinatorial libraries

| Library | Template | Library CDR | Mutations | Unique Diversity |
|---|---|---|---|---|
| 1 | H1 T32A | L1 | A25P, K29E, K29S | 5 |
| 2 | H1 T32A | L2 | T69R, T69H, L70K, Q71T | 11 |
| 3 | H1 T32A | H2 | F58I, F58V, G66E, S69V, N71H | 23 |
| 4 | H1 T32A + L1 A25P | L2 | T69R, T69H, L70K, Q71T | 11 |
| 5 | H1 T32A + L2 T69R | L1 | A25P, K29E, K29S | 5 |

TABLE 9

Library 1 (L1 Variants on H1 T32A template)

| Residue Number & Amino Acid | | | | | | | | | | ELISA $K_D$ (nM) | | CDR SEQ | SEQ ID NO: |
|---|---|---|---|---|---|---|---|---|---|---|---|---|---|
| 24 | 25 | 26 | 29 | 30 | 31 | 32 | 39 | 40 | 41 | 42 Template | Variant | | |
| R | A | S | K | S | I | S | K | Y | L | A | | RASKSISKYLA | 101 |
| | P | | | | | | | | | | 3.0 | 1.8 | RPSKSISKYLA | 102 |
| | | | E | | | | | | | | 2.7 | 3.3 | RASESISKYLA | 103 |
| | | | S | | | | | | | | 2.7 | 2.1 | RASSSISKYLA | 104 |
| | P | | E | | | | | | | | | | RPSESISKYLA | 142 |
| | P | | S | | | | | | | | | | RPSSSISKYLA | 143 |

TABLE 10

Library 2 (L2 Variants on H1 T32A template)

| Residue Number & Amino Acid | | | | | | | ELISA $K_D$ (nM) | | CDR SEQ | SEQ ID NO: |
|---|---|---|---|---|---|---|---|---|---|---|
| 58 | 67 | 68 | 69 | 70 | 71 | 72 | Template | Variant | | |
| S | G | S | T | L | Q | S | | | SGSTLQS | 114 |
| | | | H | | | | 3.0 | 2.3 | SGSHLQS | 117 |
| | | | R | | | | 3.0 | 1.1 | SGSRLQS | 118 |
| | | | | K | | | | 1.6 | SGSTKQS | 120 |
| | | | | | T | | | | SGSTLTS | 121 |
| | | | H | K | | | | 1.8 | SGSHKQS | 144 |
| | | | H | | T | | | | SGSHLTS | 145 |
| | | | R | K | | | | | SGSRKQS | 146 |
| | | | R | | T | | | 1.1 | SGSRLTS | 147 |
| | | | | K | T | | | 1.6 | SGSTKTS | 148 |
| | | | H | K | T | | | 1.4 | SGSHKTS | 149 |
| | | | R | K | T | | | | SGSRKTS | 150 |

TABLE 11

Library 3 (H2 Variants on H1 T32A template)

| 58 | 59 | 60 | 61 | 65 | 66 | 67 | 68 | 69 | 70 | 71 | Template ELISA $K_D$ (nM) | Variant ELISA $K_D$ (nM) | CDR SEQ | SEQ ID NO: |
|---|---|---|---|---|---|---|---|---|---|---|---|---|---|---|
| F | D | P | Y | D | G | G | S | S | Y | N | | | SFDPYDGGSSYNQKFKD | 42 |
| I | | | | | | | | | | | 3.6 | 4.5 | SIDPYDGGSSYNQKFKD | 47 |
| V | | | | | | | | | | | 3.6 | 3.2 | SVDPYDGGSSYNQKFKD | 49 |
| | | | | | E | | | | | | 1.6 | 2.7 | SFDPYDEGSSYNQKFKD | 57 |
| | | | | | | | | V | | | 2.7 | 3.3 | SFDPYDGGSVYNQKFKD | 75 |
| | | | | | | | | | H | | 2.7 | 2.1 | SFDPYDGGSSYHQKFKD | 80 |
| I | | | | | E | | | | | | 3.6 | 5.0 | SIDPYDEGSSYNQKFKD | 151 |
| I | | | | | | | | V | | | 3.6 | 8.5 | SIDPYDGGSVYNQKFKD | 152 |
| I | | | | | | | | | H | | 1.6 | 2.2 | SIDPYDGGSSYHQKFKD | 153 |
| V | | | | | E | | | | | | 1.6 | 3.0 | SVDPYDEGSSYNQKFKD | 154 |
| V | | | | | | | | V | | | | | SVDPYDGGSVYNQKFKD | 155 |
| V | | | | | | | | | H | | 1.6 | 2.4 | SVDPYDGGSSYHQKFKD | 156 |
| | | | | | E | | | V | | | | | SFDPYDEGSVYNQKFKD | 157 |
| | | | | | E | | | | H | | | | SFDPYDEGSSYHQKFKD | 158 |
| | | | | | | | | V | H | | | | SFDPYDGGSVYHQKFKD | 159 |
| I | | | | | E | | | V | | | | | SIDPYDEGSVYNQKFKD | 160 |
| I | | | | | E | | | | H | | 3.6 | 3.4 | SIDPYDEGSSYHQKFKD | 161 |
| I | | | | | | | | V | H | | | | SIDPYDGGSVYHQKFKD | 162 |
| V | | | | | E | | | V | | | 1.6 | 8.0 | SVDPYDEGSVYNQKFKD | 163 |
| V | | | | | E | | | | H | | | | SVDPYDEGSSYHQKFKD | 164 |
| V | | | | | | | | V | H | | 1.6 | 3.9 | SVDPYDGGSVYHQKFKD | 165 |
| | | | | | E | | | V | H | | 3.6 | 3.2 | SFDPYDEGSVYHQKFKD | 166 |
| I | | | | | E | | | V | H | | | | SIDPYDEGSVYHQKFKD | 167 |
| V | | | | | E | | | V | H | | | | SVDPYDEGSVYHQKFKD | 168 |

TABLE 12

Library 4 (L2 Variants on H1 T32A + L1 A25P template)

| 58 | 67 | 68 | 69 | 70 | 71 | 72 | Template ELISA $K_D$ (nM) | Variant ELISA $K_D$ (nM) | CDR SEQ | SEQ ID NO: |
|---|---|---|---|---|---|---|---|---|---|---|
| S | G | S | T | L | Q | S | | | SGSTLQS | 114 |
| | | | | H | | | 1.8 | 2.3 | SGSHLQS | 117 |
| | | | | R | | | 1.8 | 2.4 | SGSRLQS | 118 |
| | | | | | K | | | 2.1 | SGSTKQS | 120 |
| | | | | | | T | | 2.9 | SGSTLTS | 121 |
| | | | | H | K | | | | SGSHKQS | 144 |
| | | | | H | | T | | | SGSHLTS | 145 |
| | | | | R | K | | | | SGSRKQS | 146 |
| | | | | R | | T | | | SGSRLTS | 147 |
| | | | | | K | T | | | SGSTKTS | 148 |

TABLE 12-continued

| Library 4 (L2 Variants on H1 T32A + L1 A25P template) | | | | | | | | | | |
|---|---|---|---|---|---|---|---|---|---|---|
| Residue Number & Amino Acid | | | | | | | ELISA $K_D$ (nM) | | | SEQ ID |
| 58 | 67 | 68 | 69 | 70 | 71 | 72 | Tem-plate | Variant | CDR SEQ | NO: |
| | | | H | K | T | | | | SGSHKTS | 149 |
| | | | R | K | T | | | | SGSRKTS | 150 |

TABLE 13

| Library 6 (L1 Variants on H1 T32A + LR2 T69R template) | | | | | | | | | | | | | | |
|---|---|---|---|---|---|---|---|---|---|---|---|---|---|---|
| Residue Number & Amino Acid | | | | | | | | | | | ELISA $K_D$ (nM) | | | SEQ ID |
| 24 | 25 | 26 | 29 | 30 | 31 | 32 | 39 | 40 | 41 | 42 | Template | Variant | CDR SEQ | NO: |
| R | A | S | K | S | I | S | K | Y | L | A | | | RASKSISKYLA | 101 |
| | P | | | | | | | | | | 2.3 | 2.1 | RPSKSISKYLA | 102 |
| | | | E | | | | | | | | 2.3 | 4.8 | RASESISKYLA | 103 |
| | | | S | | | | | | | | 2.3 | 2.1 | RASSSISKYLA | 104 |
| | P | | E | | | | | | | | | | RPSESISKYLA | 142 |
| | P | | S | | | | | | | | 2.3 | 3.9 | RPSSSISKYLA | 143 |

Example 5. Design, Expression and Characterization of Ab1 scFv Variants

Intact IgG antibodies have prolonged serum half-life due to FcRn receptor mediated recycling. The prolonged circulation time leads to elevated blood levels and exposure of healthy organs to the antibody, attributes that may be detrimental when developing imaging agents, radiotherapeutics, or antibody drug conjugate (ADC) therapies. In contrast, smaller antibody constructs have shorter circulation time in vivo due to the lack of the Fc region and their smaller size enables better tissue penetration. Shorter circulation time and better tissue penetration are beneficial attributes for tumor imaging (Mendler et al., *mAbs* (2015) 7(1):96-109). However, one potential drawback to the use of small, monovalent antibody constructs for tumor targeting is that they tend to diffuse out of the tumor as the plasma concentration drops due to the lack of avidity effect (multivalent binding). Thus, the affinity of monovalent antibodies for tumor cell surface antigen has a direct impact on tumor accumulation. The higher affinity Ab1 variants described in Examples 3 and 4 may overcome the limitation associated with using lower affinity monovalent antibody constructs, smaller single domain constructs, or bispecific antibody constructs with a single ROR1 targeting arm.

Certain higher affinity variants described in Examples 3 and 4 were used to create scFv format antibodies. Briefly, scFvs were designed with a pelB leader sequence to direct periplasmic expression, followed by the VH sequence, a 20-amino acid flexible linker consisting of $(Gly_4Ser)\times 3$ (SEQ ID NO: 180), and the VL sequence. In addition, human influenza hemagglutinin (HA) peptide and FLAG peptide tags were added to the carboxy-terminus of the constructs to enable purification and/or quantitation of the scFv protein. The parental Ab1 and two variants, H1 T32A and H1 T32A+L2 T69R, were expressed and characterized.

scFv constructs were expressed and isolated from the periplasmic space using the same protocol that was used for Fabs (Example 2). In order to quantitate the relative levels of scFv expression of the three variants, a 96-well Costar-3366 plate was coated with 50 μl/well of 2 μg/mL anti-FLAG-unlabeled (Rockland, cat. #600-401-383) in PBS overnight at 4° C. The plate was washed three times with PBS containing 0.05% Tween 20 (PBS-T) and blocked with 100 μL of 5% M-P. The plate was washed once, then 50 μl/well of sample dilutions was added. Sample dilutions were performed with 5% M-P. The plates were incubated 1 h at 25° C., washed three times with PBS-T, and incubated with 50 μl/well of anti-HA HRP conjugate (Roche, cat. #12013819001), diluted 1,000-fold in 5% M-P for 1 h at 25° C. The plate was washed three times with PBS-T, and developed with 50 μl/well 1-Step Ultra TMB-ELISA (Thermo Scientific, Prod. #34028, Lot #SF2405221). The reaction was terminated by the addition of 2 N H2504 and the A450 was determined using a Spectramax plate reader.

Next, the binding of the isolated scFv variants to huROR1-ECD was assessed by ELISA as described in Example 2. A 96-well Costar-3366 plate was coated with 50 μl/well of 1 μg/mL human ROR-1 (AcroBiosystems, cat. #R01H522Y) in PBS overnight at 4° C. The plate was washed three times with PBS-T and blocked with 100 μL of 5% M-P. The plate was washed once, then 50 μl/well of 2-fold serial dilutions of sample was added. Sample dilutions were performed with 5% M-P. The plates were incubated 1 h at 25° C., washed three times with PBS-T, and incubated with 50 μl/well of anti-HA HRP conjugate (Roche, cat. #12013819001), diluted 1,000-fold in 5% M-P for 1 h at 25° C. The plate was washed three times with PBS-T and developed with 50 μl/well 1-Step Ultra TMB-ELISA (Thermo Scientific, Prod. #34028, Lot #SF2405221). The reaction was terminated by the addition of 2 N $H_2SO_4$ and the A450 was determined using a Spectramax plate reader. In order to compare the relative binding strength of the scFv variants, the expression levels as determined using the scFv ELISA described above were normalized to the Ab1 parental construct. Similar to the Fab variants, H1 T32A+L2 T69R bound most strongly, followed by H1 T32A, and Ab1 (FIG. 10, open circles, open squares, closed circles, respectively). These data demonstrate that the scFv format preserved the enhanced affinity observed in the Fab format.

Example 6. Binding of Ab1 Fab and scFv Variants to Live Cells

The in vitro affinity maturation of Ab1 used recombinant huROR1-ECD for screening. In order to verify that the improvements in binding to the recombinant huROR1 protein would translate to improved tumor cell binding, select variants were characterized for binding to live ROR1-transfected MEC cells and/or JeKo-1 cells. The variants analyzed are summarized in Table 14. The JeKo-1 mantle cell lymphoma cell line has previously been demonstrated to express human ROR1 (Yang et al., *PLoS One* (2011) 6(6): e21018).

TABLE 14

Fab and scFv variants characterized for binding to live cells

| Clone Format | Mutations | |
|---|---|---|
| | Heavy Chain | Light Chain |
| Fab, scFv | WT | WT |
| Fab, scFv | H1 T32A | WT |
| Fab, scFv | H1 T32A | L2 T69R |
| Fab | H1 T32E | WT |
| Fab | H3 W110Y | WT |
| Fab | H1 T32A | L1 K29S |
| Fab | H1 T32A | L2 T69R, Q71T |
| Fab | H1 T32A + H2 N71H | WT |
| Fab | H1 T32A | L1 A25P + L2 T69R |
| Fab | H1 T32A | L1 A25P + L2 L70K |
| Fab | H1 T32A | L1 K29S + L2 T69R |

ROR1 binding was quantitated using flow cytometry and 2.5E5 ROR1-transfected MEC cells or JeKo-1 cells for each concentration of Fab variant. The cells were placed in 50 µL of PBS with 2% FBS. Next, the cells were diluted with an equal volume of 2× stock of the test Fab variant and the cells and antibody were co-incubated on ice for 20 min. The cells were then washed 3 times with 300 µL of FACS buffer and were resuspended in 100 µL of a 70-fold dilution of anti-HA.11-PE conjugate, clone 16B12 (BioLegend, cat. #901517) and incubated on ice with reduced light for 20 min. Subsequently, the cells were washed 3 times with 300 µL of FACS buffer and fixed with 2% paraformaldehyde for 10 min at 25° C. The cells then were washed 2 times with 300 µL of FACS buffer and analyzed on a Miltenyi MACSQuant Analyzer.

Figure 11:
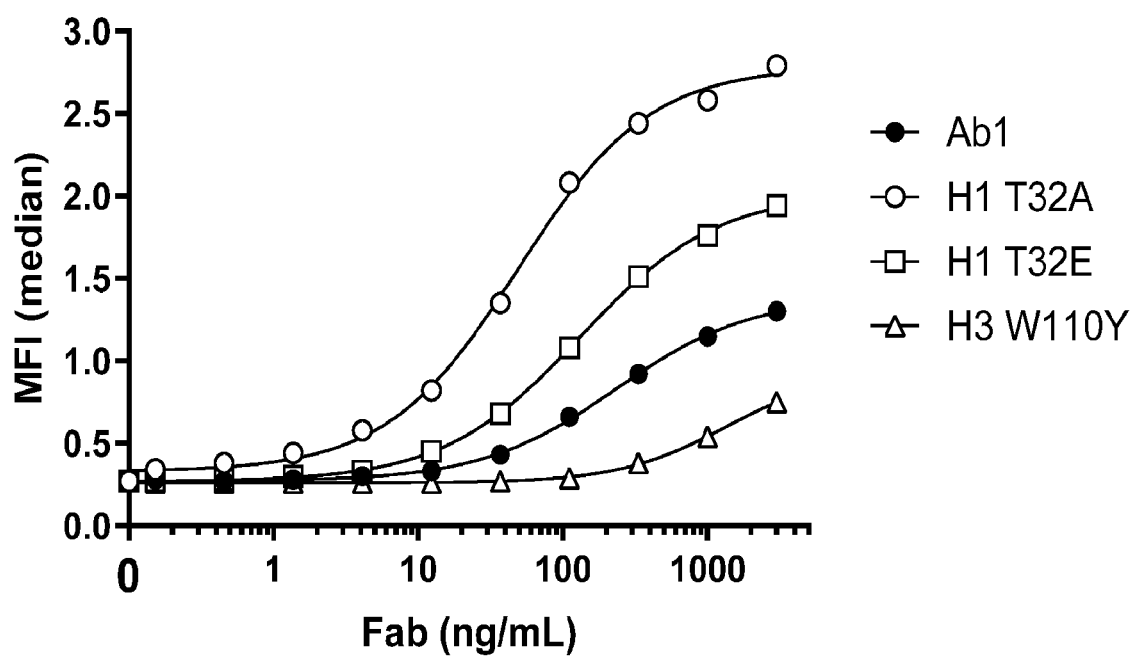
FIG. 11 is a graph showing binding to ROR1-transfected MEC cells of Ab1 Fab or variants with H-CDR1 amino acid substitution T32A or T32E or H-CDR3 amino acid substitution W110Y, as quantitated using flow cytometry.

Initially, three anti-ROR1 Fab variants, each differing from the parental antibody by a single amino acid, were characterized for binding to human ROR1 using live ROR1-transfected MEC cells. Two of the variants, H1 T32A and H1 T32E, displayed higher affinity than the parental Fab (FIG. 11, open circles and squares versus closed circles) while the other variant, H3 W110Y, displayed lower affinity (FIG. 11, triangles). The binding profiles of the variants on live ROR1-transfected MEC cells were consistent with the binding profiles obtained using recombinant huROR1-ECD and an ELISA (see Example 3, FIG. 5). No binding of any of the variants was detected when control empty vector transfected MEC cells were used (not shown), demonstrating the specificity of the variants for ROR1. These data demonstrate that the affinity improvements identified using recombinant huROR1-ECD are reflective of the binding to ROR1 on live ROR1-transfected cells for these variants.

Next, additional variants were characterized for binding to the JeKo-1 tumor cell line. JeKo-1 cells express lower levels of ROR1 (~13,000 copies/cell) than the ROR1-transfected MEC cells (~56,000 copies/cell). All Fab variants tested bound JeKo-1 cells more tightly than the parental Ab1 Fab (FIG. 12, Panel A, FIG. 12, Panel B). Variant H1 T32E binding to Jeko-1 cells was not characterized. In addition, five of the seven combinatorial variants bound more tightly than the H1 T32A variant (FIG. 12, Panel A, FIG. 12, Panel B). Combining L1 K29S or H2 N71H with H1 T32A did not appear to further improve binding to live cells (FIG. 12, Panel B, compare triangles with open circles). In summary, the improved binding of variants to recombinant huROR1-ECD in ELISA format reflected improved binding to tumor cells.

Figure 10:
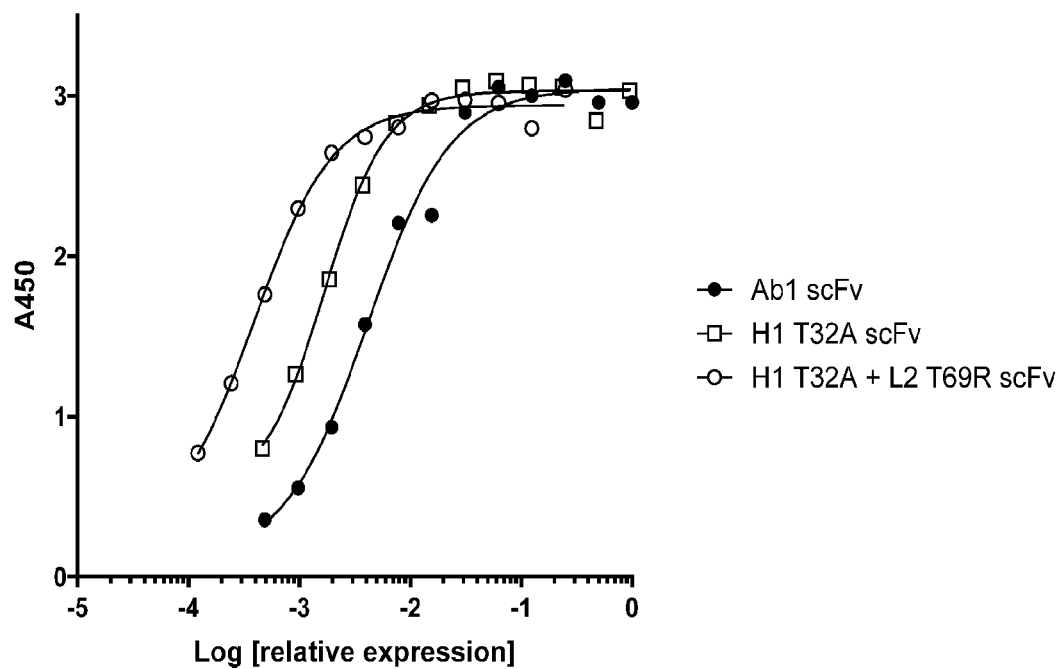
FIG. 10 is a graph showing binding to huROR1-ECD of Ab1 scFv or variants with H-CDR1 amino acid substitution T32A or H-CDR1 amino acid substitution T32A and L-CDR2 amino acid substitution T69R, as characterized by ELISA.

Finally, the binding of Ab1, Ab1.1 and Ab1.2 scFv constructs to JeKo-1 cells was also characterized. Similar to Fab variant binding to JeKo-1 cells (FIG. 12, Panel A, FIG. 12, Panel B) and variant binding to recombinant huROR1-ECD, as determined by ELISA (FIG. 9, Panel A, and FIG. 10), the combinatorial scFv variant H1 T32A+L2 T69R bound most tightly, followed by scFv variant H1 T32A (FIG. 12, Panel C). Both variants bind significantly stronger than the parental Ab1 scFv (FIG. 12, Panel C). Thus, the improved binding of Fab variants was preserved as the mutations were tested in the alternative, smaller scFv format.

Collectively, these data demonstrate the affinity maturation of Ab1. The improved affinity was >10-fold, as determined by multiple screening formats. Typically, avidity (bivalent interaction) can increase the apparent binding affinity of antibodies by up to 10-fold. Thus, the affinity maturation of Ab1 led to the identification of smaller, monovalent constructs that may bind tumor cells in vivo as avidly as the bivalent Ab1 IgG.

Example 7. Identification and Engineering of Potential Sequence Liabilities

Figure 13:
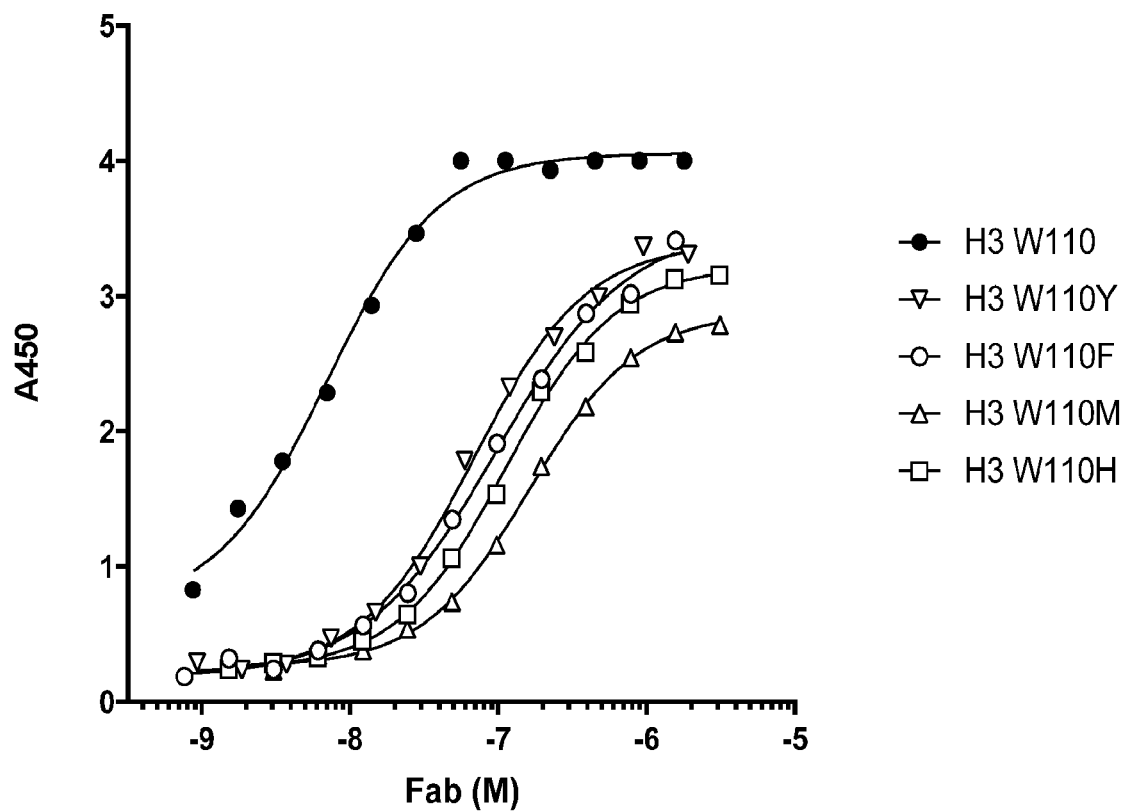
FIG. 13 is a graph showing the binding of soluble Fab (Ab1, or variants with H-CDR3 amino acid substitution W110F, W110H, W110M, or W110Y) to huROR1-ECD as characterized by ELISA.

In order to facilitate the clinical development of Ab1 it is desirable for the antibody to express at high levels, have low product heterogeneity, and be stable over long periods of time (reviewed in Jarasch et al., *J. Pharm Sci.* (2015) 104(6):1885-98). Product heterogeneity and stability are greatly impacted by chemical degradation, fragmentation, and aggregation. One example of a potential degradation event is the oxidation of solvent-exposed methionine and tryptophan residues. Previously, it has been demonstrated that oxidation may lead to loss of potency and/or aggregation. For these reasons, the sequence of Ab1 was evaluated for potential developability issues using the Therapeutic Antibody Profiler (Raybould et al., *Proc Natl Acad Sci USA* (2019) 116(10:4025-30). The analysis identified four residues potentially susceptible to oxidation: light chain M4 and W43 and heavy chain W110 and W139. Residues M4 and W43 of the light chain and W139 of the heavy chain are human germline amino acids associated with the antibody framework region and consequently, were not altered in order to avoid the introduction of potential immunogenic sequences. In contrast, heavy chain CDR3 is solvent-exposed and often involved in antigen binding. Therefore, oxidation of W110 might reduce target binding, reduce antibody stability, and/or induce aggregation. Given the potential liability of oxidation of W110, all nineteen non-wild-type amino acids were isolated from the H3 library, confirmed by DNA sequencing, and soluble Fab was expressed and isolated from the periplasm of *E. coli*, as described in Example 2. The binding of variants to huROR1-ECD was characterized by ELISA, as described in Example 2. Mutation of W110 significantly impacted binding of Ab1 to ROR1. Little or no detectable binding was observed with A, E, G, K, L, N, Q, R, S and T substitutions, while significantly impaired binding was observed with C, D, I, P and V substitutions. Substitution with F, Y, M and H reduced binding by 10- to 23-fold (FIG. 13). The affinities of the most active W110 variants are summarized in Table 15.

TABLE 15

Identification of most active H3 W110 variants

| Residue Number & Amino Acid | | | | | | | | | ELISA $K_D$ (nM) | CDR SEQ | SEQ ID NO: |
|---|---|---|---|---|---|---|---|---|---|---|---|
| 107 | 108 | 109 | 110 | 111 | 135 | 136 | 137 | 138 | | | |
| A | R | G | W | Y | Y | F | D | Y | 7.0 | ARGWYYFDY | 89 |
|  |  |  | F |  |  |  |  |  | 96 | ARGFYYFDY | 94 |
|  |  |  | H |  |  |  |  |  | 110 | ARGHYYFDY | 169 |
|  |  |  | M |  |  |  |  |  | 160 | ARGMYYFDY | 170 |
|  |  |  | Y |  |  |  |  |  | 68 | ARGYYYFDY | 171 |

While the substitution of very large hydrophobic phenylalanine (F) or neutral tyrosine (Y) for the very large hydrophobic tryptophan (W) was not entirely unexpected, the substitution of histidine (H) or methionine (M) was more surprising. Although these four substitutions reduce binding by 10- to 23-fold it is possible that one (or more) of these mutations may be combined with the higher affinity variants described in Examples 3 and 4 to generate a variant that is both more stable and higher affinity than Ab1.

TABLE 15

| SEQ ID NO: | Sequence Descriptions DESCRIPTION |
|---|---|
| 1 | Ab1 VL nucleotide sequence |
| 2 | Ab1 VL amino acid sequence |
| 3 | Ab1 VH nucleotide sequence |
| 4 | Ab1 VH amino acid sequence |
| 5 | H1 T32A VH amino acid sequence |
| 6 | L2 T69R VL amino acid sequence |
| 7 | Ab1 scFv nucleotide sequence |
| 8 | Ab1 scFv amino acid sequence |
| 9 | H1 T32A Ab1 scFv nucleotide sequence |
| 10 | H1 T32A Ab1 scFv amino acid sequence |
| 11 | H1 T32A/L2 T69R Ab1 scFv nucleotide sequence |
| 12 | H1 T32A/L2 T69R Ab1 scFv amino acid sequence |
| 13-41 | H1 variant amino acid sequences (see Table 1) |
| 42-67 | H2a variant amino acid sequences (see Table 2) |
| 68-88 | H2b variant amino acid sequences (see Table 3) |
| 89-100 | H3 variant amino acid sequences (see Table 4) |
| 101-113 | L1 variant amino acid sequences (see Table 5) |
| 114-122 | L2 variant amino acid sequences (see Table 6) |
| 123-141 | L3 variant amino acid sequences (see Table 7) |
| 142 | L1 A25P/K29E amino acid sequence (see Table 9) |
| 143 | L1 A25P/K29S amino acid sequence (see Table 9) |
| 144-150 | L2 double and triple variant amino acid sequences (see Table 10) |
| 151-168 | H2 double and triple variant amino acid sequences (see Table 11) |

TABLE 15-continued

Sequence Descriptions

| | |
|---|---|
| 169-171 | H3 W110 variant amino acid sequences (see Table 15) |
| 172 | Ab1 H-FR1 amino acid sequence |
| 173 | Ab1 H-FR2 amino acid sequence |
| 174 | Ab1 H-FR3 amino acid sequence |
| 175 | Ab1 H-FR4 amino acid sequence |
| 176 | Ab1 L-FR1 amino acid sequence |
| 177 | Ab1 L-FR2 amino acid sequence |
| 178 | Ab1 L-FR3 amino acid sequence |
| 179 | Ab1 L-FR4 amino acid sequence |
| 180 | linker (Gly4Ser)3 |
| 181 | human ROR1 amino acid sequence |

SEQUENCES

SEQ ID NO: 1 (Ab1 VL DNA)
GATATTGTTATGACTCAAACTCCGTTGTCTTTAGCGGTAACGCCGGGTGAGCCCGCATCCAT
TTCTTGCCGTGCCTCAAAATCTATCTCTAAGTAGCTGGCTTGGTATGAGCAAAAGCCGGGTC
AGGCACCTCGCTTGTTAATTTACTCGGGGTCTACACTGCAATCTGGCATCCCGCCGCGTTTC
TCAGGGAGCGGATACGGCACGGATTTCACCTTAACTATCAACAACATCGAATCTGAAGACGC
CGCCTACTACTTTTGCCAACAGCATGATGAGTCACCTTACACTTTCGGTGAGGGAACGAACG
TTGAAATCAAA

SEQ ID NO: 2 (Ab1 VL peptide)
DIVMTQTPLSLPVTPGEPASISCRASKSISKYLAWYQQKPGQAPRLLIYSGSTLQSGIPPRF
SGSGYGTDFTLTINNIESEDAAYYFCQQHDESPYTFGEGTKVEIK SEQ ID NO: 3 (Ab1 VH DNA)
CAGGTTCAGCTTCAGGAATCTGGTCCTGGTTTAGTGAAACCTAGTCAGACATTAAGTCTTAC
ATGCACAGTTTCTGGCTATGCCTTCACGGCATATAACATCCACTGGGTACGCCAAGCCCCAG
GCCAGGGACTGGAATGGATGGGCAGCTTCGATCCCTATGATGGCGGTAGTTCGTACAACCAG
AAGTTCA&GGATCGCCTTACTATCTCAAAGGATACCTCGAAGAATCAGGTGGTCCTTACTAT
GACAAATATGGATCCAGTGGACACTGCCACATACTATTGCGCCCGTGGGTGGTAGTATTTTG
ACTAGTGGGGCCACGGGACTTTAGTGACGGTCTCCTCC SEQ ID NO: 4 (Ab1 VH peptide)
QVQLQESGPGLVKPSQTLSLTCTVSGYAFTAYNIHWVRQAPGQGLEWMGSFDPYDGGSSYNQ
KFKDRLTISKDTSKNQVVLTMTNMDPVDTATYYCARGWYYFDYWGHGTLVTVSS SEQ ID NO: 5 (H1 T32A Ab1 VH peptide)
QVQLQESGPGLVKPSQTLSLTCTVSGYAFAAYNIHWVRQAPGQGLEWMGSFDPYDGGSSYNQ
KFKDRLTISKDTSKNQVVLTMTNMDPVDTATYYCARGWYYFDYWGHGTLVTVSS SEQ ID NO: 6 (L2 T69R Ab1 VL peptide)
DIVMTQTPLSLPVTPGEPASISCRASKSISKYLAWYQQKPGQAPRLLIYSGSRLQSGIPPRF
SGSGYGTDFTLTINNIESEDAAYYFCQQHDESPYTFGEGTKVEIK SEQ ID NO: 7 (Ab1 scFv DNA)
CAGGTTCAGCTTCAGGAATCTGGTCCTGGTTTAGTGAAACCTAGTCAGACATTAAGTCTTAC
ATGCACAGTTTCTGGCTATGCCTTCACGGCATATAACATCCACTGGGTACGCCAAGCCCCAG
GCCAGGGACTGGAATGGATGGGCAGCTTCGATCCCTATGATGGCGGTAGTTCGTACAACCAG
AAGTTCAAGGATCGCCTTACTATCTCAAAGGATACCTCGAAGAATCAGGTGGTCCTTACTAT
GACAAATATGGATCCAGTGGACACTGCCACATACTATTGCGCCCGTGGGTGGTACTATTTTG
ACTACTGGGGCCACGGCACTTTAGTGACGGTCTCCTCCGGAGGTGCGGCTCGGGTGGGGGT
GGTAGTGGAGGAGGAGGCAGCGCAGATATTGTTATGACTCAAACTCCGTTGTCTTTACCGGT
AACGCCGGGTGAGCCCGCATCCATTTCTTGCCGTGCCTCAAAATCTATCTCTAAGTACCTTG
CTTGGTATCAGCAAAAGCCGGGTCAGGCACCTCGCTTGTTAATTTACTCGGGGTCTACACTG
CAATCTGGCATCCCGCCGCGTTTCTCAGGGAGCGGATACGGCACGGATTTCACCTTAACTAT
CAACAACATCGAATCTGAAGACGCCGCCTACTACTTTTGCCAACAGCATGATGAGTCACCTT
ACACTTTCGGTGAGGGAACGAAGGTTGAAATCAAACGGGATTACAAAGATGACGACGATAAG
GGGAAGCCAGGAAGTGGTAAACCCGGCTCCGGAAAGCCGGGAAGCGGCAAACCTGGTTCTTA
CCCGTACGATGTAGCTGACTACGCTTCA SEQ ID NO: 8 (Ab1 scFv peptide)
QVQLQESGPGLVKPSQTLSLTCTVSGYAFTAYNIHWVRQAPGQGLEWMGSFDPYDGGSSYNQ
KFKDRLTISKDTSKNQVVLTMTNMDPVDTATYYCARGWYYFDYWGHGTLVTVSSGGGGSGGG
GSGGGGSADIVMTQTPLSLPVTPGEPASISCRASKSISKYLAWYQQKPGQAPRLLIYSGSTL
QSGIPPRFSGSGYGTDFTLTINNIESEDAAYYFCQQHDESPYTFGEGTKVEIKRDYKDDDDK
GKPGSGKPGSGKPGSGKPGSYPYDVPDYAS TABLE 15-continued Sequence Descriptions SEQ ID NO: 9 (H1 T32A Ab1 scFv DNA)
CAGGTTCAGCTTCAGGAATCTGGTCCTGGTTTAGTGAAACCTAGTCAGACATTAAGTCTTAC
ATGCACAGTTTCTGGCTATGCCTTCGCAGCATATAACATCCACTGGGTACGCCAAGCCCCAG
GCCAGGGACTGGAATGGATGGGCAGCTTCGATCCCTATGATGGCGGTAGTTCGTACAACCAG
AAGTTCAAGGATCGCCTTACTATCTCAAAGGATACCTCGAAGAATCAGGTGGTCCTTACTAT
GACAAATATGGATCCAGTGGACACTGCCACATACTATTGCGCCCGTGGGTGGTACTATTTTG
ACTACTGGGGCCACGGCACTTTAGTGACGGTCTCCTCCGGAGGTGGCGGCTCGGGTGGGGGT
GGTAGTGGAGGAGGAGGCAGCGCAGATATTGTTATGACTCAAACTCCGTTGTCTTTACCGGT
AACGCCGGGTGAGCCCGCATCCATTTCTTGCCGTGCCTCAAAATCTATCTCTAAGTACCTGG
CTTGGTATCAGCAAAAGCCGGGTCAGGCACCTCGCTTGTTAATTTACTCGGGGTCTACACTG
CAATCTGGCATCCCGCCGCGTTTCTCAGGGAGCGGATACGGCACGGATTTCACCTTAACTAT
CAACAACATCGAATCTGAAGACGCCGCCTACTACTTTTGCCAACAGCATGATGAGTCACCTT
ACACTTTCGGTGAGGGAACGAAGGTTGAAATCAAACGGGATTACAAAGATGACGACGATAAG
GGGAAGCCAGGAAGTGGTAAACCCGGCTCCGGAAAGCCGGGAAGCGGCAAACCTGGTTCTTA
CCCGTACGATGTAGCTGACTAGGCTTCA SEQ ID NO: 10 (H1 T32A Ab1 scFv peptide)
QVQLQESGPGLVKPSQTLSLTCTVSGYAFAAYNIHWVRQAPGQGLEWMGSFDPYDGGSSYNQ
KFKDRLTISKDTSKNQVVLTMTNMDPVDTATYYCARGWYYFDYWGHGTLVTVSSGGGGSGGG
GSGGGGGSADIVMTQTPLSLPVTPGEPASISCRASKSISKYLAWYQQKPGQAPRLLIYSGSTL
QSGIPPRFSGSGYGTDFTLTINNIESEDAAYYFCQQHDESPYTFGEGTKVEIKRDYKDDDDK
GKPGSGKPGSGKPGSGKPGSYPYDVPDYAS SEQ ID NO: 11 (H1 T32A/L2 T69R Ab1 scFv DNA)
CAGGTTCAGCTTCAGGAATCTGGTCCTGGTTTAGTGAAACCTAGTCAGACATTAAGTCTTAC
ATGCACAGTTTCTGGCTATGCCTTCGCAGCATATAACATCCACTGGGTACGCCAAGCCCCAG
GCCAGGGACTGGAATGGATGGGCAGCTTCGATCCCTATGATGGCGGTAGTTCGTACAACCAG
AAGTTCAAGGATCGCCTTACTATCTCAAAGGATACCTCGAAGAATCAGGTGGTCCTTACTAT
GACAAATATGGATCCAGTGGACACTGCCACATACTATTGCGCCCGTGGGTGGTACTATTTTG
ACTACTGGGGCCACGGCACTTTAGTGACGGTCTCCTCCGGAGGTGGCGGCTCGGGTGGGGGT
GGTAGTGGAGGAGGAGGCAGCGCAGATATTGTTATGACTCAAACTCCGTTGTCTTTACCGGT
AACGCCGGGTGAGCCCGCATCCATTTCTTGCCGTGCCTCAAAATCTATCTCTAAGTACCTGG
CTTGGTATCAGCAAAAGCCGGGTCAGGCACCTCGCTTGTTAATTTACTCGGGGTCTCGGCTG
CAATCTGGCATCCCGCCGCGTTTCTCAGGGAGCGGATACGGCACGGATTTCACCTTAACTAT
CAACAACATCGAATCTGAAGAGCGCCGCCTACTACTTTTGCCAACAGCATGATGAGTCACCTT
ACACTTTCGGTGAGGGAACGAAGGTTGAAATCAAACGGGATTACAAAGATGACGACGATAAG
GGGAAGCCAGGAAGTGGTAAACCCGGCTCCGGAAAGCCGGGAAGCGGCAAACCTGGTTCTTA
CCCGTACGATGTAGCTGACTAGGCTTCA SEQ ID NO: 12 (H1 T32A/L2 T69R Ab1 scFv peptide)
QVQLQESGPGLVKPSQTLSLTCTVSGYAFAAYNIHWVRQAPGQGLEWMGSFDPYDGGSSYNQ
KFKDRLTISKDTSKNQVVLTMTNMDPVDTATYYCARGWYYFDYWGHGTLVTVSSGGGGSGGG
GSGGGGGSADIVMTQTPLSLPVTPGEPASISCRASKSISKYLAWYQQKPGQAPRLLIYSGSRL
QSGIPPRFSGSGYGTDFTLTINNIESEDAAYYFCQQHDESPYTFGEGTKVEIKRDYKDDDDK
GKPGSGKPGSGKPGSGKPGSYPYDVPDYAS SEQ ID NO: 181 (human ROR1)
MHRPRRRGTRPPLLALLAALLLAARGAAAQETELSVSAELVPTSSWNISSELNKDSYLTLDE
PMNNITTSLGQTAELHCKVSGNPPPTIRWFKNDAPVVQEPRRLSFRSTIYGSRLRIRNLDTT
DTGYFQCVATNGKEVVSSTGVLFVKFGPPPTASPGYSDEYEEDGFCQPYRGIACARFIGNRT
VYMESLHMQGEIENQITAAFTMIGTSSHLSDKCSQFAIPSLCHYAFPYCDETSSVPKPRDLC
RDECEILENVLCQTEYIFARSNPMILMRLKLPNCEDLPQPESPEAANCIRIGIPMADPINKN
HKCYNSTGVDYRGTVSVTKSGRQCQPWNSQYPHTHTFTALRFPELNGGHSYCRNPGNQKEAP
WCFTLDENFKSDLCDIPACDSKDSKEKNKMEILYILVPSVAIPLAIALLFFFICVCRNNQKS
SSAPVQRQPKHVRGQNVEMSMLNAYKPKSKAKELPLSAVRFMEELGECAFGKIYKGHLYLPG
MDHAQLVAIKTLKDYNNPQQWTEFQQEASLMAELHHPNIVCLLGAVTQEQPVCMLFEYINQG
DLHEFLIMRSPHSDVGCSSDEDGTVKSSLDHGDFLHIAIQIAAGMEYLSSHFFVHKDLAARN
ILIGEQLHVKISDLGLSREIYSADYYRVQSKSLLPIRWMPPEAIMYGKFSSDSDIWSFGVVL
WEIFSFGLQPYYGFSNQEVIEMVRKRQLLPCSEDCPPRMYSLMTECWNEIPSRRPRFKDIHV
RLRSWEGLSSHTSSTTPSGGNATTQTTSLSASPVSNLSNPRYPNYMFPSQGITPQGQIAGFI
GPPIPQNQRFIPINGYPIPPGYAAFPAAHYQPTGPPRVIQHCPPPKSRSPSSASGSTSTGHV
TSLPSSGSNQEANIPLLPHMSIPNHPGGMGITVFGNKSQKPYKIDSKQASLLGDANIHGHTE
SMISAEL

What is claimed is:

1. An anti-ROR1 antibody or an antigen-binding portion thereof, wherein said antibody comprises:
   a) a heavy chain variable domain (VH) comprising the amino acid sequence of SEQ ID NO: 4 with a mutation selected from T32A, T32E, S69V, S69E, and N71H, or any combination thereof; and a light chain variable domain (VL) comprising the amino acid sequence of SEQ ID NO: 2;
   b) a VH comprising the amino acid sequence of SEQ ID NO: 4; and a VL comprising the amino acid sequence of SEQ ID NO: 2 with a mutation selected from A25P, K29E, K29S, T69H, T69R, L70K, and Q71T, or any combination thereof; or
   c) a VH comprising the amino acid sequence of SEQ ID NO: 4 with a mutation selected from T32A, T32E, S69V, S69E, and N71H, or any combination thereof; and a VL comprising the amino acid sequence of SEQ ID NO: 2 with a mutation selected from A25P, K29E, K29S, T69H, T69R, L70K, and Q71T, or any combination thereof;
wherein the residues are numbered according to the AHo system and wherein the antibody or antigen-binding portion has a greater binding affinity for human ROR1 than an antibody comprising a VH that comprises the amino acid sequence of SEQ ID NO: 4 and a VL that comprises the amino acid sequence of SEQ ID NO: 2.

2. The anti-ROR1 antibody or antigen-binding portion of claim 1, wherein said antibody comprises:
   a) a VH comprising the amino acid sequence of SEQ ID NO: 4 with
      i) one or more mutations selected from T32E, S69V/E, and N71H, or
      ii) the mutation T32A and one or both mutations selected from S69V/E and N71H, and
   a VL comprising the amino acid sequence of SEQ ID NO: 2;
   b) a VH comprising the amino acid sequence of SEQ ID NO: 4 with
      i) one or more mutations selected from T32E, S69V/E, and N71H, or
      ii) the mutation T32A and one or both mutations selected from S69V/E and N71H, and
   a VL comprising the amino acid sequence of SEQ ID NO: 2 with one or more mutations selected from A25P, K29E/S, T69H/R, L70K, and Q71T;
   c) a VH comprising the amino acid sequence of SEQ ID NO: 4 comprising the mutation T32A and
   a VL comprising the amino acid sequence of SEQ ID NO: 2 with
      i) one or more mutations selected from A25P, K29E/S, T69H, L70K, and Q71T, or
      ii) the mutation T69R and one or more mutations selected from A25P, K29E/S, L70K, and Q71T; or
   d) a VH comprising the amino acid sequence of SEQ ID NO: 4 and a VL comprising the amino acid sequence of SEQ ID NO: 2 with one or more mutations selected from A25P, K29E/S, T69H/R, L70K, and Q71T.

3. The antibody or antigen-binding portion of claim 1, wherein said antibody comprises:
   a) a VH comprising the amino acid sequence of SEQ ID NO: 4 with the mutation T32A, and a VL comprising the amino acid sequence of SEQ ID NO: 2 with the mutation A25P;
   b) a VH comprising the amino acid sequence of SEQ ID NO: 4 with the mutation T32A, and a VL comprising the amino acid sequence of SEQ ID NO: 2 with the mutation T69H;
   c) a VH comprising the amino acid sequence of SEQ ID NO: 4 with the mutation T32A, and a VL comprising the amino acid sequence of SEQ ID NO: 2 with the mutations A25P and T69R;
   d) a VH comprising the amino acid sequence of SEQ ID NO: 4 with the mutation T32A, and a VL comprising the amino acid sequence of SEQ ID NO: 2 with the mutations K29S and T69R;
   e) a VH comprising the amino acid sequence of SEQ ID NO: 4 with the mutation T32A, and a VL comprising the amino acid sequence of SEQ ID NO: 2 with the mutations T69R and Q71T; or
   f) a VH comprising the amino acid sequence of SEQ ID NO: 4 with the mutation T32A, and a VL comprising the amino acid sequence of SEQ ID NO: 2 with the mutations A25P and L70K.

4. An anti-ROR1 antibody or an antigen-binding portion thereof, comprising heavy chain (H)-CDR1-3 and light chain (L)-CDR1-3 comprising the amino acid sequences of:
   a) SEQ ID NOs: 31, 42, 89, 101, 114, and 123, respectively;
   b) SEQ ID NOs: 13, 73, 89, 101, 114, and 123, respectively;
   c) SEQ ID NOs: 13, 75, 89, 101, 114, and 123, respectively;
   d) SEQ ID NOs: 13, 80, 89, 101, 114, and 123, respectively;
   e) SEQ ID NOs: 13, 42, 89, 102, 114, and 123, respectively;
   f) SEQ ID NOs: 13, 42, 89, 103, 114, and 123, respectively;
   g) SEQ ID NOs: 13, 42, 89, 104, 114, and 123, respectively;
   h) SEQ ID NOs: 13, 42, 89, 101, 117, and 123, respectively;
   i) SEQ ID NOs: 13, 42, 89, 101, 118, and 123, respectively;
   j) SEQ ID NOs: 13, 42, 89, 101, 120, and 123, respectively;
   k) SEQ ID NOs: 29, 42, 89, 102, 114, and 123, respectively;
   l) SEQ ID NOs: 29, 42, 89, 101, 117, and 123, respectively;
   m) SEQ ID NOs: 29, 42, 89, 102, 118, and 123, respectively;
   n) SEQ ID NOs: 29, 42, 89, 103, 118, and 123, respectively;
   o) SEQ ID NOs: 29, 42, 89, 101, 147, and 123, respectively; or
   p) SEQ ID NOs: 29, 42, 89, 102, 120, and 123, respectively.

5. The antibody or antigen-binding portion of claim 4, wherein the heavy chain framework regions (FRs) 1-4 and the light chain FR1-4 of said antibody or antigen-binding portion further comprise the amino acid sequences of SEQ ID NOs: 172-179, respectively.

6. The antibody of claim 4, wherein the antibody is an IgG and wherein the antibody optionally comprises a human IgG1 constant region.

7. The antibody or antigen-binding portion of claim 4, wherein said antibody or portion is a single chain variable fragment (scFv).

8. The antibody or antigen-binding portion of claim 1, wherein said antibody or antigen-binding portion:
   a) binds to ROR1-transfected MEC cells with greater affinity than an antibody with a VH comprising the amino acid sequence of SEQ ID NO: 4 and a VL comprising the amino acid sequence of SEQ ID NO: 2, as assessed by flow cytometry;
   b) binds to JeKo-1 cells with greater affinity than an antibody with a VH comprising the amino acid sequence of SEQ ID NO: 4 and a VL comprising the amino acid sequence of SEQ ID NO: 2, as assessed by flow cytometry; or
   c) both a) and b).

9. An isolated nucleic acid molecule comprising a nucleotide sequence that encodes the heavy chain or an antigen-binding portion thereof, or a nucleotide sequence that encodes the light chain or an antigen-binding portion thereof, or both, of the anti-ROR1 antibody or antigen-binding portion of claim 4.

10. A vector comprising the isolated nucleic acid molecule of claim 9, wherein said vector further comprises an expression control sequence linked operatively to the isolated nucleic acid molecule.

11. A host cell comprising a nucleotide sequence that encodes the heavy chain or an antigen-binding portion thereof, and a nucleotide sequence that encodes the light chain or an antigen-binding portion thereof, of the anti-ROR1 antibody or antigen-binding portion of claim 4.

12. A method for producing an anti-ROR1 antibody or an antigen-binding portion thereof, comprising providing the host cell of claim 11, culturing said host cell under conditions suitable for expression of the antibody or portion, and isolating the resulting antibody or portion.

13. A bispecific binding molecule comprising the antibody or antigen-binding portion of claim 4, wherein the binding molecule is a bispecific binding molecule or an immunoconjugate, wherein optionally the immunoconjugate is conjugated to a cytotoxic agent.

14. An immunoconjugate comprising an anti-ROR1 antibody or an antigen-binding portion thereof conjugated to a cytotoxic agent, wherein said antibody comprises a heavy chain variable domain (VH) amino acid sequence of SEQ ID NO: 5 and a light chain variable domain (VL) amino acid sequence of SEQ ID NO: 2 or SEQ ID NO: 6.

15. A pharmaceutical composition comprising the anti-ROR1 antibody or antigen-binding portion thereof of claim 4, and a pharmaceutically acceptable excipient.

16. A method for treating cancer in a patient in need thereof, comprising administering to said patient a therapeutically effective amount of the anti-ROR1 antibody or antigen-binding portion of claim 4, wherein the cancer is a ROR1-positive cancer.

17. The method of claim 16, wherein the cancer is a leukemia, a lymphoma, or a solid tumor.

18. The method of claim 16, wherein the cancer is non-Hodgkin lymphoma, optionally diffuse large B-cell lymphoma (DLBCL); follicular lymphoma (FL); mantle cell lymphoma (MCL); marginal zone lymphoma (MZL); Burkitt's lymphoma; T cell non-Hodgkin lymphoma; Waldenström macroglobulinemia; a non-Hodgkin lymphoma that has undergone Richter's transformation; acute myeloid leukemia (AML); acute lymphoblastic leukemia (ALL); chronic lymphocytic leukemia (CLL); small lymphocytic leukemia (SLL); breast cancer; non-small cell lung cancer; ovarian cancer; or sarcoma, optionally Ewing's sarcoma.

19. The method of claim 16, wherein the patient is treated with an additional therapeutic agent, wherein optionally the additional therapeutic agent is selected from the group consisting of a Bruton's tyrosine kinase (BTK) inhibitor, a B-cell lymphoma 2 (Bcl-2) inhibitor, a mammalian target of rapamycin (mTOR) inhibitor, and a phosphoinositide 3-kinase (PI3K) inhibitor.

20. The method of claim 19, wherein the additional therapeutic agent is selected from the group consisting of ibrutinib, acalabrutinib, venetoclax, everolimus, sapanisertib, and idelalisib.

* * * * *

SEQUENCE LISTING

<160> NUMBER OF SEQ ID NOS: 181

<210> SEQ ID NO 1
<211> LENGTH: 321
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 1

```
gatattgtta tgactcaaac tccgttgtct ttaccggtaa cgccgggtga gcccgcatcc      60
atttcttgcc gtgcctcaaa atctatctct aagtacctgg cttggtatca gcaaaagccg     120
ggtcaggcac ctcgcttgtt aatttactcg gggtctacac tgcaatctgg catcccgccg     180
cgtttctcag ggagcggata cggcacggat tcaccttaa ctatcaacaa catcgaatct      240
gaagacgccg cctactactt tgccaacag catgatgagt caccttacac tttcggtgag      300
ggaacgaagg ttgaaatcaa a                                                321
```

<210> SEQ ID NO 2
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 2

```
Asp Ile Val Met Thr Gln Thr Pro Leu Ser Leu Pro Val Thr Pro Gly
1               5                   10                  15

Glu Pro Ala Ser Ile Ser Cys Arg Ala Ser Lys Ser Ile Ser Lys Tyr
            20                  25                  30

Leu Ala Trp Tyr Gln Gln Lys Pro Gly Gln Ala Pro Arg Leu Leu Ile
        35                  40                  45

Tyr Ser Gly Ser Thr Leu Gln Ser Gly Ile Pro Pro Arg Phe Ser Gly
    50                  55                  60

Ser Gly Tyr Gly Thr Asp Phe Thr Leu Thr Ile Asn Asn Ile Glu Ser
65                  70                  75                  80

Glu Asp Ala Ala Tyr Tyr Phe Cys Gln Gln His Asp Glu Ser Pro Tyr
                85                  90                  95

Thr Phe Gly Glu Gly Thr Lys Val Glu Ile Lys
            100                 105
```

<210> SEQ ID NO 3
<211> LENGTH: 348
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 3

```
caggttcagc ttcaggaatc tggtcctggt ttagtgaaac ctagtcagac attaagtctt      60
acatgcacag tttctggcta tgccttcacg gcatataaca tccactgggt acgccaagcc     120
ccaggccagg gactggaatg gatgggcagc ttcgatccct atgatggcgg tagttcgtac     180
aaccagaagt tcaaggatcg ccttactatc tcaaaggata cctcgaagaa tcaggtggtc     240
cttactatga caaatatgga tccagtggac actgccacat actattgcgc ccgtgggtgg     300
tactattttg actactgggg ccacggcact ttagtgacgg tctcctcc                  348
```

<210> SEQ ID NO 4
<211> LENGTH: 116

```
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 4

Gln Val Gln Leu Gln Glu Ser Gly Pro Gly Leu Val Lys Pro Ser Gln
1               5                   10                  15

Thr Leu Ser Leu Thr Cys Thr Val Ser Gly Tyr Ala Phe Thr Ala Tyr
            20                  25                  30

Asn Ile His Trp Val Arg Gln Ala Pro Gly Gln Gly Leu Glu Trp Met
        35                  40                  45

Gly Ser Phe Asp Pro Tyr Asp Gly Gly Ser Ser Tyr Asn Gln Lys Phe
    50                  55                  60

Lys Asp Arg Leu Thr Ile Ser Lys Asp Thr Ser Lys Asn Gln Val Val
65                  70                  75                  80

Leu Thr Met Thr Asn Met Asp Pro Val Asp Thr Ala Thr Tyr Tyr Cys
                85                  90                  95

Ala Arg Gly Trp Tyr Tyr Phe Asp Tyr Trp Gly His Gly Thr Leu Val
            100                 105                 110

Thr Val Ser Ser
        115

<210> SEQ ID NO 5
<211> LENGTH: 116
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 5

Gln Val Gln Leu Gln Glu Ser Gly Pro Gly Leu Val Lys Pro Ser Gln
1               5                   10                  15

Thr Leu Ser Leu Thr Cys Thr Val Ser Gly Tyr Ala Phe Ala Ala Tyr
            20                  25                  30

Asn Ile His Trp Val Arg Gln Ala Pro Gly Gln Gly Leu Glu Trp Met
        35                  40                  45

Gly Ser Phe Asp Pro Tyr Asp Gly Gly Ser Ser Tyr Asn Gln Lys Phe
    50                  55                  60

Lys Asp Arg Leu Thr Ile Ser Lys Asp Thr Ser Lys Asn Gln Val Val
65                  70                  75                  80

Leu Thr Met Thr Asn Met Asp Pro Val Asp Thr Ala Thr Tyr Tyr Cys
                85                  90                  95

Ala Arg Gly Trp Tyr Tyr Phe Asp Tyr Trp Gly His Gly Thr Leu Val
            100                 105                 110

Thr Val Ser Ser
        115

<210> SEQ ID NO 6
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"
```

<400> SEQUENCE: 6

Asp Ile Val Met Thr Gln Thr Pro Leu Ser Leu Pro Val Thr Pro Gly
1               5                   10                  15

Glu Pro Ala Ser Ile Ser Cys Arg Ala Ser Lys Ser Ile Ser Lys Tyr
            20                  25                  30

Leu Ala Trp Tyr Gln Gln Lys Pro Gly Gln Ala Pro Arg Leu Leu Ile
        35                  40                  45

Tyr Ser Gly Ser Arg Leu Gln Ser Gly Ile Pro Pro Arg Phe Ser Gly
    50                  55                  60

Ser Gly Tyr Gly Thr Asp Phe Thr Leu Thr Ile Asn Asn Ile Glu Ser
65              70                  75                  80

Glu Asp Ala Ala Tyr Tyr Phe Cys Gln Gln His Asp Glu Ser Pro Tyr
                85                  90                  95

Thr Phe Gly Glu Gly Thr Lys Val Glu Ile Lys
            100                 105

<210> SEQ ID NO 7
<211> LENGTH: 834
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 7
caggttcagc ttcaggaatc tggtcctggt ttagtgaaac ctagtcagac attaagtctt      60
acatgcacag tttctggcta tgccttcacg gcatataaca tccactgggt acgccaagcc    120
ccaggccagg gactggaatg gatgggcagc ttcgatccct atgatggcgg tagttcgtac    180
aaccagaagt tcaaggatcg ccttactatc tcaaaggata cctcgaagaa tcaggtggtc    240
cttactatga caaatatgga tccagtggac actgccacat actattgcgc ccgtgggtgg    300
tactattttg actactgggg ccacggcact ttagtgacgg tctcctccgg aggtggcggc    360
tcgggtgggg gtggtagtgg aggaggaggc agcgcagata ttgttatgac tcaaactccg    420
ttgtctttac cggtaacgcc gggtgagccc gcatccattt cttgccgtgc ctcaaaatct    480
atctctaagt acctggcttg gtatcagcaa aagccgggtc aggcacctcg cttgttaatt    540
tactcggggt ctacactgca atctggcatc ccgccgcgtt tctcagggag cggatacggc    600
acggatttca ccttaactat caacaacatc gaatctgaag acgccgccta ctactttgc     660
caacagcatg atgagtcacc ttacactttc ggtgagggaa cgaaggttga aatcaaacgg    720
gattacaaag atgacgacga taaggggaag ccaggaagtg gtaaacccgg ctccggaaag    780
ccgggaagcg gcaaacctgg ttcttacccg tacgatgtac ctgactacgc ttca          834

<210> SEQ ID NO 8
<211> LENGTH: 278
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 8

Gln Val Gln Leu Gln Glu Ser Gly Pro Gly Leu Val Lys Pro Ser Gln
1               5                   10                  15

Thr Leu Ser Leu Thr Cys Thr Val Ser Gly Tyr Ala Phe Thr Ala Tyr

```
                    20                  25                  30
Asn Ile His Trp Val Arg Gln Ala Pro Gly Gln Gly Leu Glu Trp Met
                35                  40                  45

Gly Ser Phe Asp Pro Tyr Asp Gly Ser Ser Tyr Asn Gln Lys Phe
    50                  55                  60

Lys Asp Arg Leu Thr Ile Ser Lys Asp Thr Ser Lys Asn Gln Val Val
65                  70                  75                  80

Leu Thr Met Thr Asn Met Asp Pro Val Asp Thr Ala Thr Tyr Tyr Cys
                85                  90                  95

Ala Arg Gly Trp Tyr Tyr Phe Asp Tyr Trp Gly His Gly Thr Leu Val
                100                 105                 110

Thr Val Ser Ser Gly Gly Gly Ser Gly Gly Gly Ser Gly Gly
        115                 120                 125

Gly Gly Ser Ala Asp Ile Val Met Thr Gln Thr Pro Leu Ser Leu Pro
        130                 135                 140

Val Thr Pro Gly Glu Pro Ala Ser Ile Ser Cys Arg Ala Ser Lys Ser
145                 150                 155                 160

Ile Ser Lys Tyr Leu Ala Trp Tyr Gln Gln Lys Pro Gly Gln Ala Pro
                165                 170                 175

Arg Leu Leu Ile Tyr Ser Gly Ser Thr Leu Gln Ser Gly Ile Pro Pro
                180                 185                 190

Arg Phe Ser Gly Ser Gly Tyr Gly Thr Asp Phe Thr Leu Thr Ile Asn
                195                 200                 205

Asn Ile Glu Ser Glu Asp Ala Ala Tyr Tyr Phe Cys Gln Gln His Asp
        210                 215                 220

Glu Ser Pro Tyr Thr Phe Gly Glu Gly Thr Lys Val Glu Ile Lys Arg
225                 230                 235                 240

Asp Tyr Lys Asp Asp Asp Lys Gly Lys Pro Gly Ser Gly Lys Pro
                245                 250                 255

Gly Ser Gly Lys Pro Gly Ser Gly Lys Pro Gly Ser Tyr Pro Tyr Asp
                260                 265                 270

Val Pro Asp Tyr Ala Ser
        275

<210> SEQ ID NO 9
<211> LENGTH: 834
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 9
caggttcagc ttcaggaatc tggtcctggt ttagtgaaac ctagtcagac attaagtctt    60
acatgcacag tttctggcta tgccttcgca gcatataaca tccactgggt acgccaagcc   120
ccaggccagg gactggaatg gatgggcagc ttcgatccct atgatggcgg tagttcgtac   180
aaccagaagt tcaaggatcg ccttactatc tcaaaggata cctcgaagaa tcaggtggtc   240
cttactatga caaatatgga tccagtggac actgccacat actattgcgc cgtgggtgg   300 tactattttg actactgggg ccacggcact ttagtgacgg tctcctccgg aggtggcggc   360
tcgggtgggg gtggtagtgg aggaggaggc agcgcagata ttgttatgac tcaaactccg   420
ttgtctttac cggtaacgcc gggtgagccc gcatccattt cttgccgtgc ctcaaaatct   480
atctctaagt acctggcttg gtatcagcaa aagccgggtc aggcacctcg cttgttaatt   540
```

```
tactcggggt ctacactgca atctggcatc ccgccgcgtt tctcagggag cggatacggc    600
acggatttca ccttaactat caacaacatc gaatctgaag acgccgccta ctactttgc    660 caacagcatg atgagtcacc ttacactttc ggtgagggaa cgaaggttga aatcaaacgg    720
gattacaaag atgacgacga taaggggaag ccaggaagtg gtaaacccgg ctccggaaag    780
ccgggaagcg gcaaacctgg ttcttacccg tacgatgtac ctgactacgc ttca          834
```

<210> SEQ ID NO 10
<211> LENGTH: 278
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic polypeptide"

<400> SEQUENCE: 10

```
Gln Val Gln Leu Gln Glu Ser Gly Pro Gly Leu Val Lys Pro Ser Gln
1               5                   10                  15

Thr Leu Ser Leu Thr Cys Thr Val Ser Gly Tyr Ala Phe Ala Ala Tyr
            20                  25                  30

Asn Ile His Trp Val Arg Gln Ala Pro Gly Gln Gly Leu Glu Trp Met
        35                  40                  45

Gly Ser Phe Asp Pro Tyr Asp Gly Gly Ser Tyr Asn Gln Lys Phe
    50                  55                  60

Lys Asp Arg Leu Thr Ile Ser Lys Asp Thr Ser Lys Asn Gln Val Val
65                  70                  75                  80

Leu Thr Met Thr Asn Met Asp Pro Val Asp Thr Ala Thr Tyr Tyr Cys
                85                  90                  95

Ala Arg Gly Trp Tyr Tyr Phe Asp Tyr Trp Gly His Gly Thr Leu Val
            100                 105                 110

Thr Val Ser Ser Gly Gly Gly Ser Gly Gly Gly Ser Gly Gly
        115                 120                 125

Gly Gly Ser Ala Asp Ile Val Met Thr Gln Thr Pro Leu Ser Leu Pro
    130                 135                 140

Val Thr Pro Gly Glu Pro Ala Ser Ile Ser Cys Arg Ala Ser Lys Ser
145                 150                 155                 160

Ile Ser Lys Tyr Leu Ala Trp Tyr Gln Gln Lys Pro Gly Gln Ala Pro
                165                 170                 175

Arg Leu Leu Ile Tyr Ser Gly Ser Thr Leu Gln Ser Gly Ile Pro Pro
            180                 185                 190

Arg Phe Ser Gly Ser Gly Tyr Gly Thr Asp Phe Thr Leu Thr Ile Asn
        195                 200                 205

Asn Ile Glu Ser Glu Asp Ala Ala Tyr Tyr Phe Cys Gln Gln His Asp
    210                 215                 220

Glu Ser Pro Tyr Thr Phe Gly Glu Gly Thr Lys Val Glu Ile Lys Arg
225                 230                 235                 240

Asp Tyr Lys Asp Asp Asp Lys Gly Lys Pro Gly Ser Gly Lys Pro
                245                 250                 255

Gly Ser Gly Lys Pro Gly Ser Gly Lys Pro Gly Ser Tyr Pro Tyr Asp
            260                 265                 270

Val Pro Asp Tyr Ala Ser
        275
```

<210> SEQ ID NO 11

```
<211> LENGTH: 834
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 11
caggttcagc ttcaggaatc tggtcctggt ttagtgaaac ctagtcagac attaagtctt      60
acatgcacag tttctggcta tgccttcgca gcatataaca tccactgggt acgccaagcc     120
ccaggccagg gactggaatg gatgggcagc ttcgatccct atgatggcgg tagttcgtac     180
aaccagaagt tcaaggatcg ccttactatc tcaaaggata cctcgaagaa tcaggtggtc     240
cttactatga caaatatgga tccagtggac actgccacat actattgcgc cgtgggtgg      300 tactattttg actactgggg ccacggcact ttagtgacgg tctcctccgg aggtggcggc     360
tcgggtgggg gtggtagtgg aggaggaggc agcgcagata ttgttatgac tcaaactccg     420
ttgtctttac cggtaacgcc gggtgagccc gcatccattt cttgccgtgc ctcaaaatct     480
atctctaagt acctggcttg gtatcagcaa aagccgggtc aggcacctcg cttgttaatt     540
tactcggggt ctcggctgca atctggcatc cgccgcgtt tctcagggag cggatacggc      600
acggatttca ccttaactat caacaacatc gaatctgaag acgccgccta ctactttgc      660 caacagcatg atgagtcacc ttacactttc ggtgagggaa cgaaggttga aatcaaacgg     720
gattacaaag atgacgacga taaggggaag ccaggaagtg gtaaacccgg ctccggaaag     780
ccgggaagcg gcaaacctgg ttcttacccg tacgatgtac ctgactacgc ttca           834

<210> SEQ ID NO 12
<211> LENGTH: 278
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 12

Gln Val Gln Leu Gln Glu Ser Gly Pro Gly Leu Val Lys Pro Ser Gln
1               5                   10                  15

Thr Leu Ser Leu Thr Cys Thr Val Ser Gly Tyr Ala Phe Ala Ala Tyr
            20                  25                  30

Asn Ile His Trp Val Arg Gln Ala Pro Gly Gln Gly Leu Glu Trp Met
        35                  40                  45

Gly Ser Phe Asp Pro Tyr Asp Gly Gly Ser Ser Tyr Asn Gln Lys Phe
    50                  55                  60

Lys Asp Arg Leu Thr Ile Ser Lys Asp Thr Ser Lys Asn Gln Val Val
65                  70                  75                  80

Leu Thr Met Thr Asn Met Asp Pro Val Asp Thr Ala Thr Tyr Tyr Cys
                85                  90                  95

Ala Arg Gly Trp Tyr Tyr Phe Asp Tyr Trp Gly His Gly Thr Leu Val
            100                 105                 110

Thr Val Ser Ser Gly Gly Gly Gly Ser Gly Gly Gly Gly Ser Gly Gly
        115                 120                 125

Gly Gly Ser Ala Asp Ile Val Met Thr Gln Thr Pro Leu Ser Leu Pro
    130                 135                 140

Val Thr Pro Gly Glu Pro Ala Ser Ile Ser Cys Arg Ala Ser Lys Ser
145                 150                 155                 160
```

```
Ile Ser Lys Tyr Leu Ala Trp Tyr Gln Gln Lys Pro Gly Gln Ala Pro
            165                 170                 175

Arg Leu Leu Ile Tyr Ser Gly Ser Arg Leu Gln Ser Gly Ile Pro Pro
        180                 185                 190

Arg Phe Ser Gly Ser Gly Tyr Gly Thr Asp Phe Thr Leu Thr Ile Asn
    195                 200                 205

Asn Ile Glu Ser Glu Asp Ala Ala Tyr Tyr Phe Cys Gln Gln His Asp
210                 215                 220

Glu Ser Pro Tyr Thr Phe Gly Glu Gly Thr Lys Val Glu Ile Lys Arg
225                 230                 235                 240

Asp Tyr Lys Asp Asp Asp Lys Gly Lys Pro Gly Ser Gly Lys Pro
                245                 250                 255

Gly Ser Gly Lys Pro Gly Ser Gly Lys Pro Gly Ser Tyr Pro Tyr Asp
            260                 265                 270

Val Pro Asp Tyr Ala Ser
            275

<210> SEQ ID NO 13
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 13

Gly Tyr Ala Phe Thr Ala Tyr Asn Ile His
1               5                   10

<210> SEQ ID NO 14
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 14

Asp Tyr Ala Phe Thr Ala Tyr Asn Ile His
1               5                   10

<210> SEQ ID NO 15
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 15

Asn Tyr Ala Phe Thr Ala Tyr Asn Ile His
1               5                   10

<210> SEQ ID NO 16
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

<400> SEQUENCE: 16

Arg Tyr Ala Phe Thr Ala Tyr Asn Ile His
1               5                   10

<210> SEQ ID NO 17
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 17

Thr Tyr Ala Phe Thr Ala Tyr Asn Ile His
1               5                   10

<210> SEQ ID NO 18
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 18

Gly Gly Ala Phe Thr Ala Tyr Asn Ile His
1               5                   10

<210> SEQ ID NO 19
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 19

Gly Lys Ala Phe Thr Ala Tyr Asn Ile His
1               5                   10

<210> SEQ ID NO 20
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 20

Gly Ser Ala Phe Thr Ala Tyr Asn Ile His
1               5                   10

<210> SEQ ID NO 21
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 21

Gly Tyr Ile Phe Thr Ala Tyr Asn Ile His

```
<210> SEQ ID NO 22
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 22

Gly Tyr Pro Phe Thr Ala Tyr Asn Ile His
1               5                   10

<210> SEQ ID NO 23
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 23

Gly Tyr Arg Phe Thr Ala Tyr Asn Ile His
1               5                   10

<210> SEQ ID NO 24
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 24

Gly Tyr Thr Phe Thr Ala Tyr Asn Ile His
1               5                   10

<210> SEQ ID NO 25
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 25

Gly Tyr Ala Ile Thr Ala Tyr Asn Ile His
1               5                   10

<210> SEQ ID NO 26
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 26

Gly Tyr Ala Leu Thr Ala Tyr Asn Ile His
1               5                   10

<210> SEQ ID NO 27
```

```
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 27

Gly Tyr Ala Val Thr Ala Tyr Asn Ile His
1               5                   10

<210> SEQ ID NO 28
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 28

Gly Tyr Ala Trp Thr Ala Tyr Asn Ile His
1               5                   10

<210> SEQ ID NO 29
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 29

Gly Tyr Ala Phe Ala Ala Tyr Asn Ile His
1               5                   10

<210> SEQ ID NO 30
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 30

Gly Tyr Ala Phe Asp Ala Tyr Asn Ile His
1               5                   10

<210> SEQ ID NO 31
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 31

Gly Tyr Ala Phe Glu Ala Tyr Asn Ile His
1               5                   10

<210> SEQ ID NO 32
<211> LENGTH: 10
<212> TYPE: PRT
<213> ORGANISM: Artificial Sequence
<220> FEATURE:
```

```
<221> NAME/KEY: source
<223> OTHER INFORMATION: /note="Description of Artificial Sequence:
      Synthetic peptide"

<400> SEQUENCE: 32

Gly Tyr Ala Phe Thr Met Tyr Asn Ile His
1               5                   10

<210> SEQ ID NO 33
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 33

Gly Tyr Ala Phe Thr Ser Tyr Asn Ile His
1               5                   10

<210> SEQ ID NO 34
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 34

Gly Tyr Ala Phe Thr Ala Phe Asn Ile His
1               5                   10

<210> SEQ ID NO 35
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 35

Gly Tyr Ala Phe Thr Ala Trp Asn Ile His
1               5                   10

<210> SEQ ID NO 36
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 36

Gly Tyr Ala Phe Thr Ala Tyr Lys Ile His
1               5                   10

<210> SEQ ID NO 37
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

```
<400> SEQUENCE: 37

Gly Tyr Ala Phe Thr Ala Tyr Pro Ile His
1               5                   10

<210> SEQ ID NO 38
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 38

Gly Tyr Ala Phe Thr Ala Tyr Arg Ile His
1               5                   10

<210> SEQ ID NO 39
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 39

Gly Tyr Ala Phe Thr Ala Tyr Asn Leu His
1               5                   10

<210> SEQ ID NO 40
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 40

Gly Tyr Ala Phe Thr Ala Tyr Asn Val His
1               5                   10

<210> SEQ ID NO 41
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 41

Gly Tyr Ala Phe Thr Ala Tyr Asn Ile Gln
1               5                   10

<210> SEQ ID NO 42
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 42

Ser Phe Asp Pro Tyr Asp Gly Gly Ser Ser Tyr Asn Gln Lys Phe Lys
1               5                   10                  15
```

Asp

<210> SEQ ID NO 43
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 43

Ala Phe Asp Pro Tyr Asp Gly Gly Ser Ser Tyr Asn Gln Lys Phe Lys
1               5                   10                  15

Asp

<210> SEQ ID NO 44
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 44

Lys Phe Asp Pro Tyr Asp Gly Gly Ser Ser Tyr Asn Gln Lys Phe Lys
1               5                   10                  15

Asp

<210> SEQ ID NO 45
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 45

Arg Phe Asp Pro Tyr Asp Gly Gly Ser Ser Tyr Asn Gln Lys Phe Lys
1               5                   10                  15

Asp

<210> SEQ ID NO 46
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 46

Thr Phe Asp Pro Tyr Asp Gly Gly Ser Ser Tyr Asn Gln Lys Phe Lys
1               5                   10                  15

Asp

<210> SEQ ID NO 47
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:

Synthetic peptide"

<400> SEQUENCE: 47

Ser Ile Asp Pro Tyr Asp Gly Gly Ser Ser Tyr Asn Gln Lys Phe Lys
1               5                   10                  15
Asp

<210> SEQ ID NO 48
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 48

Ser Pro Asp Pro Tyr Asp Gly Gly Ser Ser Tyr Asn Gln Lys Phe Lys
1               5                   10                  15
Asp

<210> SEQ ID NO 49
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 49

Ser Val Asp Pro Tyr Asp Gly Gly Ser Ser Tyr Asn Gln Lys Phe Lys
1               5                   10                  15
Asp

<210> SEQ ID NO 50
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 50

Ser Phe Ser Pro Tyr Asp Gly Gly Ser Ser Tyr Asn Gln Lys Phe Lys
1               5                   10                  15
Asp

<210> SEQ ID NO 51
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 51

Ser Phe Asp Gly Tyr Asp Gly Gly Ser Ser Tyr Asn Gln Lys Phe Lys
1               5                   10                  15
Asp

<210> SEQ ID NO 52

```
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 52

Ser Phe Asp Thr Tyr Asp Gly Gly Ser Ser Tyr Asn Gln Lys Phe Lys
1               5                   10                  15

Asp

<210> SEQ ID NO 53
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 53

Ser Phe Asp Pro Tyr Glu Gly Gly Ser Ser Tyr Asn Gln Lys Phe Lys
1               5                   10                  15

Asp

<210> SEQ ID NO 54
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 54

Ser Phe Asp Pro Tyr Asn Gly Gly Ser Ser Tyr Asn Gln Lys Phe Lys
1               5                   10                  15

Asp

<210> SEQ ID NO 55
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 55

Ser Phe Asp Pro Tyr Thr Gly Gly Ser Ser Tyr Asn Gln Lys Phe Lys
1               5                   10                  15

Asp

<210> SEQ ID NO 56
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 56

Ser Phe Asp Pro Tyr Asp Asp Gly Ser Ser Tyr Asn Gln Lys Phe Lys
```

```
1               5                   10                  15
Asp

<210> SEQ ID NO 57
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 57

Ser Phe Asp Pro Tyr Asp Glu Gly Ser Ser Tyr Asn Gln Lys Phe Lys
1               5                   10                  15
Asp

<210> SEQ ID NO 58
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 58

Ser Phe Asp Pro Tyr Asp His Gly Ser Ser Tyr Asn Gln Lys Phe Lys
1               5                   10                  15
Asp

<210> SEQ ID NO 59
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 59

Ser Phe Asp Pro Tyr Asp Asn Gly Ser Ser Tyr Asn Gln Lys Phe Lys
1               5                   10                  15
Asp

<210> SEQ ID NO 60
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 60

Ser Phe Asp Pro Tyr Asp Gly His Ser Ser Tyr Asn Gln Lys Phe Lys
1               5                   10                  15
Asp

<210> SEQ ID NO 61
<211> LENGTH: 17
<212> TYPE: PRT
<213> ORGANISM: Artificial Sequence
<220> FEATURE:
<221> NAME/KEY: source
```

<223> OTHER INFORMATION: /note="Description of Artificial Sequence:
      Synthetic peptide"

<400> SEQUENCE: 61

Ser Phe Asp Pro Tyr Asp Gly Lys Ser Ser Tyr Asn Gln Lys Phe Lys
1               5                   10                  15
Asp

<210> SEQ ID NO 62
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 62

Ser Phe Asp Pro Tyr Asp Gly Met Ser Ser Tyr Asn Gln Lys Phe Lys
1               5                   10                  15
Asp

<210> SEQ ID NO 63
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 63

Ser Phe Asp Pro Tyr Asp Gly Pro Ser Ser Tyr Asn Gln Lys Phe Lys
1               5                   10                  15
Asp

<210> SEQ ID NO 64
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 64

Ser Phe Asp Pro Tyr Asp Gly Gln Ser Ser Tyr Asn Gln Lys Phe Lys
1               5                   10                  15
Asp

<210> SEQ ID NO 65
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 65

Ser Phe Asp Pro Tyr Asp Gly Arg Ser Ser Tyr Asn Gln Lys Phe Lys
1               5                   10                  15
Asp

```
<210> SEQ ID NO 66
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 66

Ser Phe Asp Pro Tyr Asp Gly Ser Ser Ser Tyr Asn Gln Lys Phe Lys
1               5                   10                  15

Asp

<210> SEQ ID NO 67
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 67

Ser Phe Asp Pro Tyr Asp Gly Tyr Ser Ser Tyr Asn Gln Lys Phe Lys
1               5                   10                  15

Asp

<210> SEQ ID NO 68
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 68

Ser Phe Asp Pro Tyr Asp Gly Gly Ala Ser Tyr Asn Gln Lys Phe Lys
1               5                   10                  15

Asp

<210> SEQ ID NO 69
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 69

Ser Phe Asp Pro Tyr Asp Gly Gly Glu Ser Tyr Asn Gln Lys Phe Lys
1               5                   10                  15

Asp

<210> SEQ ID NO 70
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 70
```

Ser Phe Asp Pro Tyr Asp Gly Gly Ile Ser Tyr Asn Gln Lys Phe Lys
1               5                   10                  15

Asp

<210> SEQ ID NO 71
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 71

Ser Phe Asp Pro Tyr Asp Gly Gly Gln Ser Tyr Asn Gln Lys Phe Lys
1               5                   10                  15

Asp

<210> SEQ ID NO 72
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 72

Ser Phe Asp Pro Tyr Asp Gly Gly Thr Ser Tyr Asn Gln Lys Phe Lys
1               5                   10                  15

Asp

<210> SEQ ID NO 73
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 73

Ser Phe Asp Pro Tyr Asp Gly Gly Ser Glu Tyr Asn Gln Lys Phe Lys
1               5                   10                  15

Asp

<210> SEQ ID NO 74
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 74

Ser Phe Asp Pro Tyr Asp Gly Gly Ser Lys Tyr Asn Gln Lys Phe Lys
1               5                   10                  15

Asp

<210> SEQ ID NO 75
<211> LENGTH: 17
<212> TYPE: PRT
<213> ORGANISM: Artificial Sequence
<220> FEATURE:

<221> NAME/KEY: source
<223> OTHER INFORMATION: /note="Description of Artificial Sequence:
      Synthetic peptide"

<400> SEQUENCE: 75

Ser Phe Asp Pro Tyr Asp Gly Gly Ser Val Tyr Asn Gln Lys Phe Lys
1               5                   10                  15
Asp

<210> SEQ ID NO 76
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 76

Ser Phe Asp Pro Tyr Asp Gly Gly Ser Ser Ile Asn Gln Lys Phe Lys
1               5                   10                  15
Asp

<210> SEQ ID NO 77
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 77

Ser Phe Asp Pro Tyr Asp Gly Gly Ser Ser Val Asn Gln Lys Phe Lys
1               5                   10                  15
Asp

<210> SEQ ID NO 78
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 78

Ser Phe Asp Pro Tyr Asp Gly Gly Ser Ser Tyr Ala Gln Lys Phe Lys
1               5                   10                  15
Asp

<210> SEQ ID NO 79
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 79

Ser Phe Asp Pro Tyr Asp Gly Gly Ser Ser Tyr Gly Gln Lys Phe Lys
1               5                   10                  15
Asp

<210> SEQ ID NO 80
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 80

Ser Phe Asp Pro Tyr Asp Gly Gly Ser Ser Tyr His Gln Lys Phe Lys
1               5                   10                  15

Asp

<210> SEQ ID NO 81
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 81

Ser Phe Asp Pro Tyr Asp Gly Gly Ser Ser Tyr Ser Gln Lys Phe Lys
1               5                   10                  15

Asp

<210> SEQ ID NO 82
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 82

Ser Phe Asp Pro Tyr Asp Gly Gly Ser Ser Tyr Ser Asn Lys Phe Lys
1               5                   10                  15

Asp

<210> SEQ ID NO 83
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 83

Ser Phe Asp Pro Tyr Asp Gly Gly Ser Ser Tyr Ser Pro Lys Phe Lys
1               5                   10                  15

Asp

<210> SEQ ID NO 84
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 84

```
Ser Phe Asp Pro Tyr Asp Gly Gly Ser Ser Tyr Asn Gln Cys Phe Lys
1               5                   10                  15
Asp

<210> SEQ ID NO 85
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 85

Ser Phe Asp Pro Tyr Asp Gly Gly Ser Ser Tyr Asn Gln Ser Phe Lys
1               5                   10                  15
Asp

<210> SEQ ID NO 86
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 86

Ser Phe Asp Pro Tyr Asp Gly Gly Ser Ser Tyr Asn Gln Lys Phe Ala
1               5                   10                  15
Asp

<210> SEQ ID NO 87
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 87

Ser Phe Asp Pro Tyr Asp Gly Gly Ser Ser Tyr Asn Gln Lys Phe Gly
1               5                   10                  15
Asp

<210> SEQ ID NO 88
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 88

Ser Phe Asp Pro Tyr Asp Gly Gly Ser Ser Tyr Asn Gln Lys Phe Lys
1               5                   10                  15
Val

<210> SEQ ID NO 89
<211> LENGTH: 9
<212> TYPE: PRT
<213> ORGANISM: Artificial Sequence
```

```
<220> FEATURE:
<221> NAME/KEY: source
<223> OTHER INFORMATION: /note="Description of Artificial Sequence:
      Synthetic peptide"

<400> SEQUENCE: 89

Ala Arg Gly Trp Tyr Tyr Phe Asp Tyr
1               5

<210> SEQ ID NO 90
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 90

Thr Arg Gly Trp Tyr Tyr Phe Asp Tyr
1               5

<210> SEQ ID NO 91
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 91

Val Arg Gly Trp Tyr Tyr Phe Asp Tyr
1               5

<210> SEQ ID NO 92
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 92

Ala Gly Gly Trp Tyr Tyr Phe Asp Tyr
1               5

<210> SEQ ID NO 93
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 93

Ala Arg Gly Cys Tyr Tyr Phe Asp Tyr
1               5

<210> SEQ ID NO 94
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

```
<400> SEQUENCE: 94

Ala Arg Gly Phe Tyr Tyr Phe Asp Tyr
1               5

<210> SEQ ID NO 95
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 95

Ala Arg Gly Trp Ala Tyr Phe Asp Tyr
1               5

<210> SEQ ID NO 96
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 96

Ala Arg Gly Trp Leu Tyr Phe Asp Tyr
1               5

<210> SEQ ID NO 97
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 97

Ala Arg Gly Trp Tyr Tyr Leu Asp Tyr
1               5

<210> SEQ ID NO 98
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 98

Ala Arg Gly Trp Tyr Tyr Phe Asp Gln
1               5

<210> SEQ ID NO 99
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 99

Ala Arg Gly Trp Tyr Tyr Phe Asp Thr
```

```
1               5

<210> SEQ ID NO 100
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 100

Ala Arg Gly Trp Tyr Tyr Phe Asp Val
1               5

<210> SEQ ID NO 101
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 101

Arg Ala Ser Lys Ser Ile Ser Lys Tyr Leu Ala
1               5                   10

<210> SEQ ID NO 102
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 102

Arg Pro Ser Lys Ser Ile Ser Lys Tyr Leu Ala
1               5                   10

<210> SEQ ID NO 103
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 103

Arg Ala Ser Glu Ser Ile Ser Lys Tyr Leu Ala
1               5                   10

<210> SEQ ID NO 104
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 104

Arg Ala Ser Ser Ser Ile Ser Lys Tyr Leu Ala
1               5                   10

<210> SEQ ID NO 105
```

```
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 105

Arg Ala Ser Lys Ala Ile Ser Lys Tyr Leu Ala
1               5                   10

<210> SEQ ID NO 106
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 106

Arg Ala Ser Lys Phe Ile Ser Lys Tyr Leu Ala
1               5                   10

<210> SEQ ID NO 107
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 107

Arg Ala Ser Lys His Ile Ser Lys Tyr Leu Ala
1               5                   10

<210> SEQ ID NO 108
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 108

Arg Ala Ser Lys Pro Ile Ser Lys Tyr Leu Ala
1               5                   10

<210> SEQ ID NO 109
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 109

Arg Ala Ser Lys Ser Val Ser Lys Tyr Leu Ala
1               5                   10

<210> SEQ ID NO 110
<211> LENGTH: 11
<212> TYPE: PRT
<213> ORGANISM: Artificial Sequence
<220> FEATURE:
```

```
<221> NAME/KEY: source
<223> OTHER INFORMATION: /note="Description of Artificial Sequence:
      Synthetic peptide"

<400> SEQUENCE: 110

Arg Ala Ser Lys Ser Ile Ala Lys Tyr Leu Ala
1               5                   10

<210> SEQ ID NO 111
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 111

Arg Ala Ser Lys Ser Ile Ile Lys Tyr Leu Ala
1               5                   10

<210> SEQ ID NO 112
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 112

Arg Ala Ser Lys Ser Ile Ser Lys Tyr Met Ala
1               5                   10

<210> SEQ ID NO 113
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 113

Arg Ala Ser Lys Ser Ile Ser Lys Tyr Val Ala
1               5                   10

<210> SEQ ID NO 114
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 114

Ser Gly Ser Thr Leu Gln Ser
1               5

<210> SEQ ID NO 115
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

```
<400> SEQUENCE: 115

Ser Gly Gly Thr Leu Gln Ser
1               5

<210> SEQ ID NO 116
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 116

Ser Gly Arg Thr Leu Gln Ser
1               5

<210> SEQ ID NO 117
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 117

Ser Gly Ser His Leu Gln Ser
1               5

<210> SEQ ID NO 118
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 118

Ser Gly Ser Arg Leu Gln Ser
1               5

<210> SEQ ID NO 119
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 119

Ser Gly Ser Thr His Gln Ser
1               5

<210> SEQ ID NO 120
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 120

Ser Gly Ser Thr Lys Gln Ser
1               5
```

```
<210> SEQ ID NO 121
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 121

Ser Gly Ser Thr Leu Thr Ser
1               5

<210> SEQ ID NO 122
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 122

Ser Gly Ser Thr Leu Val Ser
1               5

<210> SEQ ID NO 123
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 123

Gln Gln His Asp Glu Ser Pro Tyr Thr
1               5

<210> SEQ ID NO 124
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 124

Ser Gln His Asp Glu Ser Pro Tyr Thr
1               5

<210> SEQ ID NO 125
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 125

Gln Ala His Asp Glu Ser Pro Tyr Thr
1               5

<210> SEQ ID NO 126
<211> LENGTH: 9
```

```
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 126

Gln Leu His Asp Glu Ser Pro Tyr Thr
1               5

<210> SEQ ID NO 127
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 127

Gln Arg His Asp Glu Ser Pro Tyr Thr
1               5

<210> SEQ ID NO 128
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 128

Gln Gln Asn Asp Glu Ser Pro Tyr Thr
1               5

<210> SEQ ID NO 129
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 129

Gln Gln Gln Asp Glu Ser Pro Tyr Thr
1               5

<210> SEQ ID NO 130
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 130

Gln Gln His His Glu Ser Pro Tyr Thr
1               5

<210> SEQ ID NO 131
<211> LENGTH: 9
<212> TYPE: PRT
<213> ORGANISM: Artificial Sequence
<220> FEATURE:
<221> NAME/KEY: source
```

```
<223> OTHER INFORMATION: /note="Description of Artificial Sequence:
      Synthetic peptide"

<400> SEQUENCE: 131

Gln Gln His Asn Glu Ser Pro Tyr Thr
1               5

<210> SEQ ID NO 132
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 132

Gln Gln His Asp Ile Ser Pro Tyr Thr
1               5

<210> SEQ ID NO 133
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 133

Gln Gln His Asp Leu Ser Pro Tyr Thr
1               5

<210> SEQ ID NO 134
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 134

Gln Gln His Asp Glu Gly Pro Tyr Thr
1               5

<210> SEQ ID NO 135
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 135

Gln Gln His Asp Glu His Pro Tyr Thr
1               5

<210> SEQ ID NO 136
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 136
```

Gln Gln His Asp Glu Pro Pro Tyr Thr
1               5

<210> SEQ ID NO 137
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 137

Gln Gln His Asp Glu Val Pro Tyr Thr
1               5

<210> SEQ ID NO 138
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 138

Gln Gln His Asp Glu Ser Pro Thr Thr
1               5

<210> SEQ ID NO 139
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 139

Gln Gln His Asp Glu Ser Pro Val Thr
1               5

<210> SEQ ID NO 140
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 140

Gln Gln His Asp Glu Ser Pro Tyr Phe
1               5

<210> SEQ ID NO 141
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 141

Gln Gln His Asp Glu Ser Pro Tyr Ser
1               5

```
<210> SEQ ID NO 142
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 142

Arg Pro Ser Glu Ser Ile Ser Lys Tyr Leu Ala
1               5                   10

<210> SEQ ID NO 143
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 143

Arg Pro Ser Ser Ser Ile Ser Lys Tyr Leu Ala
1               5                   10

<210> SEQ ID NO 144
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 144

Ser Gly Ser His Lys Gln Ser
1               5

<210> SEQ ID NO 145
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 145

Ser Gly Ser His Leu Thr Ser
1               5

<210> SEQ ID NO 146
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 146

Ser Gly Ser Arg Lys Gln Ser
1               5

<210> SEQ ID NO 147
<211> LENGTH: 7
<212> TYPE: PRT
```

```
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 147

Ser Gly Ser Arg Leu Thr Ser
1               5

<210> SEQ ID NO 148
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 148

Ser Gly Ser Thr Lys Thr Ser
1               5

<210> SEQ ID NO 149
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 149

Ser Gly Ser His Lys Thr Ser
1               5

<210> SEQ ID NO 150
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 150

Ser Gly Ser Arg Lys Thr Ser
1               5

<210> SEQ ID NO 151
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 151

Ser Ile Asp Pro Tyr Asp Glu Gly Ser Ser Tyr Asn Gln Lys Phe Lys
1               5                   10                  15

Asp

<210> SEQ ID NO 152
<211> LENGTH: 17
<212> TYPE: PRT
<213> ORGANISM: Artificial Sequence
<220> FEATURE:
```

```
<221> NAME/KEY: source
<223> OTHER INFORMATION: /note="Description of Artificial Sequence:
      Synthetic peptide"

<400> SEQUENCE: 152

Ser Ile Asp Pro Tyr Asp Gly Gly Ser Val Tyr Asn Gln Lys Phe Lys
1               5                   10                  15

Asp

<210> SEQ ID NO 153
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 153

Ser Ile Asp Pro Tyr Asp Gly Gly Ser Ser Tyr His Gln Lys Phe Lys
1               5                   10                  15

Asp

<210> SEQ ID NO 154
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 154

Ser Val Asp Pro Tyr Asp Glu Gly Ser Ser Tyr Asn Gln Lys Phe Lys
1               5                   10                  15

Asp

<210> SEQ ID NO 155
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 155

Ser Val Asp Pro Tyr Asp Gly Gly Ser Val Tyr Asn Gln Lys Phe Lys
1               5                   10                  15

Asp

<210> SEQ ID NO 156
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 156

Ser Val Asp Pro Tyr Asp Gly Gly Ser Ser Tyr His Gln Lys Phe Lys
1               5                   10                  15

Asp
```

<210> SEQ ID NO 157
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 157

Ser Phe Asp Pro Tyr Asp Glu Gly Ser Val Tyr Asn Gln Lys Phe Lys
1               5                   10                  15

Asp

<210> SEQ ID NO 158
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 158

Ser Phe Asp Pro Tyr Asp Glu Gly Ser Ser Tyr His Gln Lys Phe Lys
1               5                   10                  15

Asp

<210> SEQ ID NO 159
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 159

Ser Phe Asp Pro Tyr Asp Gly Gly Ser Val Tyr His Gln Lys Phe Lys
1               5                   10                  15

Asp

<210> SEQ ID NO 160
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 160

Ser Ile Asp Pro Tyr Asp Glu Gly Ser Val Tyr Asn Gln Lys Phe Lys
1               5                   10                  15

Asp

<210> SEQ ID NO 161
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 161

```
Ser Ile Asp Pro Tyr Asp Glu Gly Ser Ser Tyr His Gln Lys Phe Lys
1               5                   10                  15
Asp

<210> SEQ ID NO 162
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 162

Ser Ile Asp Pro Tyr Asp Gly Gly Ser Val Tyr His Gln Lys Phe Lys
1               5                   10                  15
Asp

<210> SEQ ID NO 163
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 163

Ser Val Asp Pro Tyr Asp Glu Gly Ser Val Tyr Asn Gln Lys Phe Lys
1               5                   10                  15
Asp

<210> SEQ ID NO 164
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 164

Ser Val Asp Pro Tyr Asp Glu Gly Ser Ser Tyr His Gln Lys Phe Lys
1               5                   10                  15
Asp

<210> SEQ ID NO 165
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 165

Ser Val Asp Pro Tyr Asp Gly Gly Ser Val Tyr His Gln Lys Phe Lys
1               5                   10                  15
Asp

<210> SEQ ID NO 166
<211> LENGTH: 17
<212> TYPE: PRT
<213> ORGANISM: Artificial Sequence
```

```
<220> FEATURE:
<221> NAME/KEY: source
<223> OTHER INFORMATION: /note="Description of Artificial Sequence:
      Synthetic peptide"

<400> SEQUENCE: 166

Ser Phe Asp Pro Tyr Asp Glu Gly Ser Val Tyr His Gln Lys Phe Lys
1               5                   10                  15
Asp

<210> SEQ ID NO 167
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 167

Ser Ile Asp Pro Tyr Asp Glu Gly Ser Val Tyr His Gln Lys Phe Lys
1               5                   10                  15
Asp

<210> SEQ ID NO 168
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 168

Ser Val Asp Pro Tyr Asp Glu Gly Ser Val Tyr His Gln Lys Phe Lys
1               5                   10                  15
Asp

<210> SEQ ID NO 169
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 169

Ala Arg Gly His Tyr Tyr Phe Asp Tyr
1               5

<210> SEQ ID NO 170
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 170

Ala Arg Gly Met Tyr Tyr Phe Asp Tyr
1               5

<210> SEQ ID NO 171
<211> LENGTH: 9
```

```
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 171

Ala Arg Gly Tyr Tyr Tyr Phe Asp Tyr
1               5

<210> SEQ ID NO 172
<211> LENGTH: 25
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 172

Gln Val Gln Leu Gln Glu Ser Gly Pro Gly Leu Val Lys Pro Ser Gln
1               5                   10                  15

Thr Leu Ser Leu Thr Cys Thr Val Ser
            20                  25

<210> SEQ ID NO 173
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 173

Trp Val Arg Gln Ala Pro Gly Gln Gly Leu Glu Trp Met Gly
1               5                   10

<210> SEQ ID NO 174
<211> LENGTH: 30
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 174

Arg Leu Thr Ile Ser Lys Asp Thr Ser Lys Asn Gln Val Val Leu Thr
1               5                   10                  15

Met Thr Asn Met Asp Pro Val Asp Thr Ala Thr Tyr Tyr Cys
            20                  25                  30

<210> SEQ ID NO 175
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 175

Trp Gly His Gly Thr Leu Val Thr Val Ser Ser
1               5                   10
```

-continued

```
<210> SEQ ID NO 176
<211> LENGTH: 23
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 176

Asp Ile Val Met Thr Gln Thr Pro Leu Ser Leu Pro Val Thr Pro Gly
1               5                   10                  15

Glu Pro Ala Ser Ile Ser Cys
            20

<210> SEQ ID NO 177
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 177

Trp Tyr Gln Gln Lys Pro Gly Gln Ala Pro Arg Leu Leu Ile Tyr
1               5                   10                  15

<210> SEQ ID NO 178
<211> LENGTH: 32
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 178

Gly Ile Pro Pro Arg Phe Ser Gly Ser Gly Tyr Gly Thr Asp Phe Thr
1               5                   10                  15

Leu Thr Ile Asn Asn Ile Glu Ser Glu Asp Ala Ala Tyr Tyr Phe Cys
            20                  25                  30

<210> SEQ ID NO 179
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 179

Phe Gly Glu Gly Thr Lys Val Glu Ile Lys
1               5                   10

<210> SEQ ID NO 180
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 180

Gly Gly Gly Gly Ser Gly Gly Gly Ser Gly Gly Gly Gly Ser
1               5                   10                  15
```

<210> SEQ ID NO 181
<211> LENGTH: 937
<212> TYPE: PRT
<213> ORGANISM: Homo sapiens

<400> SEQUENCE: 181

Met His Arg Pro Arg Arg Arg Gly Thr Arg Pro Leu Leu Ala Leu
1               5                   10                  15

Leu Ala Ala Leu Leu Ala Ala Arg Gly Ala Ala Ala Gln Glu Thr
            20                  25                  30

Glu Leu Ser Val Ser Ala Glu Leu Val Pro Thr Ser Ser Trp Asn Ile
        35                  40                  45

Ser Ser Glu Leu Asn Lys Asp Ser Tyr Leu Thr Leu Asp Glu Pro Met
    50                  55                  60

Asn Asn Ile Thr Thr Ser Leu Gly Gln Thr Ala Glu Leu His Cys Lys
65                  70                  75                  80

Val Ser Gly Asn Pro Pro Pro Thr Ile Arg Trp Phe Lys Asn Asp Ala
                85                  90                  95

Pro Val Val Gln Glu Pro Arg Arg Leu Ser Phe Arg Ser Thr Ile Tyr
            100                 105                 110

Gly Ser Arg Leu Arg Ile Arg Asn Leu Asp Thr Thr Asp Thr Gly Tyr
        115                 120                 125

Phe Gln Cys Val Ala Thr Asn Gly Lys Glu Val Val Ser Ser Thr Gly
    130                 135                 140

Val Leu Phe Val Lys Phe Gly Pro Pro Thr Ala Ser Pro Gly Tyr
145                 150                 155                 160

Ser Asp Glu Tyr Glu Glu Asp Gly Phe Cys Gln Pro Tyr Arg Gly Ile
                165                 170                 175

Ala Cys Ala Arg Phe Ile Gly Asn Arg Thr Val Tyr Met Glu Ser Leu
            180                 185                 190

His Met Gln Gly Glu Ile Glu Asn Gln Ile Thr Ala Ala Phe Thr Met
        195                 200                 205

Ile Gly Thr Ser Ser His Leu Ser Asp Lys Cys Ser Gln Phe Ala Ile
    210                 215                 220

Pro Ser Leu Cys His Tyr Ala Phe Pro Tyr Cys Asp Glu Thr Ser Ser
225                 230                 235                 240

Val Pro Lys Pro Arg Asp Leu Cys Arg Asp Glu Cys Glu Ile Leu Glu
                245                 250                 255

Asn Val Leu Cys Gln Thr Glu Tyr Ile Phe Ala Arg Ser Asn Pro Met
            260                 265                 270

Ile Leu Met Arg Leu Lys Leu Pro Asn Cys Glu Asp Leu Pro Gln Pro
        275                 280                 285

Glu Ser Pro Glu Ala Ala Asn Cys Ile Arg Ile Gly Ile Pro Met Ala
    290                 295                 300

Asp Pro Ile Asn Lys Asn His Lys Cys Tyr Asn Ser Thr Gly Val Asp
305                 310                 315                 320

Tyr Arg Gly Thr Val Ser Val Thr Lys Ser Gly Arg Gln Cys Gln Pro
                325                 330                 335

Trp Asn Ser Gln Tyr Pro His Thr His Thr Phe Thr Ala Leu Arg Phe
            340                 345                 350

Pro Glu Leu Asn Gly Gly His Ser Tyr Cys Arg Asn Pro Gly Asn Gln
        355                 360                 365

Lys Glu Ala Pro Trp Cys Phe Thr Leu Asp Glu Asn Phe Lys Ser Asp

```
            370                 375                 380
Leu Cys Asp Ile Pro Ala Cys Asp Ser Lys Asp Ser Lys Glu Lys Asn
385                 390                 395                 400

Lys Met Glu Ile Leu Tyr Ile Leu Val Pro Ser Val Ala Ile Pro Leu
                405                 410                 415

Ala Ile Ala Leu Leu Phe Phe Phe Ile Cys Val Cys Arg Asn Asn Gln
                420                 425                 430

Lys Ser Ser Ser Ala Pro Val Gln Arg Gln Pro Lys His Val Arg Gly
            435                 440                 445

Gln Asn Val Glu Met Ser Met Leu Asn Ala Tyr Lys Pro Lys Ser Lys
            450                 455                 460

Ala Lys Glu Leu Pro Leu Ser Ala Val Arg Phe Met Glu Glu Leu Gly
465                 470                 475                 480

Glu Cys Ala Phe Gly Lys Ile Tyr Lys Gly His Leu Tyr Leu Pro Gly
                485                 490                 495

Met Asp His Ala Gln Leu Val Ala Ile Lys Thr Leu Lys Asp Tyr Asn
            500                 505                 510

Asn Pro Gln Gln Trp Thr Glu Phe Gln Gln Glu Ala Ser Leu Met Ala
            515                 520                 525

Glu Leu His His Pro Asn Ile Val Cys Leu Leu Gly Ala Val Thr Gln
            530                 535                 540

Glu Gln Pro Val Cys Met Leu Phe Glu Tyr Ile Asn Gln Gly Asp Leu
545                 550                 555                 560

His Glu Phe Leu Ile Met Arg Ser Pro His Ser Asp Val Gly Cys Ser
                565                 570                 575

Ser Asp Glu Asp Gly Thr Val Lys Ser Ser Leu Asp His Gly Asp Phe
            580                 585                 590

Leu His Ile Ala Ile Gln Ile Ala Ala Gly Met Glu Tyr Leu Ser Ser
            595                 600                 605

His Phe Phe Val His Lys Asp Leu Ala Ala Arg Asn Ile Leu Ile Gly
            610                 615                 620

Glu Gln Leu His Val Lys Ile Ser Asp Leu Gly Leu Ser Arg Glu Ile
625                 630                 635                 640

Tyr Ser Ala Asp Tyr Tyr Arg Val Gln Ser Lys Ser Leu Leu Pro Ile
                645                 650                 655

Arg Trp Met Pro Pro Glu Ala Ile Met Tyr Gly Lys Phe Ser Ser Asp
                660                 665                 670

Ser Asp Ile Trp Ser Phe Gly Val Val Leu Trp Glu Ile Phe Ser Phe
            675                 680                 685

Gly Leu Gln Pro Tyr Tyr Gly Phe Ser Asn Gln Glu Val Ile Glu Met
            690                 695                 700

Val Arg Lys Arg Gln Leu Leu Pro Cys Ser Glu Asp Cys Pro Pro Arg
705                 710                 715                 720

Met Tyr Ser Leu Met Thr Glu Cys Trp Asn Glu Ile Pro Ser Arg Arg
                725                 730                 735

Pro Arg Phe Lys Asp Ile His Val Arg Leu Arg Ser Trp Glu Gly Leu
                740                 745                 750

Ser Ser His Thr Ser Ser Thr Thr Pro Ser Gly Gly Asn Ala Thr Thr
            755                 760                 765

Gln Thr Thr Ser Leu Ser Ala Ser Pro Val Ser Asn Leu Ser Asn Pro
            770                 775                 780

Arg Tyr Pro Asn Tyr Met Phe Pro Ser Gln Gly Ile Thr Pro Gln Gly
785                 790                 795                 800
```

```
Gln Ile Ala Gly Phe Ile Gly Pro Pro Ile Pro Gln Asn Gln Arg Phe
                805             810                 815

Ile Pro Ile Asn Gly Tyr Pro Ile Pro Pro Gly Tyr Ala Ala Phe Pro
            820                 825                 830

Ala Ala His Tyr Gln Pro Thr Gly Pro Pro Arg Val Ile Gln His Cys
        835                 840                 845

Pro Pro Pro Lys Ser Arg Ser Pro Ser Ser Ala Ser Gly Ser Thr Ser
    850                 855                 860

Thr Gly His Val Thr Ser Leu Pro Ser Ser Gly Ser Asn Gln Glu Ala
865                 870                 875                 880

Asn Ile Pro Leu Leu Pro His Met Ser Ile Pro Asn His Pro Gly Gly
                885                 890                 895

Met Gly Ile Thr Val Phe Gly Asn Lys Ser Gln Lys Pro Tyr Lys Ile
            900                 905                 910

Asp Ser Lys Gln Ala Ser Leu Leu Gly Asp Ala Asn Ile His Gly His
        915                 920                 925

Thr Glu Ser Met Ile Ser Ala Glu Leu
930                 935
```